United States Patent
Kim et al.

(10) Patent No.: US 10,950,233 B2
(45) Date of Patent: Mar. 16, 2021

(54) DIALOGUE SYSTEM, VEHICLE HAVING THE SAME AND DIALOGUE PROCESSING METHOD

(71) Applicants: Hyundai Motor Company, Seoul (KR); KIA Motors Corporation, Seoul (KR)

(72) Inventors: Seona Kim, Seoul (KR); Donghee Seok, Gyeonggi-do (KR); Dongsoo Shin, Gyeonggi-do (KR); Jeong-Eom Lee, Gyeonggi-do (KR); Ga Hee Kim, Seoul (KR); Jung Mi Park, Gyeonggi-do (KR); HeeJin Ro, Seoul (KR); Kye Yoon Kim, Gyeonggi-do (KR)

(73) Assignees: Hyundai Motor Company, Seoul (KR); KIA Motors Corporation, Seoul (KR)

( * ) Notice: Subject to any disclaimer, the term of this patent is extended or adjusted under 35 U.S.C. 154(b) by 149 days.

(21) Appl. No.: 16/207,388

(22) Filed: Dec. 3, 2018

(65) Prior Publication Data
US 2020/0020331 A1 Jan. 16, 2020

(30) Foreign Application Priority Data
Jul. 11, 2018 (KR) .......................... 10-2018-0080470

(51) Int. Cl.
*G10L 15/22* (2006.01)
*G10L 15/30* (2013.01)

(52) U.S. Cl.
CPC .............. *G10L 15/22* (2013.01); *G10L 15/30* (2013.01); *G10L 2015/223* (2013.01); *G10L 2015/228* (2013.01)

(58) Field of Classification Search
CPC ......................... G10L 15/22–228; G10L 15/30
See application file for complete search history.

(56) References Cited

U.S. PATENT DOCUMENTS

| | | | | |
|---|---|---|---|---|
| 10,395,444 | B1* | 8/2019 | Edren | G07C 5/0816 |
| 2005/0049895 | A1* | 3/2005 | Kasahara | G06Q 10/20 |
| | | | | 705/305 |
| 2008/0269958 | A1* | 10/2008 | Filev | B60W 50/10 |
| | | | | 701/1 |
| 2011/0172873 | A1* | 7/2011 | Szwabowski | G06Q 50/30 |
| | | | | 701/29.5 |
| 2014/0136187 | A1* | 5/2014 | Wolverton | G10L 15/22 |
| | | | | 704/9 |
| 2015/0095037 | A1* | 4/2015 | Shimizu | G10L 15/22 |
| | | | | 704/275 |
| 2016/0313868 | A1* | 10/2016 | Weng | H04L 65/4069 |

(Continued)

FOREIGN PATENT DOCUMENTS

| | | |
|---|---|---|
| JP | 2009146086 A | 7/2009 |
| JP | 2009147555 A | 7/2009 |

(Continued)

*Primary Examiner* — Abul K Azad
(74) *Attorney, Agent, or Firm* — Brinks Gilson & Lione

(57) ABSTRACT

Disclosed herein is a dialogue system capable of identifying preliminary indications related to the failure of the vehicle through a dialogue with a user, to check a part that may not be measured by a sensor and to inhibit accidents so as to provide user safety, a vehicle having the same and a dialogue processing method.

27 Claims, 50 Drawing Sheets

(56) References Cited

U.S. PATENT DOCUMENTS

| | | | |
|---|---|---|---|
| 2017/0228367 A1* | 8/2017 | Pasupalak | G06F 40/20 |
| 2018/0284807 A1* | 10/2018 | Wood | B60S 5/02 |
| 2019/0206149 A1* | 7/2019 | Sakurada | G07C 5/0825 |

FOREIGN PATENT DOCUMENTS

| | | |
|---|---|---|
| JP | 2011203116 A | 10/2011 |
| JP | 2015125560 A | 7/2015 |
| KR | 1020100050621 A | 5/2010 |
| KR | 1020120107774 A | 10/2012 |
| KR | 1020130035983 A | 4/2013 |
| KR | 1020130139080 A | 12/2013 |
| KR | 1020170015719 A | 2/2017 |

* cited by examiner

FIG. 45

| | USER UTTERANCE | UTTERANCE ANALYSIS | CHECK SIMILAR CASE BY USING MAINTENANCE DB | SOLUTION | REPAIR SHOP GUIDANCE OR FIRMWARE UPDATE GUIDANCE |
|---|---|---|---|---|---|
| EXAMPLE 1 | BRAKE IS STIFF | BRAKE PROBLEM | SEARCH FOR SIMILAR CASE IN SIMILAR VEHICLE MODEL AND SIMILAR VEHICLE TYPE, AND CONFIRM PERSONAL VEHICLE MAINTENANCE HISTORY | REQUIREMENT OF REPLACEMENT OF BRAKE PEDAL | REPAIR SHOP GUIDANCE AND SOLUTION NOTIFICATION |
| EXAMPLE 2 | ENGINE SOUND IS LOUD | ENGINE SOUND PROBLEM | CHECK PERSONAL MAINTENANCE HISTORY | REQUIREMENT OF REPLACEMENT OF TIMING BELT | NOTIFICATION OF TIMING BELT REPLACEMENT TIME |
| EXAMPLE 3 | DOES MY VEHICLE NEED TO CHECK | CHECK LIST CONFIRM | CHECK PERSONAL MAINTENANCE HISTORY | REQUIREMENT OF CHANGE OF ENGINE OIL | NOTIFICATION OF ENGINE OIL REPLACEMENT TIME |
| EXAMPLE 4 | VEHICLE CANNOT SPEED UP | DRIVING PROBLEM | SEARCH FOR SIMILAR CASE IN SIMILAR VEHICLE MODEL AND SIMILAR VEHICLE TYPE, AND CONFIRM PERSONAL VEHICLE MAINTENANCE HISTORY | REQUIREMENT OF REPLACEMENT OF ENGINE DUE TO DETERIORATION | NOTIFICATION OF ENGINE REPLACEMENT AND REPAIR SHOP RESERVATION SERVICE |

DIALOGUE SYSTEM, VEHICLE HAVING THE SAME AND DIALOGUE PROCESSING METHOD

CROSS-REFERENCE TO RELATED APPLICATION

This application claims priority to and the benefit of Korean Patent Application No. 10-2018-0080470, filed on Jul. 11, 2018, the entire contents of which is incorporated herein by reference.

FIELD

The present disclosure relates to a dialogue system configured to provide information or service desired for a user by recognizing the user's intention through dialogue with a user, a vehicle having the same and a dialogue processing method.

BACKGROUND

The statements in this section merely provide background information related to the present disclosure and may not constitute prior art.

As for an audio-video-navigation (AVN) device of a vehicle or most mobile devices, when providing visual information to a user or receiving a user's input, a small screen and a small button provided therein may cause the user inconvenience.

Particularly, during driving, when a user takes his or her hand off of a steering wheel or when a user looks up at another place for checking the visual information and operating devices, it may interfere with safe driving.

Therefore, when applying a dialogue system to a vehicle, it may be possible to provide services in more convenient and safer manner, wherein the dialogue system is capable of recognizing a user's intention through dialogue with the user and providing information or service requested by the user.

A variety of sensors are provided in the vehicle for the safety. The sensor detects failures and problems in the vehicle. However, in the vehicle, a preliminary indication may occur before a failure signal of the sensor is output. A driver or a passenger of the vehicle may detect the preliminary indication through sense of hearing or other senses.

SUMMARY

It is an aspect of the present disclosure to provide a dialogue system capable of identifying preliminary indications related to the failure of the vehicle through a dialogue with a user, to check a part that cannot be measured by a sensor and to inhibit accidents so as to secure the user safety, a vehicle having the same and a dialogue processing method.

Additional aspects of the present disclosure will be set forth in part in the description which follows and, in part, will be obvious from the description, or may be learned by practice of the present disclosure.

In accordance with an aspect of the disclosure, a dialogue system includes an input processor configured to extract a search request for a check history of a vehicle from a user's utterance and context information including at least one of vehicle state information related to a vehicle state or driving environment information related to driving environment information of the vehicle; a dialogue manager configured to determine an action of the check history search based on the search request, and configured to acquire an action parameter value to execute the action; and a result processor configured to generate a response according the request, by using the acquired action parameter value.

The dialogue manager may determine whether to execute the action of the check history search based on the context information.

The dialogue manager may request a parameter value of a condition determination parameter used to determine whether to execute the action of check history search, to the input processor.

The dialogue manager may request a check history of the vehicle, to the outside.

The dialogue system may further include a storage configured to store a personal maintenance history contained in the check history, and the solution.

The storage may store a dialogue policy related to the solution, and the result processor may recommend a service to the user based on the dialogue policy.

The dialogue manager may update the personal maintenance history based on the solution.

The result processor may generate a response based on the personal maintenance history.

The result processor may generate a command for the control of the vehicle based on the solution.

The dialogue system may further include a communication device configured to receive data related to the solution and configured to transmit the updated personal maintenance history to the outside.

The input processor may extract a feedback according to the solution, from the user's utterance based on the response generated by the result processor.

The dialogue manager may determine an action based on the feedback, and acquires an action parameter value to execute the action.

The result processor may generate a response by using the acquired action parameter value and transmits the feedback to the outside.

The input processor may determine whether it is a pre-utterance context based on the context information, wherein the pre-utterance represents a case in which the dialogue system firstly outputs an utterance before a user, and when it is determined that it is the pre-utterance context, the input processor may acquire at least one of an action corresponding to the request of the check history search, or a pre-utterance message including an utterance content output by the dialogue system.

In accordance with another aspect of the disclosure, a vehicle includes an input processor configured to extract a search request for a check history of a vehicle from a user's utterance and context information including at least one of vehicle state information related to a vehicle state or driving environment information related to driving environment information of the vehicle; a dialogue manager configured to determine an action of the check history search based on the search request, and configured to acquire an action parameter value to execute the action; and a result processor configured to generate a response according the request, by using the acquired action parameter value.

The dialogue manager may determine whether to execute the action of the check history search based on the context information.

The dialogue manager may request a parameter value of a condition determination parameter used to determine whether to execute the action of check history search, to the input processor.

The dialogue manager may request a check history of the vehicle, to the outside.

The vehicle may further include a storage configured to store a personal maintenance history contained in the check history, and the solution.

The storage may store a dialogue policy related to the solution, and the result processor may recommend a service to the user based on the dialogue policy.

In accordance with another aspect of the disclosure, a dialogue processing method includes extracting a search request for a check history of a vehicle from a user's utterance and context information including at least one of vehicle state information related to a vehicle state or driving environment information related to driving environment information of the vehicle; determining an action of the check history search based on the search request; acquiring an action parameter value to execute the action; and generating a response according the request, by using the acquired action parameter value.

The dialogue processing method may further include requesting the check history of the vehicle, to the outside.

The dialogue processing method may further include storing a personal maintenance history contained in the check history, and the solution.

The storing may include storing a dialogue policy related to the solution, and the generation of the response may include recommending a service to the user based on the dialogue policy.

The responding may include generating a response based on the personal maintenance history and generating a command for the control of the vehicle based on the solution.

The dialogue processing method may further include updating the personal maintenance history based on the solution; receiving data related to the solution; and transmitting the updated personal maintenance history to the outside.

The dialogue processing method may further include determining whether it is a pre-utterance context based on the context information, wherein the pre-utterance represents a case in which the dialogue system firstly outputs an utterance before a user; and when it is determined that it is the pre-utterance context, acquiring at least one of an action corresponding to the request of the check history search, or a pre-utterance message including an utterance content output by the dialogue system.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which:

FIG. 45 is an example illustrating preliminary indications in accordance with an aspect of the present disclosure.

Figure 1:
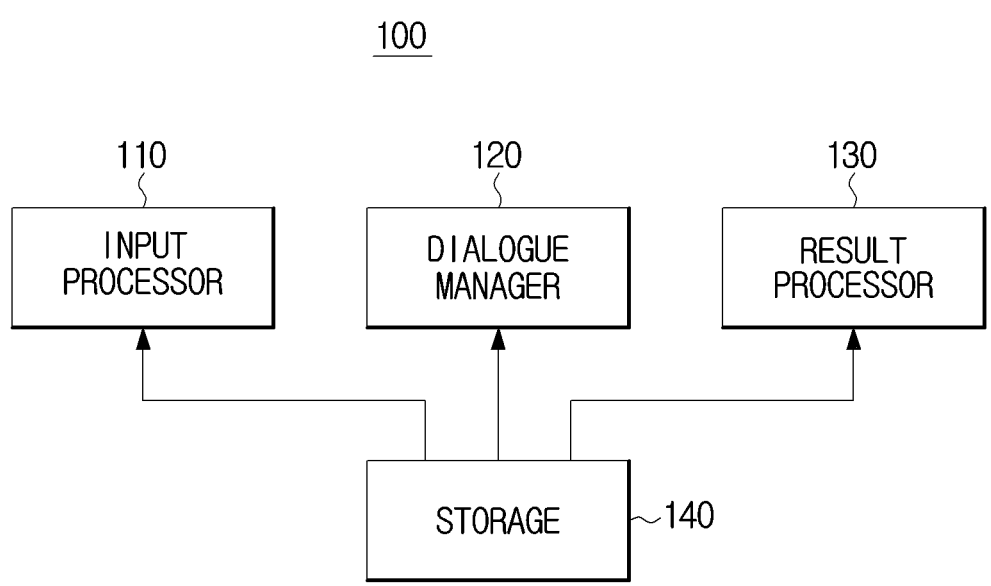
FIG. 1 is a control block diagram illustrating a dialogue system in accordance with an aspect of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the following description, like reference numerals refer to like elements throughout the specification. Well-known functions or constructions are not described in detail since they may obscure the one or more exemplar aspects with unnecessary detail. Terms such as "unit", "module", "member", and "block" may be represented by hardware or software. According to various aspects, a plurality of "unit", "module", "member", and "block" may be implemented as a single component or a single "unit", "module", "member", and "block" may include a plurality of components.

It will be understood that when an element is referred to as being "connected" another element, it can be directly or indirectly connected to the other element, wherein the indirect connection includes "connection via a wireless communication network".

Also, when a part "includes" or "comprises" an element, unless there is a particular description contrary thereto, the part may further include other elements, not excluding the other elements.

As used herein, the singular forms "a," "an" and "the" are intended to include the plural forms as well, unless the context clearly indicates otherwise.

An identification code is used for the convenience of the description but is not intended to illustrate the order of each step. The each step may be implemented in the order different from the illustrated order unless the context clearly indicates otherwise.

Reference will now be made in detail to aspects of the present disclosure, examples of which are illustrated in the accompanying drawings.

According to one aspect, a dialogue system may be configured to recognize a user's intention by using the user's speech and another input except for the speech, and configured to provide a service which is appropriate or need for the user intention. The dialogue system may perform dialogue with a user by outputting a system utterance that is one of tools configured to provide the service or to recognize the user's intention, clearly.

According to certain aspects, the service provided to a user may include all kinds of operations in accordance with a user's need or a user's intention, wherein the all kinds of operations may include providing information, controlling a vehicle, performing audio/video/navigation functions, and providing content from an external server.

According to an aspect, the dialogue system provides a dialogue processing technology specialized for the vehicle environment so as to recognize the user's intention precisely in a special environment, i.e. a vehicle.

A gateway connecting the dialogue system to a user may be a vehicle or a mobile device connected to the vehicle. As mentioned below, the dialogue system may be provided in a vehicle or a remote server outside of the vehicle so as to send or receive data through the communication with the vehicle or the mobile device connected to the vehicle.

Some of components in the dialogue system may be provided in the vehicle and some thereof may be provided in the remote server. Therefore, the vehicle and the remote server may perform a part of the operation of the dialogue system.

FIG. 1 is a control block diagram illustrating a dialogue system in accordance with an aspect of the present disclosure.

Referring to FIG. 1, a dialogue system 100 may include an input processor 110 processing a user input including a user's speech including state information related to preliminary indications about a failure in the vehicle and an input except for the user speech, or an input including information related to a vehicle or information related to a user; a dialogue manager 120 recognizing a user's intention and a vehicle state using a result of the process of the input processor 110 and determining an action corresponding to the user's intention or the vehicle state; a result processor 130 providing a certain service according to an output result of the dialogue manager 120 or outputting a system utterance for continuing the dialogue; and a storage 140 storing a variety of information for the operation described later.

The input processor 110 may receive two kinds of input such as a user speech and an input except for the speech. The input except for the speech may include recognizing user's gesture, an input except for the user's speech input by an operation of an input device, vehicle state information indicating a vehicle state, driving environment information related to driving information of the vehicle and user information indicating user's state. In addition, other than the above mentioned information, information related to the user and the vehicle may be input to the input processor 110, as long as information is used for recognizing a user's intention or providing a service to a user or a vehicle. A user may include a driver and a passenger.

The input processor 110 converts a user's speech into an utterance in the text type by recognizing the user's speech and recognizes a user's intention by applying natural language understanding algorithm to the user utterance.

The input processor 110 collects information related to the vehicle state or the driving environment of the vehicle other than the user speech, and then understands the context using the collected information.

The input processor 110 transmits the user's intention, which is obtained by the natural language understanding technology, and the information related to the context to the dialogue manager 120.

The dialogue manager 120 determines an action corresponding to the user's intention or the current context based on the user's intention and the information related to the context transmitted from the input processor 110, and manages parameters that are needed to perform the corresponding action.

According to certain aspects, the action may represent all kinds of actions for providing a certain service, and the kinds of the action may be determined in advance. As needed, providing a service may correspond to performing an action.

For example, actions such as a route guidance, a vehicle state check, and gasoline station recommendation may be pre-defined in a domain/action inference rule DB 141 (refer to FIG. 19A), and it may be possible to extract an action corresponding to a user's utterance, i.e., an action intended by a user, according to the stored inference rule. An action related to an event occurred in the vehicle may be pre-defined and then stored in a relational action DB 146b (refer to FIG. 21).

There is no limitation in the kinds of the action. If an action is allowed to be performed by the dialogue system 100 via the vehicle 200 or the mobile device 400, and is pre-defined while the inference rule thereof or a relation with other action/event is stored, the action may become the above mentioned action.

The dialogue manager 120 transmits information related to the determined action to the result processor 130.

The result processor 130 generates and outputs a dialogue response and a command that is needed to perform the transmitted action. The dialogue response may be output in text, image or audio type. When the command is output, a service such as vehicle control and external content provision, corresponding to the output command, may be performed.

As an example, in order to diagnose the vehicle related to preliminary indications, the result processor 130 may request search for a similar case in the similar vehicle type/the similar vehicle model or request individual maintenance history of the current vehicle, to the outside.

The storage 140 stores a variety of information for the dialogue processing and the service provision. For example, the storage 140 may pre-store information related to domains, actions, speech acts and entity names used for the natural language understanding and a context understanding table used for understanding the context from the input information. In addition, the storage 140 may pre-store data detected by a sensor provided in the vehicle, information related to a user, and information needed for the execution of action.

According to the above mentioned aspect, the storage 140 stores similar cases, individual maintenance histories and solutions related to preliminary indications transmitted from the outside, and transmits the information to the dialogue manager 120. Through which the dialogue manager 120 generates a response that suggests a solution to the preliminary indications. A detailed description related thereto will be described later with reference to the drawings.

As mentioned above, the dialogue system 100 provides a dialogue processing technology that is specified for the vehicle environment. All or some of components of the dialogue system 100 may be contained in the vehicle. The dialogue system 100 may be provided in the remote server and the vehicle may act as a gateway between the dialogue system 100 and a user. In either case, the dialogue system 100 may be connected to the user via the vehicle or the mobile device connected to the vehicle.

Figure 2:
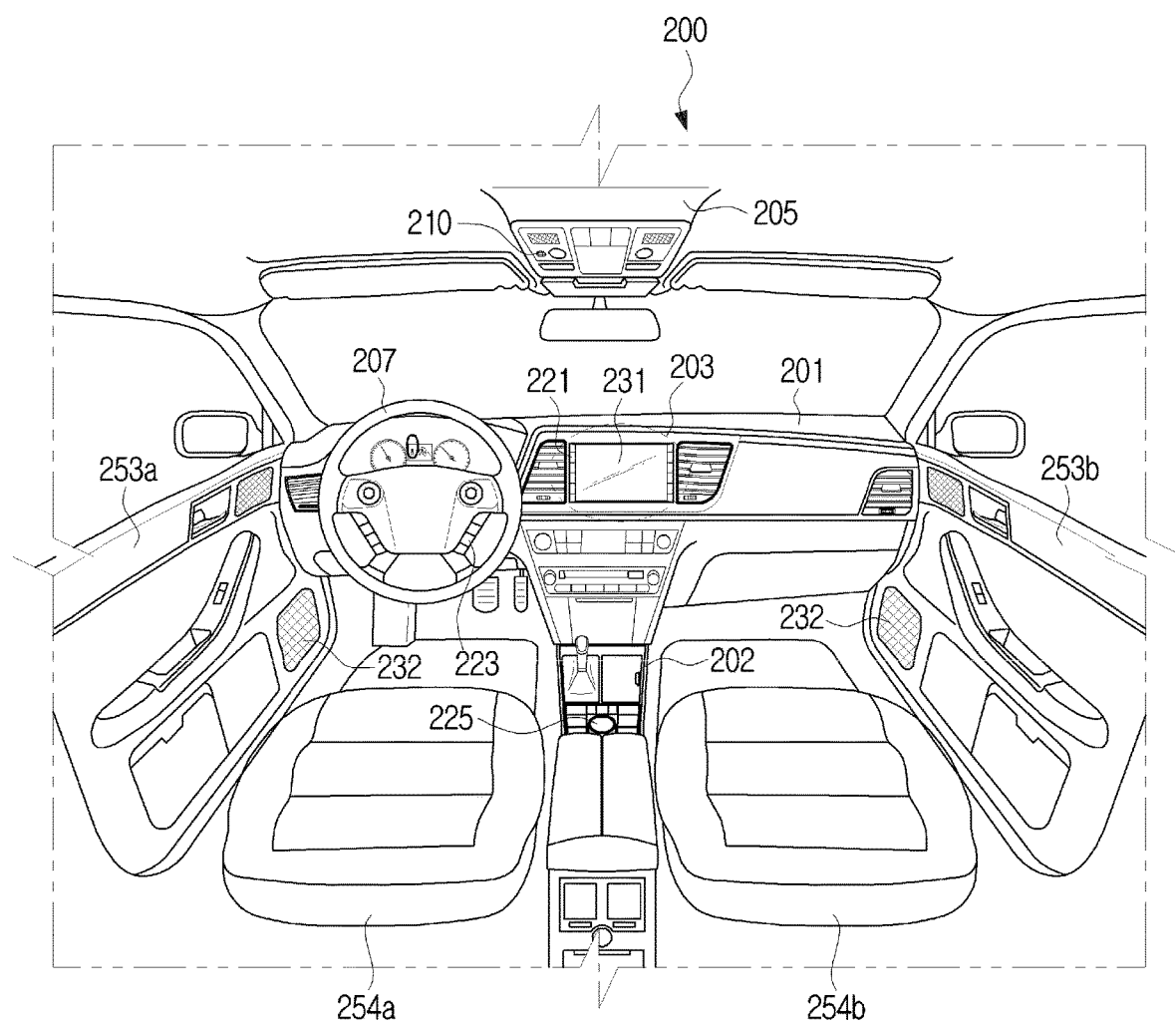
FIG. 2 is a view illustrating an interior of a vehicle.

FIG. 2 is a view illustrating an interior of a vehicle.

Referring to FIG. 2, a display 231 configured to display a screen for the control of the vehicle including an audio function, a video function, a navigation function, and a calling function, and an input button 221 configured to receive a user's control command may be provided in a center fascia 203 corresponding to the center portion of a dashboard inside of the vehicle 200.

For the user's operation convenience, an input button 223 may be provided in a steering wheel 207 and a jog shuttle 225 acting as an input button may be provided in a center console region 202 provided between a driver seat 254a and a passenger seat 254b.

A module including the display 231, the input button 221 and a processor controlling a variety of functions may correspond to an audio video navigation (AVN) terminal or a head unit.

The display 231 may be implemented by any one of various display devices, e.g., Liquid Crystal Display (LCD), Light Emitting Diode (LED), Plasma Display Panel (PDP), Organic Light Emitting Diode (OLED), and Cathode Ray Tube (CRT).

The input button 221 may be provided in a hard key type on an area adjacent to the display 231, as illustrated in FIG. 2. Alternatively, when the display 231 is implemented by a touch screen, the display 231 may perform a function of the input button 221.

The vehicle 200 may receive a user control command as a speech via a speech input device 210. The speech input device 210 may include a microphone configured to receive the sound and then covert the sound into an electrical signal.

For the effective speech input, the speech input device 210 may be mounted to a head lining 205, as illustrated in FIG. 2, but an aspect of the vehicle 200 is not limited thereto. Therefore, the speech input device 210 may be mounted to the dashboard 201 or the steering wheel 207. In addition, the speech input device 210 may be mounted to any position as long as a position is appropriate for receiving the user's speech.

In the inside of the vehicle 200, a speaker 232 configured to perform a dialogue with a user or configured to output a sound so that the service desired by the user may be provided. For example, the speaker 232 may be provided inside of the driver's seat door 253a and the passenger-seat door 253b.

The speaker 232 may output a speech for navigation route guidance, a sound or a speech contained in the audio and video contents, a speech for providing information or service desired by the user, and a system utterance generated as a response to the user's utterance.

According to an aspect, the dialogue system 100 provides a service that is appropriate for the user's lifestyle by using the dialogue processing technologies appropriate for the vehicle environments, and the dialogue system 100 may implement a new service using technologies such as connected car, Internet of Things (IoT), and artificial intelligence (AI).

Particularly, when the user senses a problem in the vehicle and refers to a preliminary indication, the dialogue system 100 identifies the intention of the user. The dialogue system 100 may control the vehicle 1 to perform its self-diagnosis and may provide a solution to the outside by transmitting a case related to the preliminary indication which is not detected by the sensor. Finally, the dialogue system 100 may respond to the solution and provide various services, such as diagnosis of the vehicle, according to the intention of the user.

Figure 3:
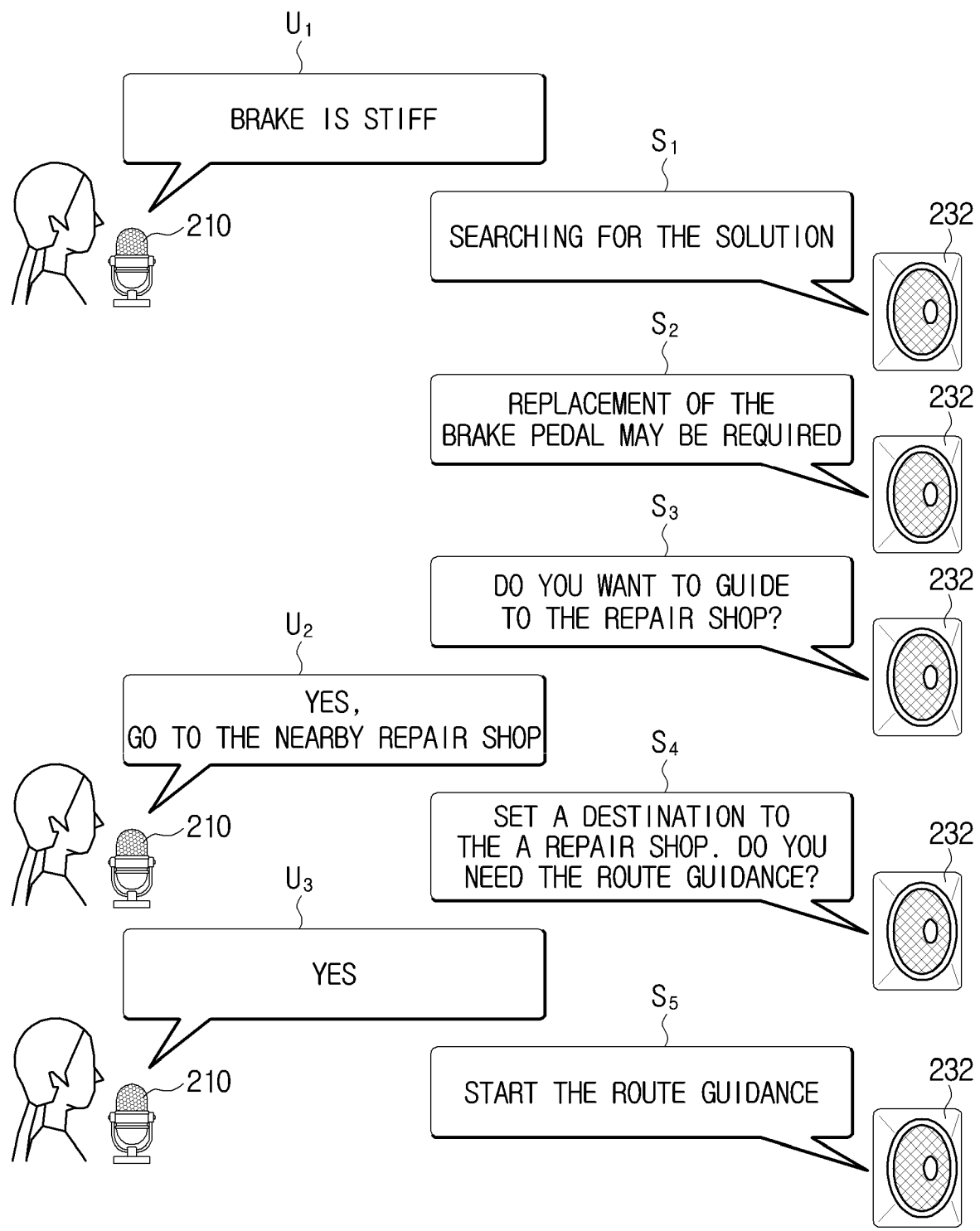
FIGS. 3 to 5 are views illustrating an example of dialogue that generates between a dialogue system and a driver.
Figure 4:
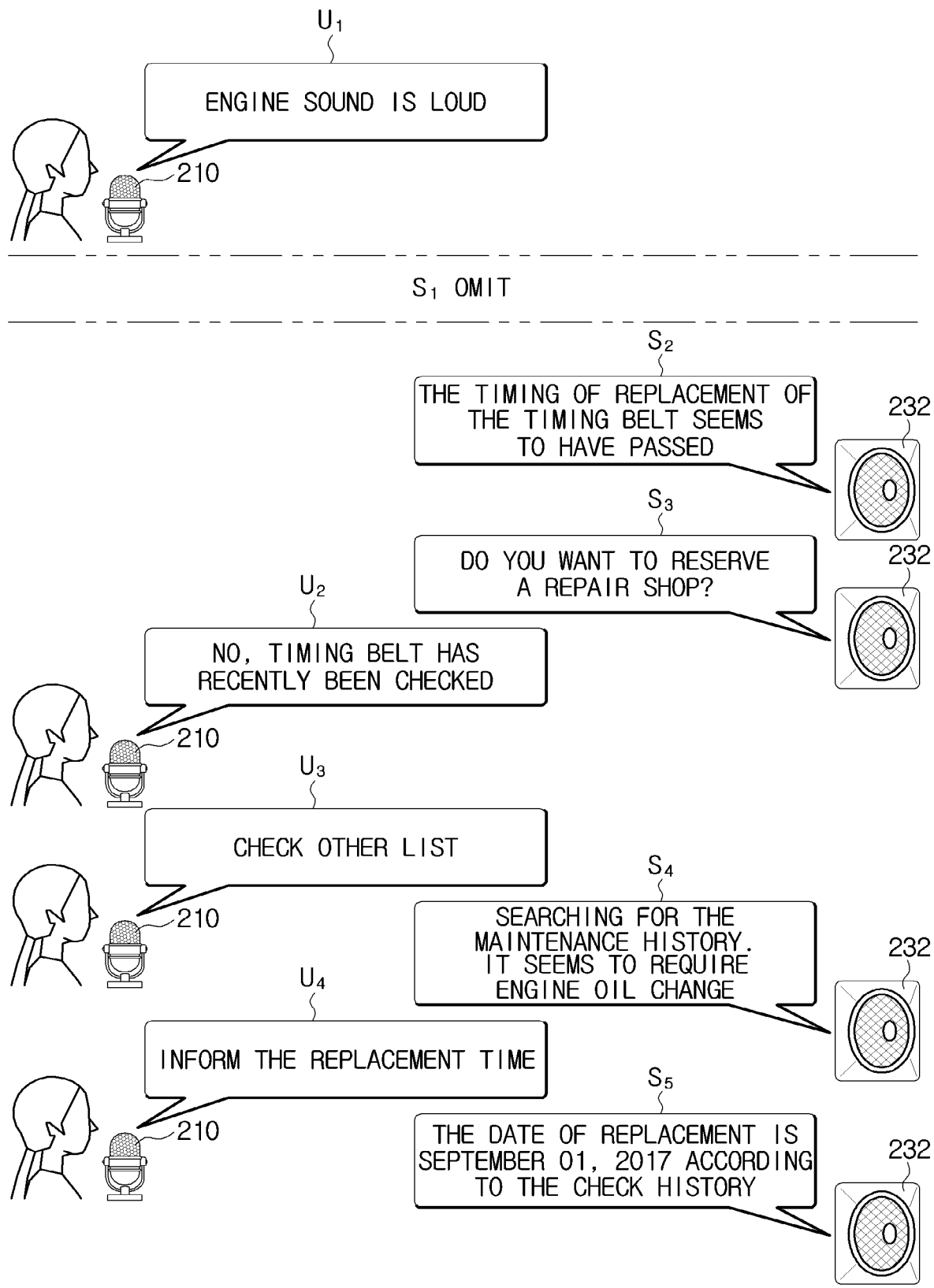
Figure 5:
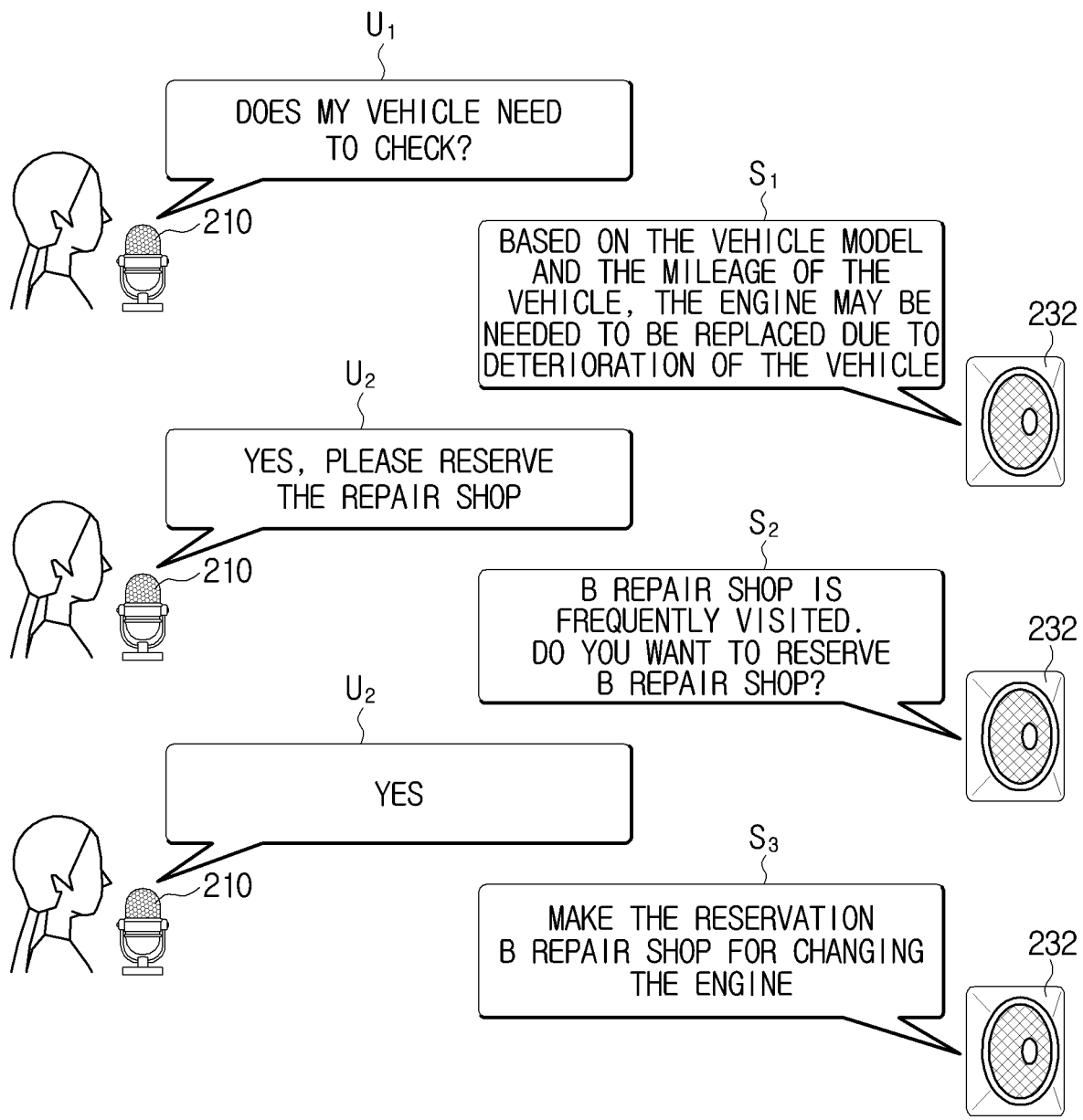

FIGS. 3 to 5 are views illustrating an example of dialogue that generates between a dialogue system and a driver.

Referring to FIG. 3, when the driver inputs an utterance (U1: brake is stiff) including an indication that there is a problem in the vehicle, the dialogue system 100 may output an utterance (S1: searching for the solution) indicating that the dialogue system 100 recognizes the intention of the user.

Thereafter, the dialogue system 100 may output an utterance (S2: replacement of the brake pedal may be required) corresponding to a result of the diagnosis of the vehicle based on the problem in the vehicle.

In addition, the dialogue system 100 may output an utterance suggesting a solution according to the diagnosis result (S3: do you want to guide to the repair shop?).

The driver may accept the cause of the fault and the solution suggested by the dialogue system 100, and input an utterance (U2: Yes, go to the nearby repair shop) requesting the guidance to the repair shop. The dialogue system 100 outputs an utterance (S4: set a destination to the A repair shop) providing information on a repair shop around the current position. At the same time, the dialogue system 100 may output a response to the guidance request (S4: Do you need the route guidance?).

When the user inputs an utterance (U3: yes) accepting the response, the dialogue system 100 outputs an utterance (S5: start the route guidance) indicating that the route guidance will be started, while outputting a signal to control the vehicle to execute the navigation service.

Figure 21:
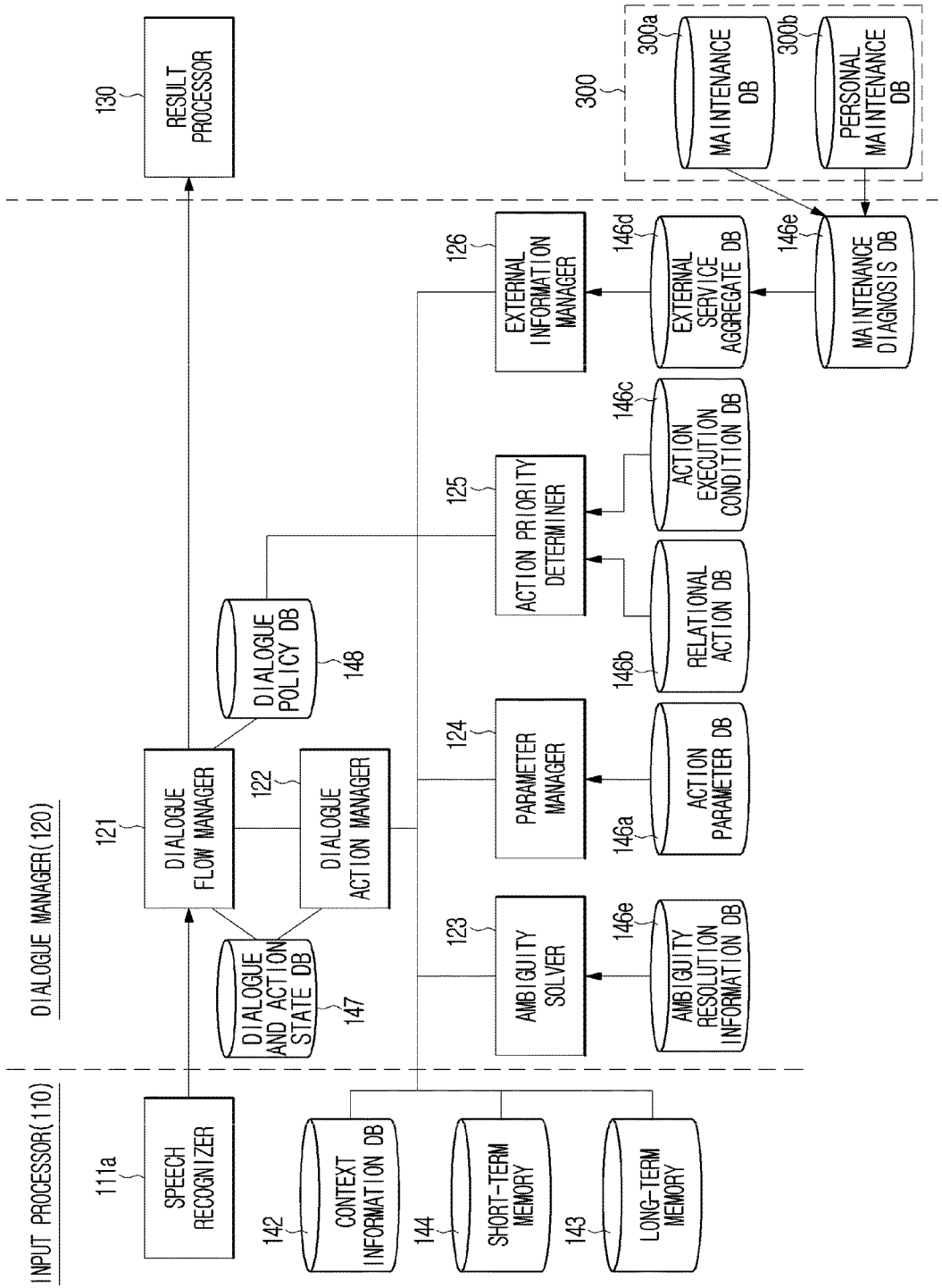
FIG. 21 is a control block diagram illustrating a configuration of a dialogue manager in detail.

The above dialogue history may be stored in the dialogue policy DB 148 (refer to FIG. 21). However, the dialogue history is not always repeated, and may be variously changed according to the state of the user's dialogue and dialogue action.

Referring to FIG. 4, when the driver inputs an utterance (U1: engine sound is loud) including an indication that there is a problem in the vehicle, the dialogue system 100 omits S1, unlike FIG. 3. The dialogue system 100 may output an utterance (S2: the timing of replacement of the timing belt seems to have passed) responding to the result of the vehicle diagnosis.

In addition, the dialogue system 100 may output an utterance (S3: do you want to reserve a repair shop?) suggesting a solution according to the diagnosis result.

Unlike FIG. 3, the driver inputs an utterance (U2: No, timing belt has recently been checked) rejecting to the response indicating the reservation of the repair shop, and input an utterance (U3: check other list) requesting the vehicle diagnosis. In response to the request, the dialogue system 100 may request search for a similar case in the similar vehicle type/the similar vehicle model or request personal maintenance history of the current vehicle, to the outside. The dialogue system 100 may output an utterance (S4: searching for the maintenance history) responding to the driver's request. In addition, the dialogue system 100 may output a solution transmitted from the outside. For example, the dialogue system 100 may output an utterance (S4: it seems to require engine oil change) responding to the utterance indicating that there is the problem in the vehicle, which is reported in relation to the engine.

Accordingly, the driver may input an utterance (U4: inform the replacement time) requesting the search again. The dialogue system 100 may determine whether it requests information on the replacement timing of the engine oil in accordance with the flow of the dialogue. The dialogue system 100 may search for the personal maintenance history of the vehicle and output an utterance (S5: the date of replacement is Sep. 1, 2017 according to the check history)

According another aspect, referring to FIG. 5, the driver may input an utterance (U1: does my vehicle need to check?) requesting the search of the maintenance history of the vehicle. The dialogue system 100 may search for personal maintenance history stored in an external server and output a search result (S1: based on the vehicle model and the mileage of the vehicle, the engine may be needed to be replaced due to deterioration of the vehicle) corresponding to the search result.

When requesting a reservation a new repair shop in response to the response, the driver may not input a specific utterance about which repair shop. For example, when the driver inputs an utterance (U2: yes, please reserve the repair shop) requesting reservation, without designating the repair shop, the dialogue system 100 may determine the specific repair shop that the driver intends. After solving the ambiguity about the repair shop, the dialogue system 100 may output an utterance (S2: B repair shop is frequently visited. Do you want to reserve B repair shop?) confirming the repair shop that is selected by the dialogue system 100 itself and confirming a response according to the request.

The driver may input an utterance (U4': yes) simply agreeing with the query of the dialogue system 100 so to request the route guidance to the corresponding repair shop. Although the driver does not give a detail instruction related to the reservation of the repair shop, the dialogue system 100 may recognize an intention of the user and output an utterance (S3: make the reservation B repair shop for changing the engine) confirming a process of the reservation.

As mentioned above, when a user refers to the preliminary indication of the failure in the vehicle, the dialogue system 100 may search for a solution, suggest the solution, and suggest a detail alternative for the diagnosis of the vehicle, to the driver so that the dialogue system 100 may provide the service that is desired by the driver.

Figure 6:
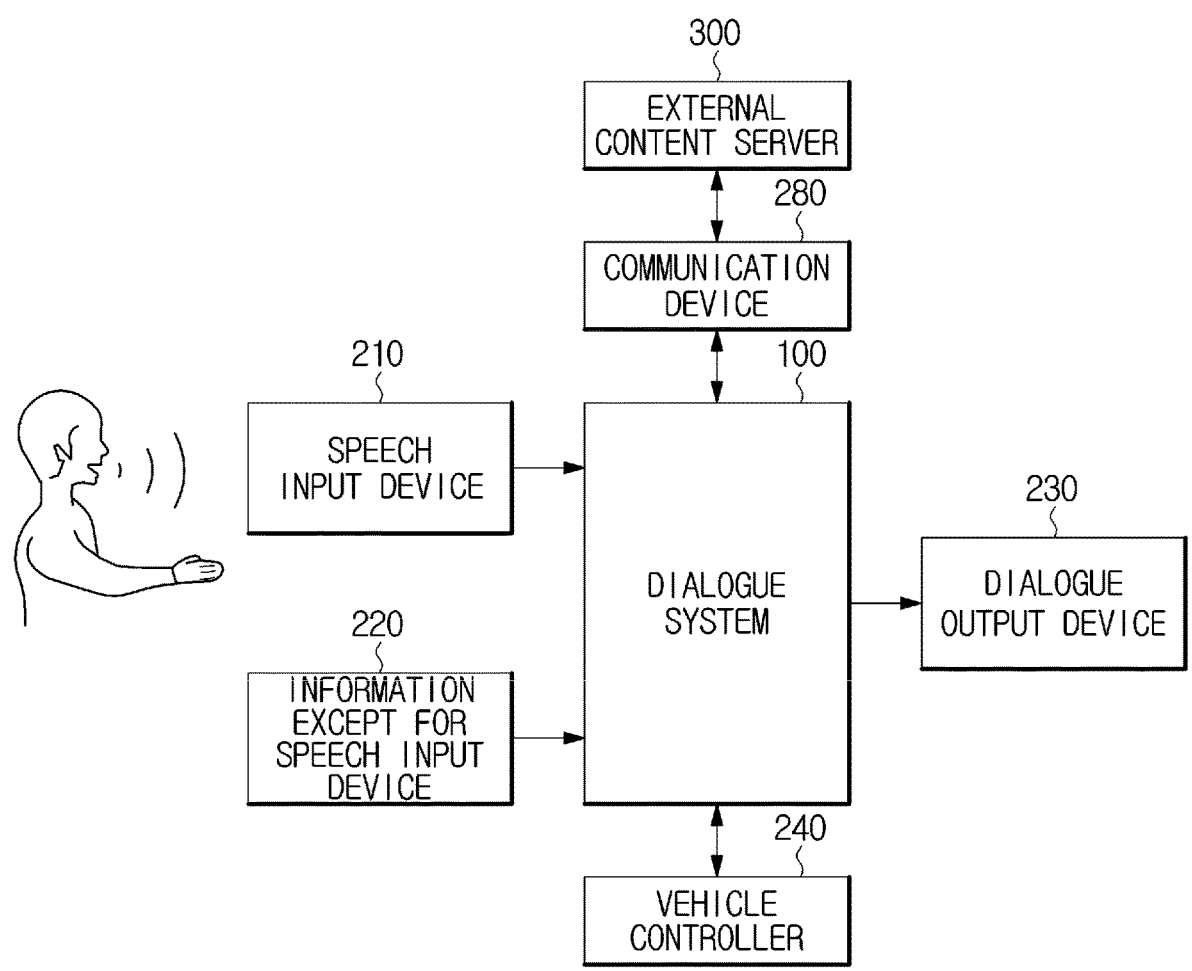
FIGS. 6 and 7 are control block diagrams schematically illustrating a connection between the dialogue system and components of the vehicle.
Figure 7:
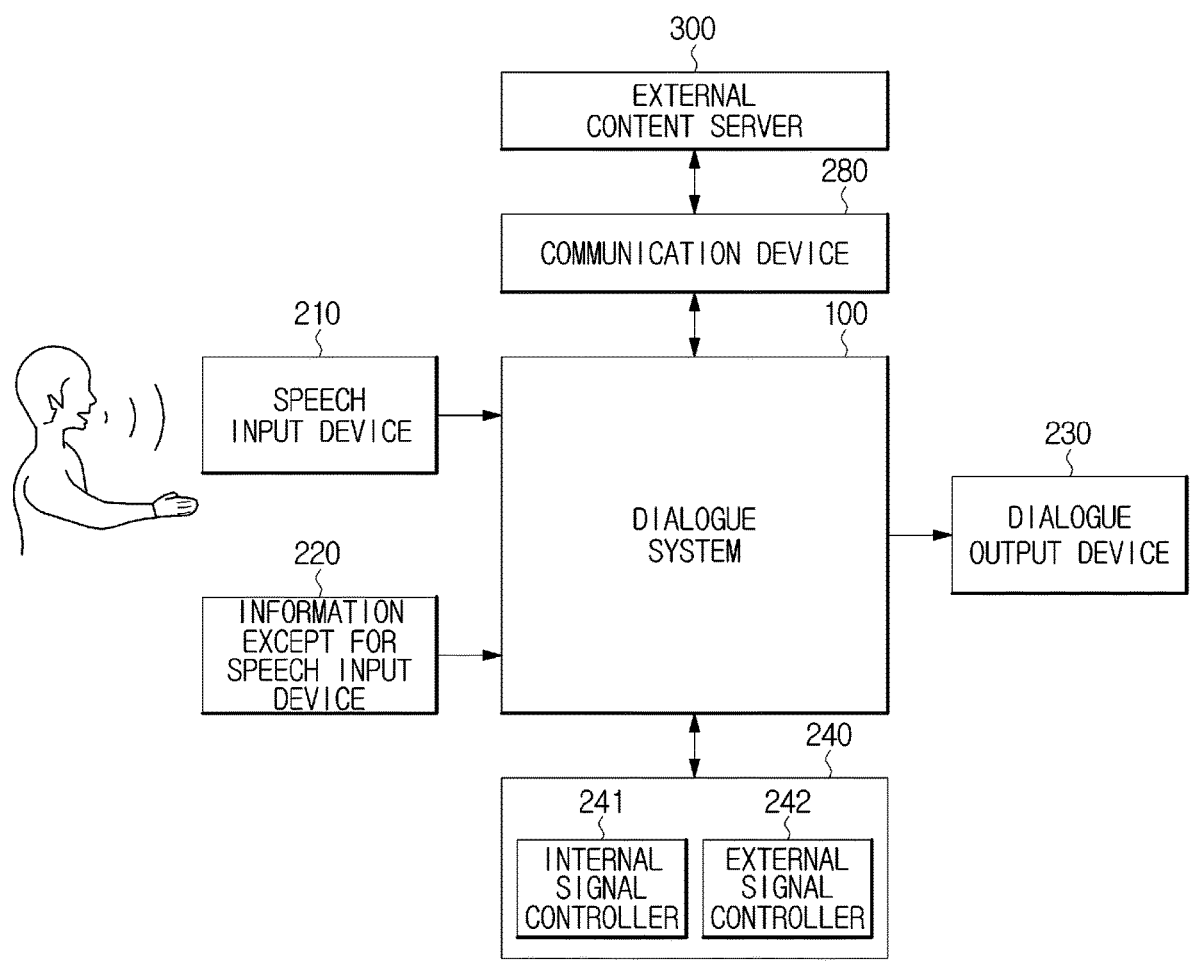

FIGS. 6 and 7 are control block diagrams schematically illustrating a connection between the dialogue system and the components of the vehicle.

Referring to FIG. 6, a user's speech input to the dialogue system 100 may input via the speech input device 210 provided in the vehicle 200. As illustrated in FIG. 2, the speech input device 210 may include a microphone provided inside of the vehicle 200.

The input except for the speech in the user input may be input through an information except for speech input device 220. The information except for speech input device 220 may include an input button 221 and 223 and the jog shuttle 225 for receiving a command through the operation of the user.

The information except for speech input device 220 may include a camera imaging a user. Through an image imaged by the camera, it is possible to recognize a user's gesture, expression or sight direction which is used as a tool of command input. Alternatively, it is possible to recognize the user's state (drowsy state, etc.) through the image imaged by the camera.

Information related to the vehicle may be input into the dialogue system 100 via a vehicle controller 240. Information related to the vehicle may include vehicle state information or surroundings environment information acquired by a variety of sensors provided in the vehicle 200, and information which is initially stored in the vehicle 200, e.g. the fuel type of the vehicle.

The dialogue system 100 may recognize the user's intention and context using the user's speech input via the speech input device 210, the input except for the user's speech, input via the information except for speech input device 220, and a variety of information input via the vehicle controller 240. The dialogue system 100 outputs a response to perform an action corresponding to the user's intention.

A dialogue output device 230 is a device configured to provide an output in a visual, auditory or tactile manner, to a talker. The dialogue output device 230 may include the display 231 and the speaker 232 provided in the vehicle 200. The display 231 and the speaker 232 may output a response to a user's utterance, a question about a user, or information requested by a user, in the visual or auditory manner. In addition, it may be possible to output a vibration by installing a vibrator in the steering wheel 207.

Further, according to the response output from the dialogue system 100, the vehicle controller 240 may control the vehicle 200 to perform an action corresponding to the user's intention or the current situation.

As well as data acquired by the sensor provided in the vehicle, the vehicle 200 may collect information acquired from the external content server 300 or the external device through the communication device 280, and transmit the information to the dialogue system 100, wherein the information may include the similar failure case in the similar vehicle type/the similar vehicle model.

Referring to FIG. 7, the vehicle controller 240 may classify signals into a signal transmitted through the sensor provided in the vehicle and a signal transmitted through a communication with the outside of the vehicle.

More particularly, information acquired by the sensor provided in the vehicle 200, e.g., a remaining amount of fuel, an amount of rain, a rain speed, surrounding obstacle information, a speed, an engine temperature, a tire pressure, current position, may be input to the dialogue system 100 via an internal signal controller 241.

The driving environment information acquired from the outside via Vehicle to Everything (V2X) communication may be input to the dialogue system 100 via an external signal controller 242. The V2X may represent that a vehicle exchanges and shares a variety of useful information, e.g. traffic condition, by communicating with a road infrastructure and other vehicle during driving.

The V2X communication may include Vehicle-to Infrastructure (V2I) communication, Vehicle-to-Vehicle (V2V) communication, and Vehicle-to-Nomadic devices (V2N) communication. Therefore, by using the V2X communication, it may be possible to send and receive information such as traffic information about the front side or an access of another vehicle or risk of collision with another vehicle through the communication directly performed between vehicles or the communication with the infrastructure installed in the road and thus it may be possible to inform a driver of the information.

Therefore, the driving environment information input to the dialogue system 100 via the external signal controller 242 may include traffic information about the front side, access information of adjacent vehicle, collision warning with another vehicle, real time traffic conditions, unexpected conditions, and a traffic flow control state.

Although not shown in the drawings, signals obtained via V2X may also be input to the vehicle 200 via the communication device 280.

The vehicle controller 240 may include a memory in which a program for performing the above-described operation and the operation described later is stored, and a processor for executing the stored program. At least one memory and one processor may be provided, and when a plurality of memory and processors are provided, they may be integrated on one chip or physically separated.

In addition, the internal signal controller 241 and the external signal controller 242 may be implemented by the same processor and memory or by a separate processor and memory.

Figure 8:
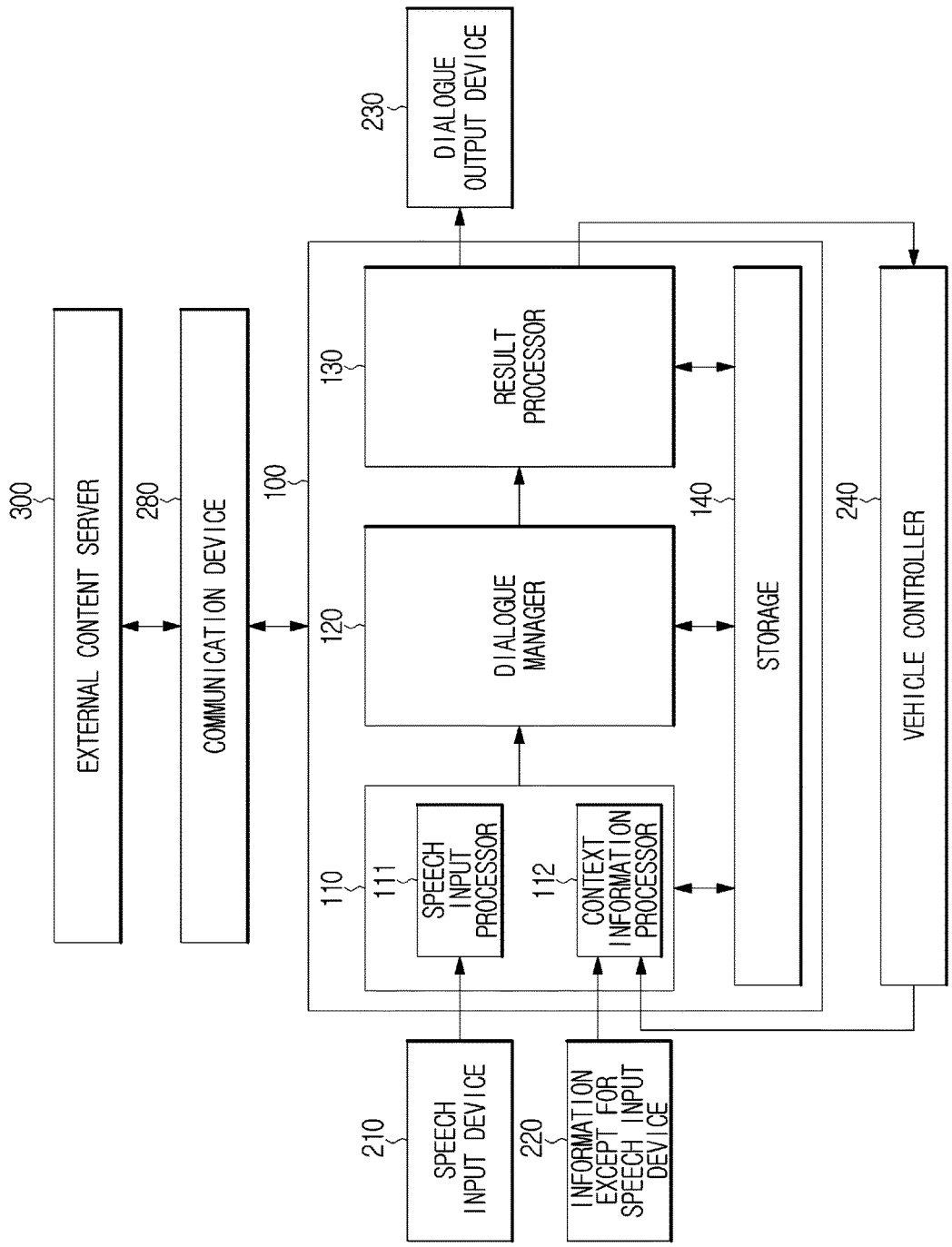
FIGS. 8 and 9 are control block diagrams schematically illustrating a connection between components of the dialogue system and the components of the vehicle.
Figure 9:
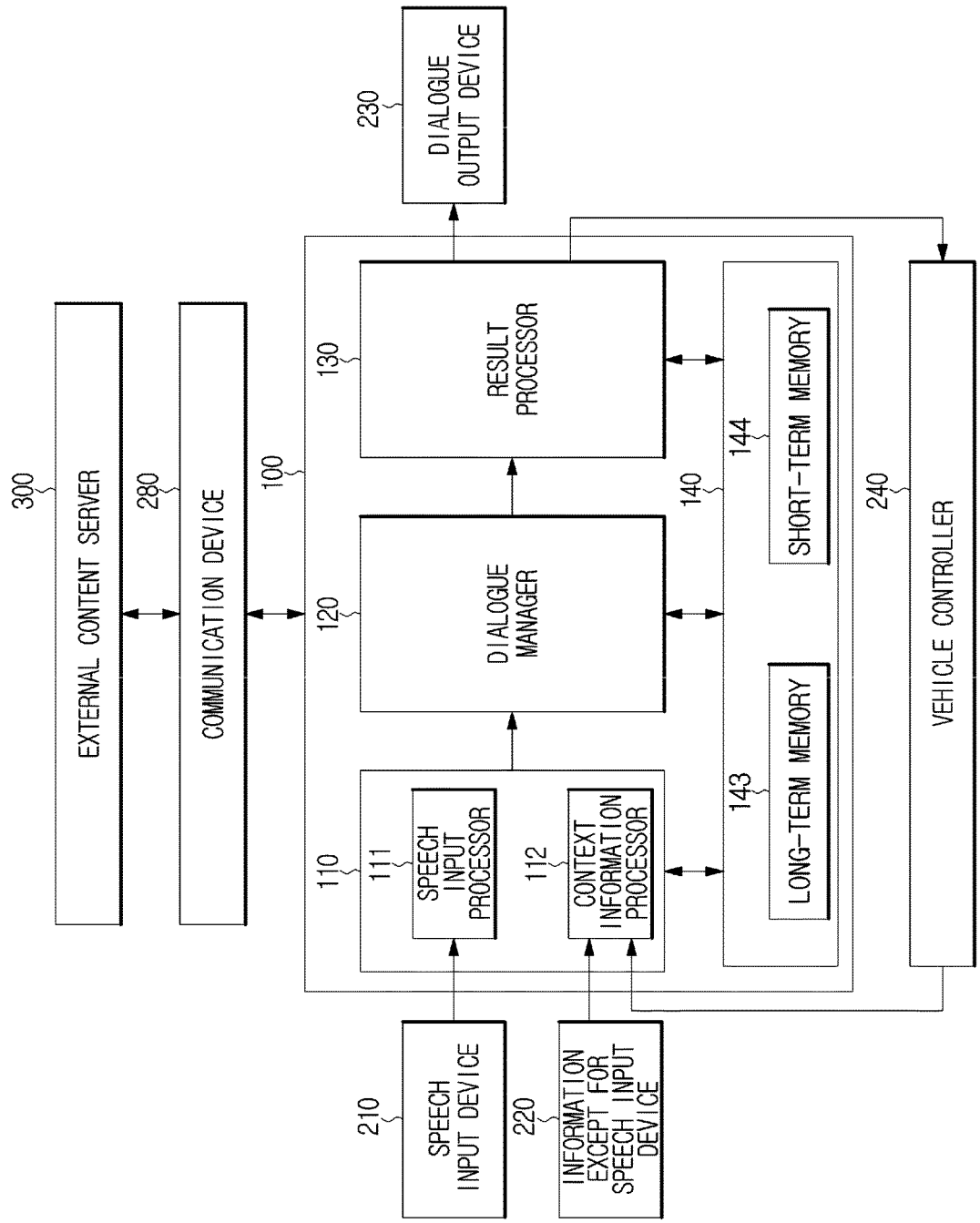

FIGS. 8 and 9 are control block diagrams schematically illustrating a connection between the dialogue system and the components of the vehicle.

Referring to FIG. 8, the user's speech transmitted from the speech input device 210 may be input to a speech input processor 111 provided in the input processor 110, the input except for the user's speech transmitted from the information except for speech input device 220 may be input to a context information processor 112 provided in the input processor 110.

The context information processor 112 understands contexts based on the vehicle state information, the driving environment information and the user information. The dialogue system 100 may precisely recognize the user's intention or efficiently find out a service needed for the user, by identifying the context.

A response output from the result processor 130 may input to the dialogue output device 230 or the vehicle controller 240 to allow the vehicle 200 to provide the service needed for the user. In addition, the response may be transmitted to the external content server 300 to request the needed service.

The vehicle state information, the driving environment information and the user information transmitted from the vehicle controller 240 may be stored in the storage 140.

Referring to FIG. 9, the storage 140 may include a long-term memory 143 and a short-term memory 144. Data stored in the storage 140 may be classified into the short term memory and the long term memory according to the importance and the persistence of the data, and the designer's intention.

The short-term memory 144 may store the dialogue that is previously performed. The previous dialogue may be a dialogue performed within a reference time from the current. Alternatively, the dialogue may be continuously stored until the capacity of the utterance content between the user and the dialogue system 100 becomes a reference value.

For example, when a user utters "brake is stiff", the dialogue system 100 may request search for information on problems in the brake from the vehicle type/the vehicle model which are similar with the vehicle that is currently driven by the user, and search for the maintenance history of the current vehicle through the external content server 300. The external content server 300 may provide a search result indicating that the brake pedal needs to be changed. When the user agrees with the search result, the short-term memory 144 may store information about the state of the vehicle and dialogue about the solution Alternatively, not only the entire dialogue contents are stored, but also specific information contained in the dialogue contents may be stored. For example, it is also possible that a solution to the change of the brake pedal that is, a dialogue about a repair shop guidance dialogue, is stored in the short-term memory 144 or the long-term memory 143.

For example, the dialogue system 100 may suggest the replacement of the brake pedal while suggesting the repair shop guidance. When the user utters "Yes, go to the nearby repair shop", the dialogue system 100 may search for a nearby repair shop from the current location of the user and output a response "guide to A repair shop".

The long-term memory 143 may store data according to the presence of the persistence of the data. For example, the long-term memory 143 may determine that the persistence of the data such as position of interest (POI) information, e.g., family and friend telephone numbers and home or company, and user preferences for certain parameters is secured and then store the data therein. In contrast, when it is determined that the persistence of the data is not secured, the data may be stored in the short-term memory 144.

For example, the current location of the user may be a temporary data and thus stored in the short-term memory 144 and the user's preference for the restaurant may be a persistent data which is available later and thus stored in the long-term memory 143.

In addition, the dialogue system 100 may proactively provide service and information to the user using the data stored in the long-term memory 143 and the short-term memory 144.

For example, in the long-term memory 143, information on the user's preferred repair shop may be stored. The dialogue system 100 may obtain a solution about the problem in the vehicle from the external content server 300, and then provide the user with information such as "Would you like to guide you to your favorite B repair shop to change the brake pedal"?

In addition, the information on the checklist of the vehicle may be stored in the short-term memory 144 in the check list of the vehicle. The dialogue system 100 analyzes the personal maintenance history of the vehicle received from the external contents server 300 and stored in the short term memory 144, and provided information such as "the replacement of engine oil is required. According to the diagnosis history, the engine oil replacement time is Sep. 1, 2017."

Figure 10:
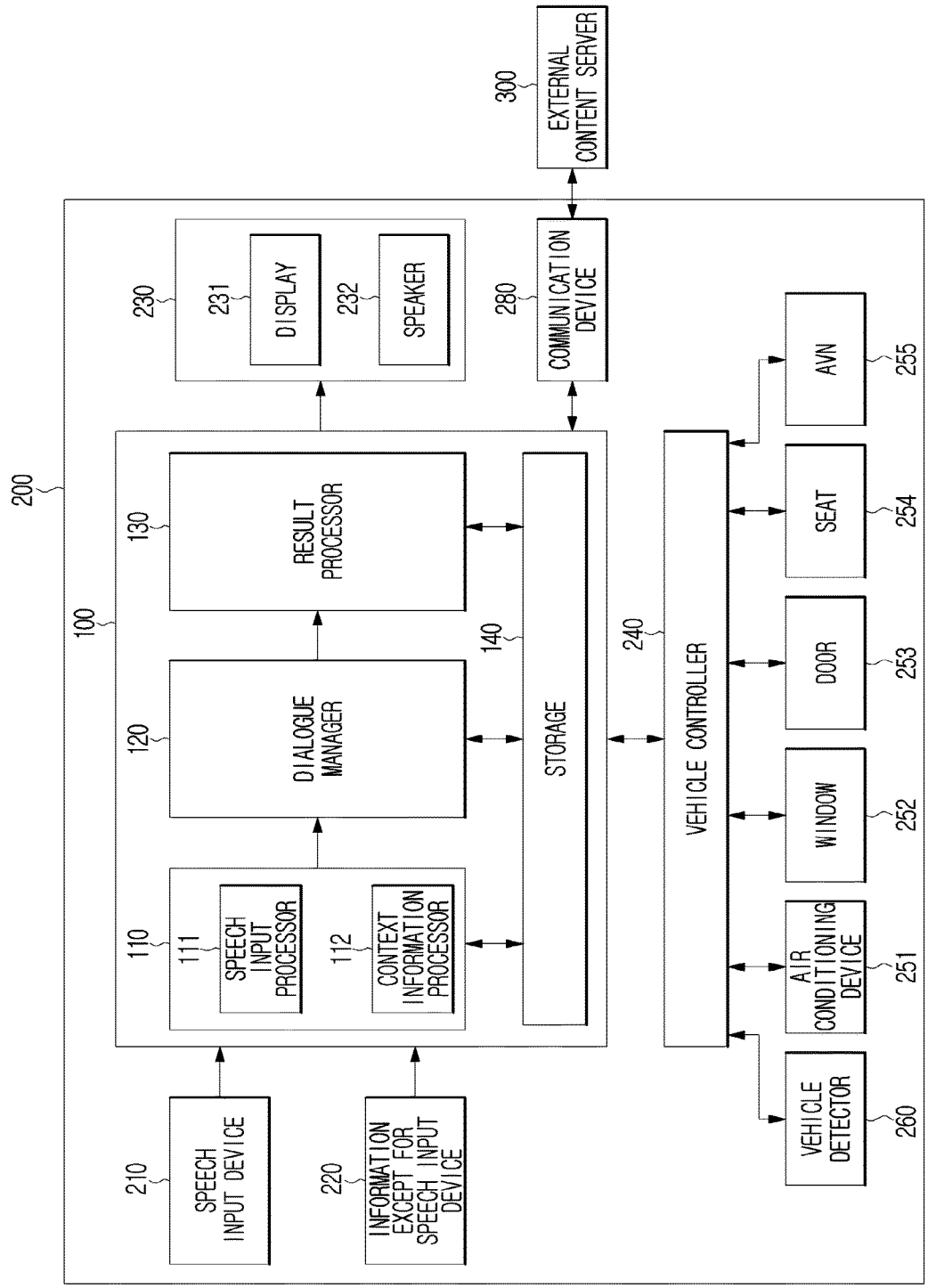
FIG. 10 is a control block diagram illustrating a vehicle independent method in which a dialogue system is provided in a vehicle.

FIG. 10 is a control block diagram illustrating a vehicle independent method in which a dialogue system is provided in a vehicle.

According to the vehicle independent method, the dialogue system 100 having the input processor 110, the dialogue manager 120, the result processor 130 and the storage 140 may be contained in the vehicle 200, as illustrated in FIG. 10.

When the dialogue system 100 is contained in the vehicle 200, the vehicle 200 may process dialogue with a user, by itself and provide a service needed for the user. However, the information needed for the dialogue processing and service provision may be brought from the external content server 300.

The vehicle state information or the driving environment information, e.g., an remaining amount of fuel, an amount of rain, a rain speed, surrounding obstacle information, a speed, an engine temperature, a tire pressure, current position, which is detected by a vehicle detector 260 may be input to the dialogue system 100 via the vehicle controller 240.

According to a response output from the dialogue system 100, the vehicle controller 240 may control the air conditioning device 251, the window 252, the door 253, the seat 254 or the AVN 255 provided in the vehicle 200.

For example, when the dialogue system 100 determines that the user's intention or the service needed for the user is to lower the temperature inside the vehicle 200 and then generates and outputs a corresponding command, the vehicle controller 240 may lower the temperature inside the vehicle 200 by controlling the air conditioner 251.

For another example, when the dialogue system 100 determines that the user's intention or the service needed for the user is to raise the driver's seat window 252a and generates and outputs a corresponding command, the vehicle controller 240 may raise the driver's seat window 252a by controlling the window 252.

For another example, when the dialogue system 100 determines that the user's intention or the service needed for the user is to guide a route to a certain destination and generates and outputs a corresponding command, the vehicle controller 240 may perform a route guidance by controlling the AVN 255. As needed, the communication device 280 may bring map data, and POI information from the external content server 300 and then use the information for the service provision.

Figure 11:
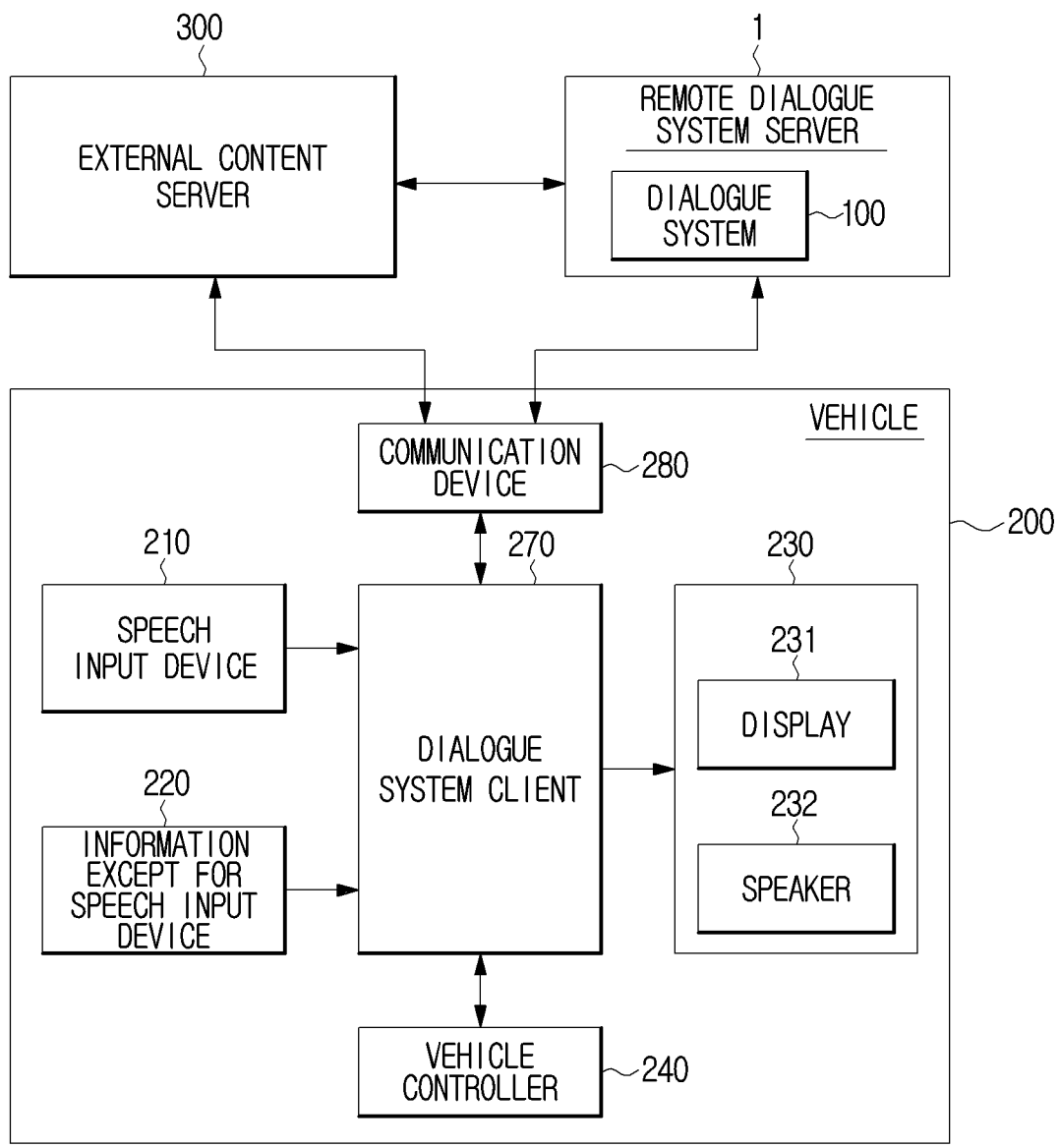
FIGS. 11 and 12 are control block diagrams illustrating a vehicle gateway method in which a dialogue system is provided in a remote server and a vehicle acts as a gateway connecting a user to the dialogue system.
Figure 12:
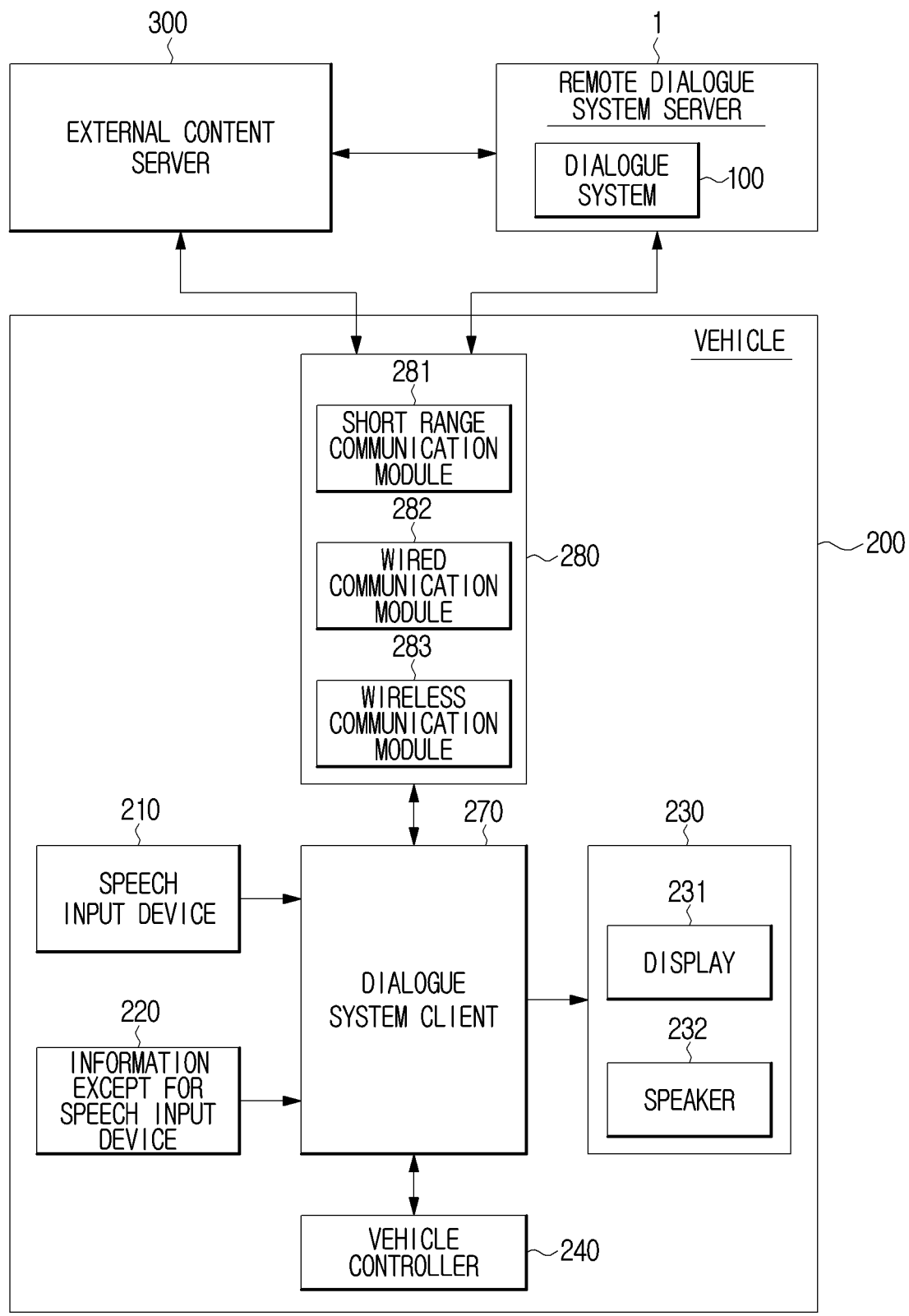

FIGS. 11 and 12 are control block diagrams illustrating a vehicle gateway method in which a dialogue system is provided in a remote server and a vehicle acts as a gateway connecting a user to the dialogue system.

According to the vehicle gateway method, as illustrated in FIG. 11, a remote dialogue system server 1 may be provided in the outside of the vehicle 200, and a dialogue system client 270 connected via the remote dialogue system server 1 and the communication device 280 may be provided in the vehicle 200. The communication device 280 serves as a gateway for connecting the vehicle 200 and the remote dialogue system server 1.

The dialogue system client 270 may serve as an interface connected to an input/output device and perform collecting, and sending and receiving data.

When the speech input device 210 and the information except for speech input device 220 provided in the vehicle 200 receive a user's input and transmit the user input to the dialogue system client 270, the dialogue system client 270 may transmit the input data to the remote dialogue system server 1 via the communication device 280.

The vehicle controller 240 may also transmit data detected by the vehicle detector 260 to the dialogue system client 270 and the dialogue system client 270 may transmit the data detected by the vehicle detector 260 to the remote dialogue system server 1 via the communication device 280.

Since the above mentioned dialogue system 100 is provided in the remote dialogue system server 1, the remote dialogue system server 1 may perform all of input data processing, dialogue processing based on the result of the input data processing, and result processing based on the result of the dialogue processing.

In addition, the remote dialogue system server 1 may bring information or content needed for the input data processing, the dialogue management, or the result processing, from the external content server 300.

According to a response transmitted from the remote dialogue system server 1, the vehicle 200 may bring information or content for the service needed for the user from the external content server 300.

Referring to FIG. 12, the communication device 280 may include at least one communication module configured to communicate with an external device. For example, the communication device 280 may include at least one of a short range communication module 281, a wired communication module 282, or a wireless communication module 283.

The short-range communication module 281 may include a variety of short range communication modules, which is configured to transmit and receive a signal using a wireless communication module in the short range, e.g., Bluetooth module, Infrared communication module, Radio Frequency Identification (RFID) communication module, Wireless Local Access Network (WLAN) communication module, NFC communications module, and ZigBee communication module.

The wired communication module 282 may include a variety of wired communication module, e.g., Local Area Network (LAN) module, Wide Area Network (WAN) module, or Value Added Network (VAN) module and a variety of cable communication module, e.g., Universal Serial Bus (USB), High Definition Multimedia Interface (HDMI), Digital Visual Interface (DVI), recommended standard 232 (RS-232), power line communication or plain old telephone service (POTS).

The wireless communication module 283 may include a wireless communication module supporting a variety of wireless communication methods, e.g., Wifi module, Wireless broadband module, global System for Mobile (GSM) Communication, Code Division Multiple Access (CDMA), Wideband Code Division Multiple Access (WCDMA), Time Division Multiple Access (TDMA), Long Term Evolution (LTE), 4G and 5G.

In addition, the communication device 280 may further include an internal communication module (not shown) for communication between electronic devices in the vehicle 200. The communication protocol of the vehicle 200 may use Controller Area Network (CAN), Local Interconnection Network (LIN), FlexRay, and Ethernet.

The dialogue system 100 may send and receive data to and from the external content server 300 or the remote dialogue system server 1 via the wireless communication module 283. The dialogue system 100 may perform the V2X communication using the wireless communication module 283. In addition, using the short range communication module 281 or the wired communication module 282, the dialogue system 100 may send and receive data to and from a mobile device connected to the vehicle 200.

Figure 13:
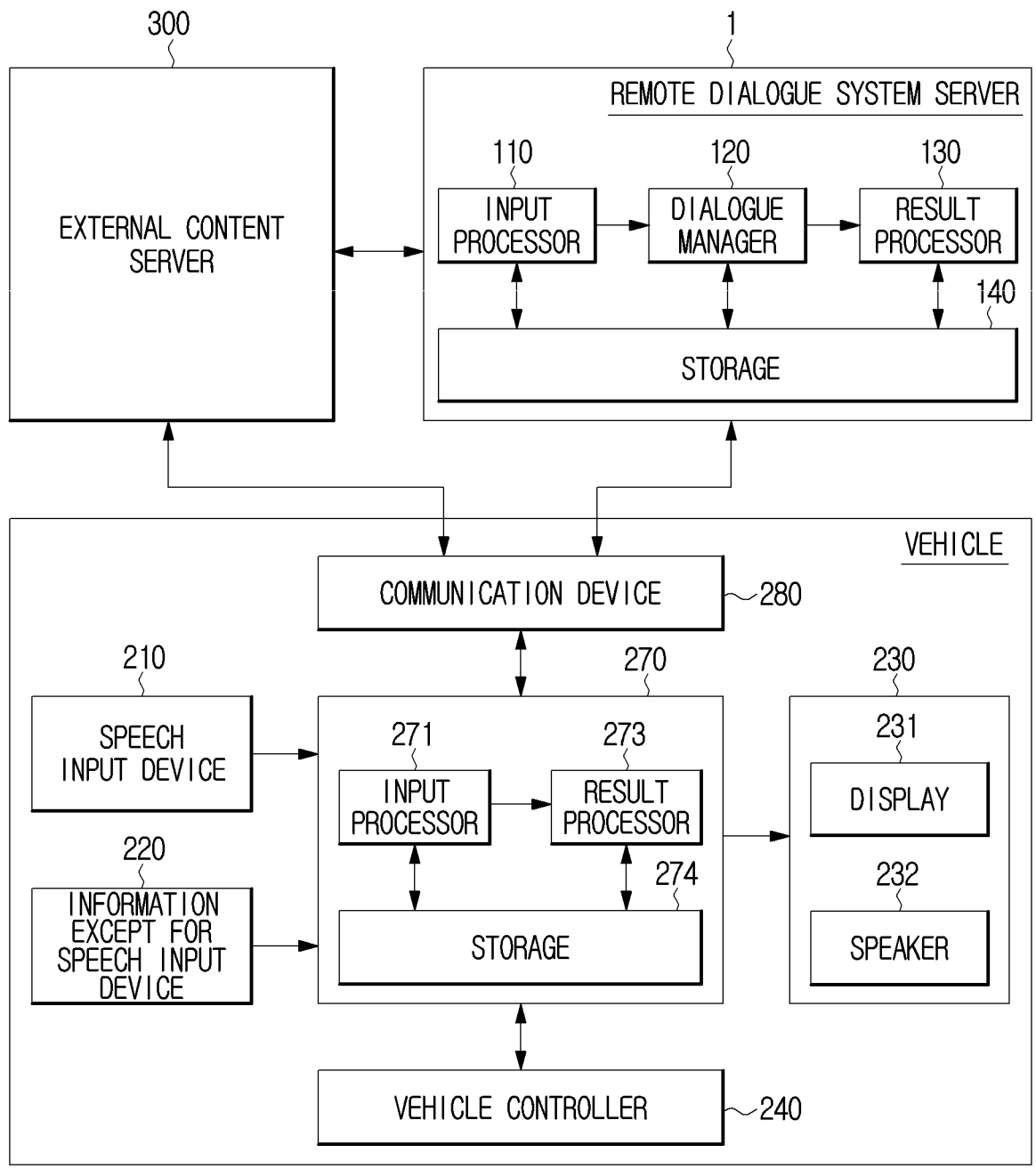
FIG. 13 is a control block diagram illustrating a case in which the vehicle can perform some input processing and output processing in the vehicle gateway method.

FIG. 13 is a control block diagram illustrating a case in which the vehicle can perform some input processing and output processing in the vehicle gateway method.

As mentioned above, the dialogue system client 270 of the vehicle 200 may only collect and send and receive the data but the dialogue system client 270 may process data input from the user or the vehicle or perform a processing related to the service provision that is determined to be needed to the user, since an input processor 271, a result processor 273 and a storage 274 are contained in the dialogue system client 270, as illustrated in FIG. 13. That is, the operation of the input processor 110 and the result processor 130 may be performed by not only the remote dialogue system server 1 but also the vehicle 200.

In this case, the dialogue system client 270 may perform all or some operation of the input processor 110. The dialogue system client 270 may perform all or some operation of the result processor 130.

The task sharing between the remote dialogue system server 1 and the dialogue system client 270 may be determined in consideration of the capacity of the data to be processed and the data processing speed.

Figure 14:
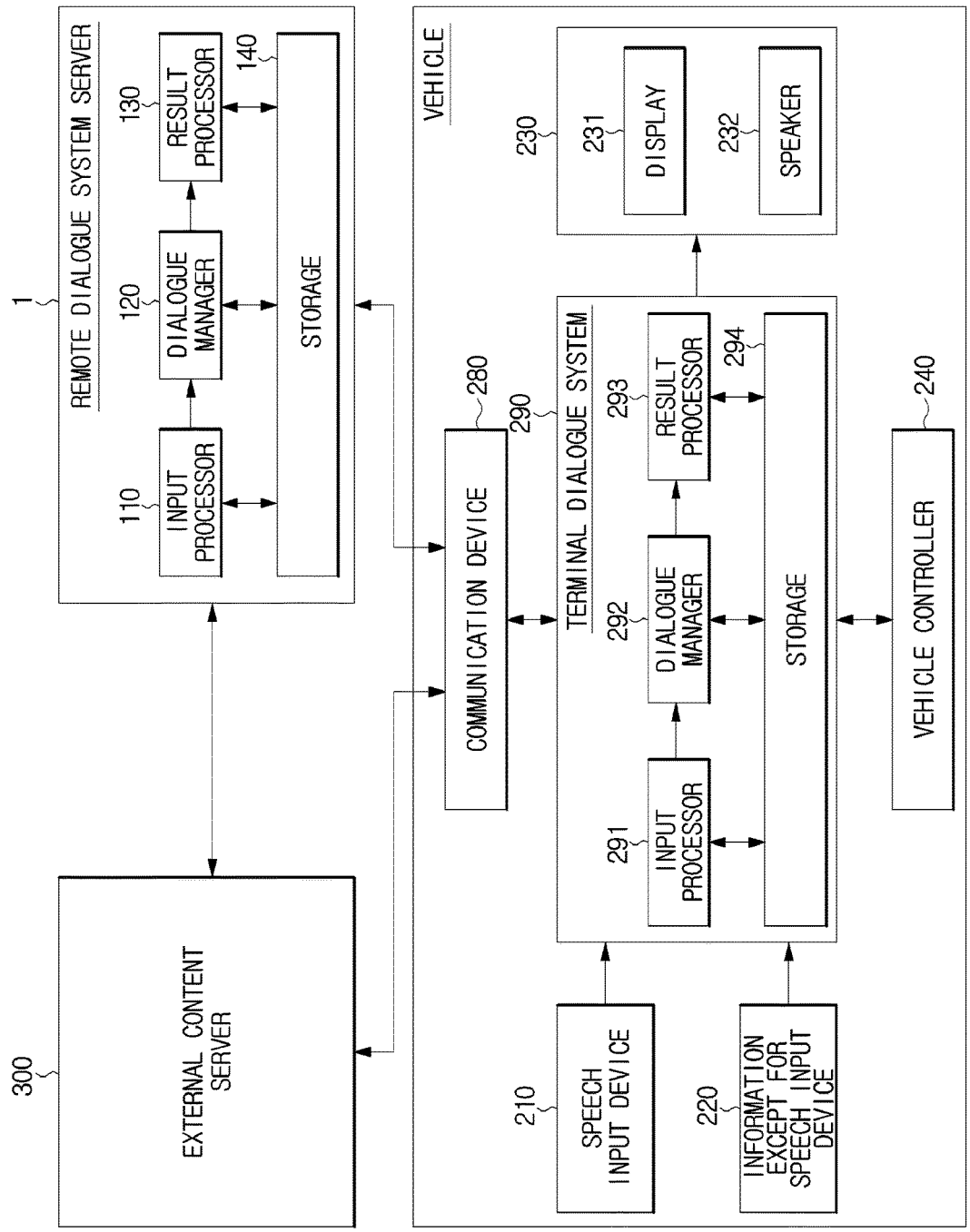
FIG. 14 is a control block diagram illustrating a hybrid method in which both of a remote dialogue system server and a vehicle perform a dialogue processing.

FIG. 14 is a control block diagram illustrating a hybrid method in which both of a remote dialogue system server and a vehicle perform a dialogue processing.

According to the hybrid method, as illustrated in FIG. 14, since the input processor 110, the dialogue manager 120, the result processor 130 and the storage 140 are provided in the remote dialogue system server 1, the remote dialogue system server 1 may perform the dialogue processing, and since a terminal dialogue system 290 provided with an input processor 291, a dialogue manager 292, a result processor 293 and a storage 294 is provided in the vehicle 200, the vehicle 200 may perform the dialogue processing.

However, there may be difference between a processor and a memory provided in the vehicle 200 and a processor or a memory provided in the remote dialogue system server 1 in the capacity or performance. Accordingly, when the terminal dialogue system 290 is capable of outputting a result by processing all the input data and managing the dialogue, the terminal dialogue system 290 may perform the entire process. Otherwise, it may be possible to request the processing to the remote dialogue system server 1.

Before performing the dialogue processing, the terminal dialogue system 290 may determine whether it is possible to perform the dialogue processing based on the data type, and the terminal dialogue system 290 may directly perform the processing or request the processing to the remote dialogue system server 1 based on the result of the determination.

When an event occurs in which the terminal dialogue system 290 cannot perform the process during performing the dialogue process, the terminal dialogue system 290 may request the processing to the remote dialogue system server 1 while transmitting a result that is processed by itself, to the remote dialogue system server 1.

For example, when the high-performance computing power or the long-term data processing is needed, the remote dialogue system server 1 may perform a dialogue processing and when the real time processing is needed, the terminal dialogue system 290 may perform the dialogue processing. For example, when an instant directing immediate processing occurs and thus it is needed to process the data before the synchronization, it may be set such that the terminal dialogue system 290 firstly processes the data.

In addition, when there is an unregistered talker in the vehicle and thus a user confirmation is desired, the remote dialogue system server 1 may process the dialogue.

Further, when the terminal dialogue system 290 is unable to complete the dialogue processing by itself in a state in which the connection with the remote dialogue system server 1 via the communication device 280 is not allowed, it may be possible to inform a user that the dialogue processing cannot be performed, via the dialogue output device 230.

Data stored in the terminal dialogue system 290 and data stored in the remote dialogue system server 1 may be determined according to the data type or the data capacity. For example, in the case of data having a risk of invasion of privacy because of personal identification, the data may be stored in the storage 294 of the terminal dialogue system 290. In addition, a large amount of data may be stored in the storage 140 of the remote dialogue system server 1, and a small amount of data may be stored in the storage 294 of the terminal dialogue system 290. Alternatively, a small amount of data may be stored in both of the storage 140 of the remote dialogue system server 1 and the storage 294 of the terminal dialogue system 290.

Figure 15:
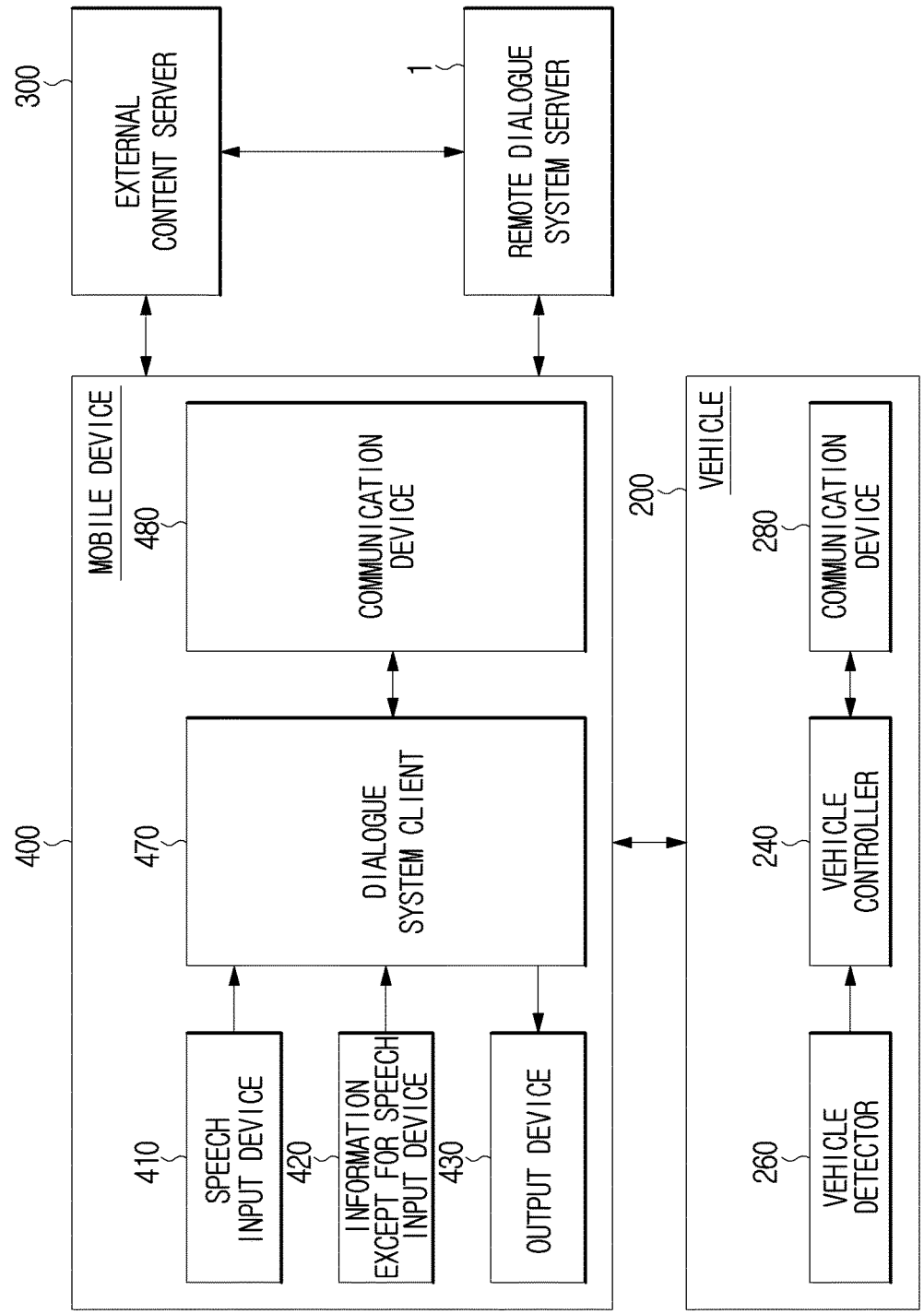
FIGS. 15 and 16 are control block diagrams illustrating a mobile gateway method in which a mobile device connected to a vehicle connects a user to a remote dialogue system server.
Figure 16:
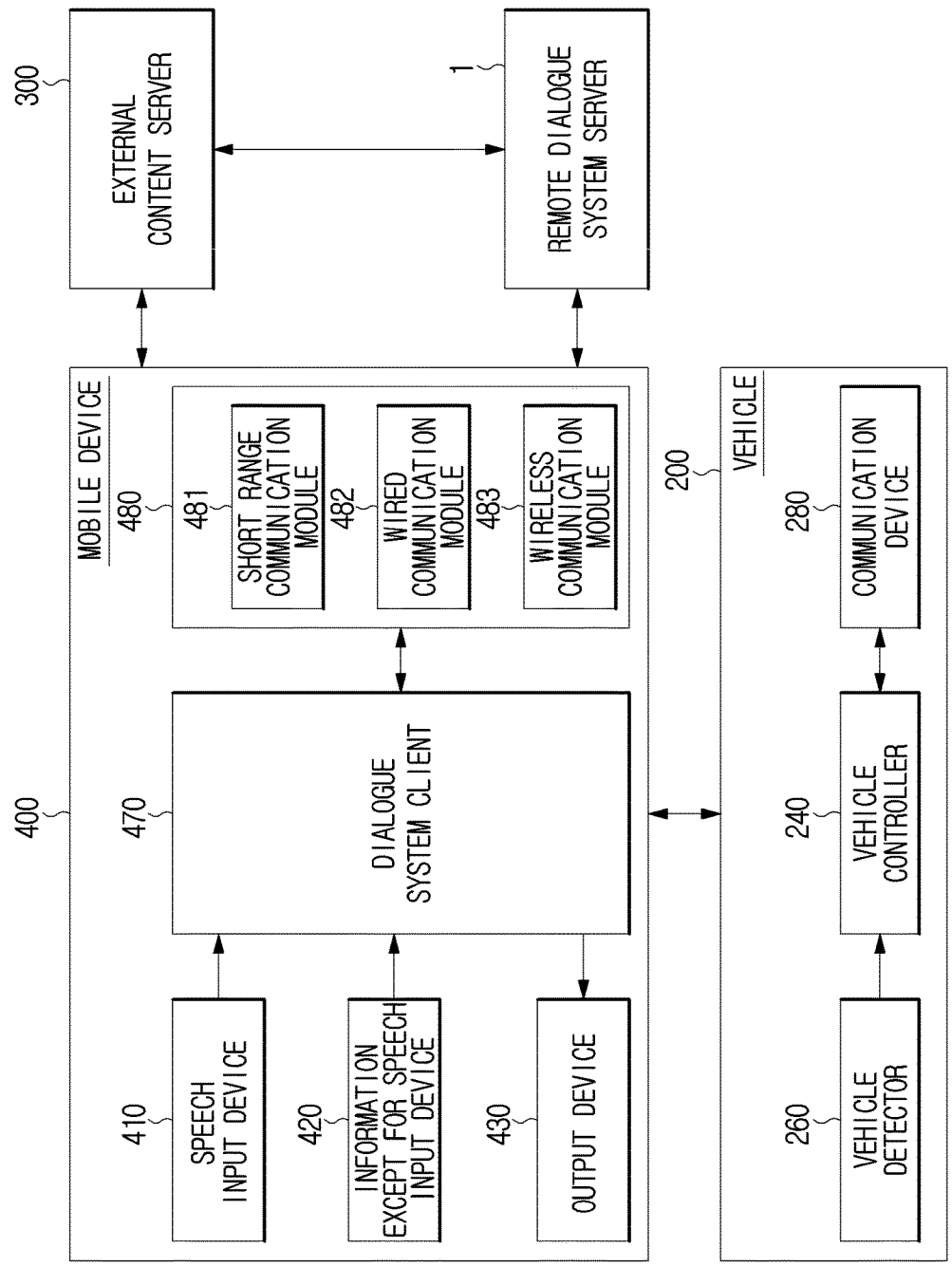

FIGS. 15 and 16 are control block diagrams illustrating a mobile gateway method in which a mobile device connected to a vehicle connects a user to a remote dialogue system server.

According to the mobile gateway method, as illustrated in FIG. 15, the mobile device 400 may receive the vehicle state information and the driving environment information, etc. from the vehicle 200, and transmit the user input and the vehicle state information to the remote dialogue system server 1. That is, the mobile device 400 may act as a gateway connecting a user to the remote dialogue system server 1 or connecting the vehicle 200 to the remote dialogue system server 1.

The mobile device 400 may represent an electronic device that is portable and capable of sending and receiving data to and from an external server and a vehicle by communicating with the external server and vehicle, wherein the mobile device 400 may include a smart phone, a smart watch, a smart glass, a PDA, and a tablet PC.

The mobile device 400 may include a speech input device 410 receiving a user's speech, an except for speech input device 420 receiving an input except for the user' speech, an output device 430 outputting a response in a visual, auditory or tactile manner, a communication device 480 sending and receiving data to and from the remote dialogue system server 1 and the vehicle 200 through the communication, and a dialogue system client 470 collecting input data from a user and transmitting the data to the remote dialogue system server 1 via the communication device 480.

The speech input device 410 may include a microphone receiving sound, converting the sound into an electrical signal and outputting the electrical signal.

The except for speech input device 420 may include an input button, a touch screen or a camera provided in the mobile device 400.

The output device 430 may include a display, a speaker or a vibrator provided in the mobile device 400.

The speech input device 410, the except for speech input device 420 and the output device 430 provided in the mobile device 400 may serve as an input and output interface for a user. In addition, the speech input device 210, the information except for speech input device 220, the speaker output device 230 provided in the vehicle 200 may serve as an input and output interface for a user.

When the vehicle 200 transmits data detected by the vehicle detector 260 and the user input to the mobile device 400, the dialogue system client 470 of the mobile device 400 may transmit the data and the user input to the remote dialogue system server 1.

The dialogue system client 470 may transmit a response or a command transmitted from the remote dialogue system server 1, to the vehicle 200. When the dialogue system client 470 uses the speaker output device 230 provided in the vehicle 200 as the input and output interface for the user, an utterance of the dialogue system 100 or a response to a user's utterance via may be output via the speaker output device 230. When the dialogue system client 470 uses the output device 430 that is provided in the mobile device 400, an utterance of the dialogue system 100 or a response to a user's utterance may be output via the output device 430.

The command for the vehicle control may be transmitted to the vehicle 200 and the vehicle controller 240 may perform a control corresponding to the transmitted command, thereby providing the service needed for the user.

The dialogue system client 470 may collect the input data and transmit the input data to the remote dialogue system server 1. The dialogue system client 470 may also perform all or some function of the input processor 110 and the result processor 130 of the dialogue system 100.

Referring to FIG. 16, the communication device 480 of the mobile device 400 may include at least one communication module configured to communicate with an external device. For example, the communication device 480 may include at least one of a short range communication module 481, a wired communication module 482, or a wireless communication module 483.

The short-range communication module 481 may include a variety of short range communication modules, which is configured to transmit and receive a signal using a wireless communication module in the short range, e.g., Bluetooth module, Infrared communication module, Radio Frequency Identification (RFID) communication module, Wireless Local Access Network (WLAN) communication module, NFC communications module, and ZigBee communication module.

The wired communication module 482 may include a variety of wired communication module, e.g., Local Area Network (LAN) module, Wide Area Network (WAN) module, or Value Added Network (VAN) module and a variety of cable communication module, e.g., Universal Serial Bus (USB), High Definition Multimedia Interface (HDMI), Digital Visual Interface (DVI), recommended standard 232 (RS-232), power line communication or plain old telephone service (POTS).

The wireless communication module 483 may include a wireless communication module supporting a variety of wireless communication methods, e.g., Wifi module, Wireless broadband module, global System for Mobile (GSM) Communication, Code Division Multiple Access (CDMA), Wideband Code Division Multiple Access (WCDMA), Time Division Multiple Access (TDMA), Long Term Evolution (LTE), 4G and 5G.

For example, the mobile device 400 may be connected to the vehicle 200 via the short range communication module 481 or the wired communication module 482, and the mobile device 400 may be connected to the remote dialogue system server 1 or the external content server 300 via the wireless communication module 483.

Figure 17:
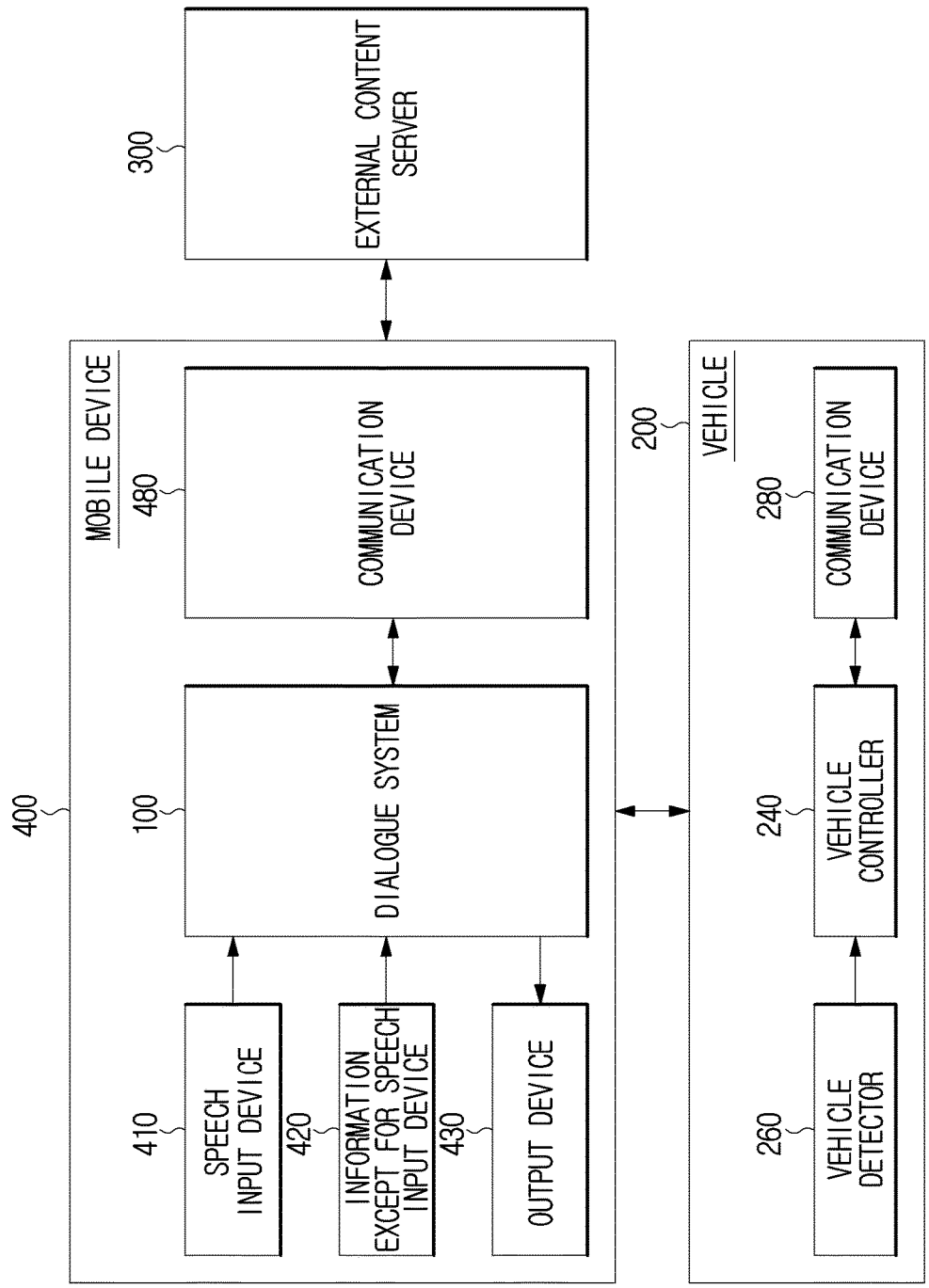
FIG. 17 is a control block diagram illustrating a mobile independent method in which a dialogue system is provided in a mobile device.

FIG. 17 is a control block diagram illustrating a mobile independent method in which a dialogue system is provided in a mobile device.

According to the mobile independent method, as illustrated in FIG. 17, the dialogue system 100 may be provided in the mobile device 400.

Therefore, without being connected to the remote dialogue system server 1 for the dialogue processing, the mobile device 400 may process dialogue with a user and provide a service needed for the user, by itself. However, the mobile device 400 may bring one piece of the information for the dialogue processing and service provision, from the external content server 300.

Hereinafter, a description of the detailed configuration and detailed operation of each component of the dialogue system 100 will be described in detail. According to an aspect described later, for convenience of explanation, it is assumed that the dialogue system 100 is provided in the vehicle 200.

FIGS. 18, 19A to 19C are control block diagrams illustrating a configuration of an input processor in the configuration of the dialogue system in detail.

Figure 18:
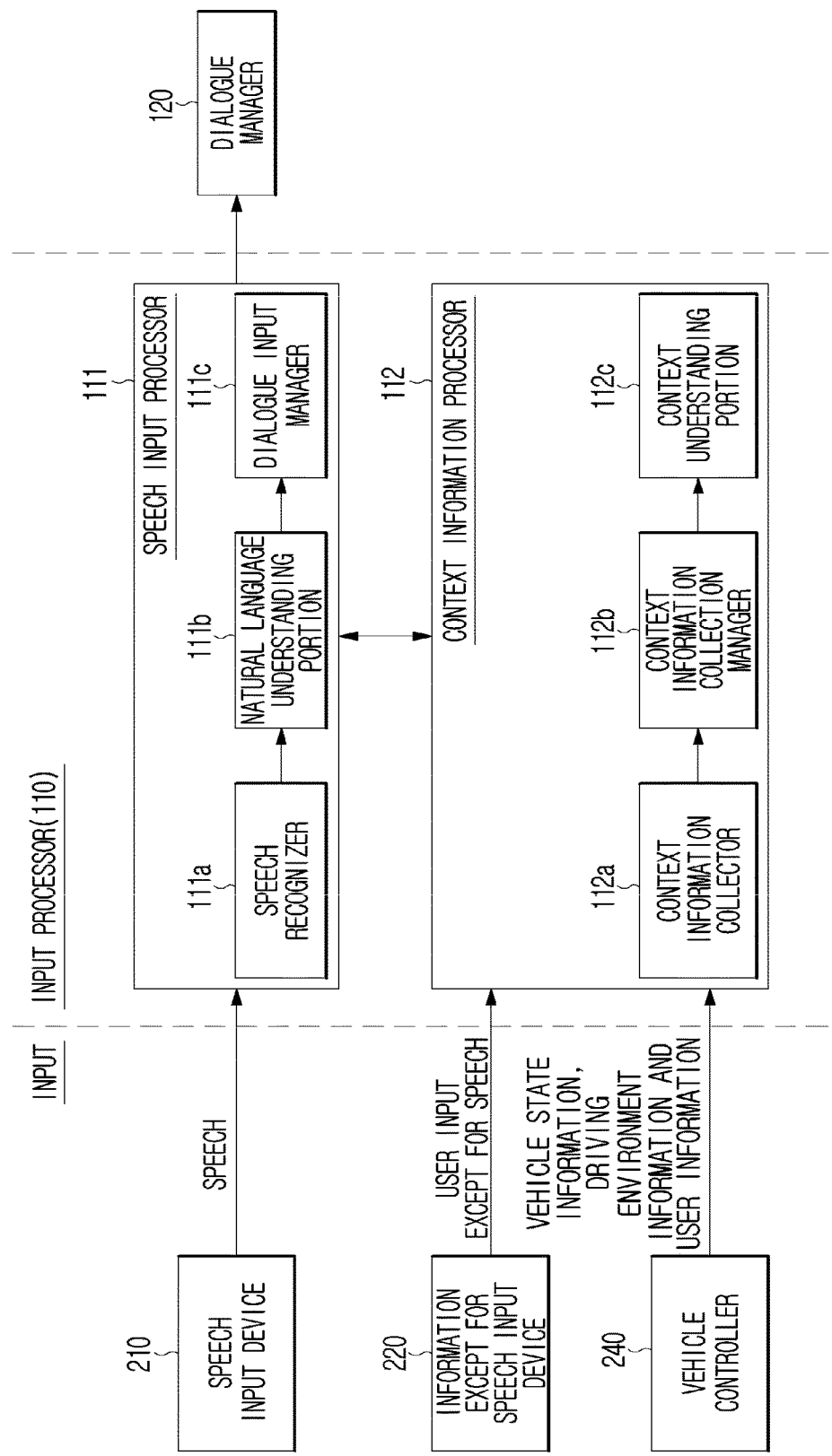
FIGS. 18, 19A to 19C are control block diagrams illustrating a configuration of an input processor in the configuration of the dialogue system in detail.

Referring to FIG. 18, the input processor 110 may include the speech input processor 111 processing the speech input and the context information processor 112 processing the context information.

The user's speech transmitted from the speech input device 210 may be input to the speech input processor 111 and the input except for the user's speech transmitted from the information except for speech input device 220 may be input to the context information processor 112.

The vehicle controller 240 may transmit the vehicle state information, the driving environment information and the user information to the context information processor 112. The driving environment information and the user information may be provided to the external content server 300 or the mobile device 400 connected to or the vehicle 200.

The input except for the speech may be contained in the context information. That is, the context information may include the vehicle state information, the driving environment information and the user information.

The vehicle state information may include information, which indicates the vehicle state and is acquired by a sensor provided in the vehicle 200, and information that is related to the vehicle, e.g., the fuel type of the vehicle, and stored in the vehicle.

The driving environment information may be information acquired by a sensor provided in the vehicle 200. The driving environment information may include image information acquired by a front camera, a rear camera or a stereo camera, obstacle information acquired by a sensor, e.g., a radar, a Lidar, an ultrasonic sensor, and information related to an amount of rain, and rain speed information acquired by a rain sensor.

The driving environment information may further include traffic state information, traffic light information, and adjacent vehicle access or adjacent vehicle collision risk information, which is acquired via the V2X.

The user information may include information related to user state that is measured by a camera provided in the vehicle or a biometric reader, information related to a user that is directly input using an input device provided in the vehicle by the user, information related to a user and stored in the external content server 300, and information stored in the mobile device 400 connected to the vehicle.

The speech input processor 111 may include an speech recognizer 111a outputting an utterance in the text type by recognizing the input user's speech, a natural language understanding portion 111b identifying the user's intention contained in the utterance by applying natural language understanding technology to the user utterance, and a dialogue input manager 111c transmitting a result of the natural language understanding and the context information, to the dialogue manager 120.

The speech recognizer 111a may include a speech recognition engine and the speech recognition engine may recognize a speech uttered by a user by applying a speech recognition algorithm to the input speech and generate a recognition result.

Since the input speech is converted into a more useful form for the speech recognition, the speech recognizer 111a may detect an actual speech section included in the speech by detecting a start point and an end point from the speech signal. This is called End Point Detection (EPD).

The speech recognizer 111a may extract the feature vector of the input speech from the detected section by applying the feature vector extraction technique, e.g., Cepstrum, Linear Predictive Coefficient: (LPC), Mel Frequency Cepstral Coefficient (MFCC) or Filter Bank Energy.

The speech recognizer 111a may acquire the results of recognition by comparing the extracted feature vector with a trained reference pattern. At this time, the speech recognizer 111a may use an acoustic model of modeling and comparing the signal features of a speech, and a language model of modeling a linguistic order relation of a word or a syllable corresponding to a recognition vocabulary. For this, the storage 140 may store the acoustic model and language model DB.

The acoustic model may be classified into a direct comparison method of setting a recognition target to a feature vector model and comparing the feature vector model to a feature vector of a speech signal, and a statistical method of statistically processing a feature vector of a recognition target.

The direct comparison method is setting a unit, such as a word or a phoneme, which is a recognition target, to a feature vector model, and comparing a received speech to the feature vector model to determine similarity between them. A representative example of the direct comparison method is vector quantization. The vector quantization is mapping feature vectors of a received speech signal to a codebook that is a reference model to code the results of the mapping to representative values, and comparing the representative values to each other.

The statistical model method is configuring units of a recognition target as state sequences and using a relationship between the state sequences. Each state sequence may be configured with a plurality of nodes. The method of using the relationship between the state sequences can be classified into Dynamic Time Warping (DTW), Hidden Markov Model (HMM), and a method of using a neural network.

The DTW is a method of compensating for differences in the time axis through comparison to a reference model in consideration of the dynamic feature of speech that the length of a signal varies over time even when the same person utters the same pronunciation. The HMM is a recognition method of assuming a speech as a Markov process having state transition probability and observation probability of nodes (output symbols) in each state, then estimating state transition probability and observation probability of nodes based on learning data, and calculating probability at which a received speech is to be generated from an estimated model.

Meanwhile, the language model of modeling a linguistic order relation of a word, a syllable, etc. may reduce acoustic ambiguity and recognition errors by applying an order relation between units configuring a language to units acquired through speech recognition. The language model may include a statistical language model, and a model based on Finite State Automata (FSA). The statistical language model uses chain probability of a word, such as Unigram, Bigram, and Trigram.

The speech recognizer 111a may use any one of the above-described methods for the speech recognition. For example, the speech recognizer 111a may use an acoustic model to which the HMM is applied, or a N-best search method in which an acoustic model is combined with a speech model. The N-best search method can improve recognition performance by selecting N recognition result candidates or less using an acoustic model and a language model, and then re-estimating an order of the recognition result candidates.

The speech recognizer 111a may calculate a confidence value to provide reliability of a recognition result. A confidence value may be criteria representing how a speech recognition result is reliable. For example, the confidence value may be defined, with respect to a phoneme or a word that is a recognized result, as a relative value of probability at which the corresponding phoneme or word has been uttered from different phonemes or words. Accordingly, a confidence value may be expressed as a value between 0 and 1 or between 1 and 100.

When the confidence value is greater than a predetermined threshold value, the speech recognizer 111a may output the recognition result to allow an operation corresponding to the recognition result to be performed. When the confidence value is equal to or less than the threshold value, the speech recognizer 111a may reject the recognition result.

The utterance in the form of text that is the recognition result of the speech recognizer 111a may be input to the natural language understanding portion 111b.

The natural language understanding portion 111b may identify an intention of user's utterance included in an utterance language by applying the natural language understanding technology. Therefore, the user may input a control command through a natural dialogue, and the dialogue system 100 may also induce the input of the control command and provide a service needed the user via the dialogue.

The natural language understanding portion 111b may perform morphological analysis on the utterance in the form of text. A morpheme is the smallest unit of meaning and represents the smallest semantic element that can no longer be subdivided. Thus, the morphological analysis is a first step in natural language understanding and transforms the input string into the morpheme string.

The natural language understanding portion 111b may extract a domain from the utterance based on the morphological analysis result. The domain may be used to identify a subject of a user utterance language, and the domain indicating a variety of subjects, e.g., route guidance, weather search, traffic search, schedule management, fuel management and air conditioning control, may be stored as a database.

The natural language understanding portion 111b may recognize an entity name from the utterance. The entity name may be a proper noun, e.g., people names, place names, organization names, time, date, and currency, and the entity name recognition may be configured to identify an entity name in a sentence and determine the type of the identified entity name. The natural language understanding portion 111b may extract important keywords from the sentence using the entity name recognition and recognize the meaning of the sentence.

The natural language understanding portion 111b may analyze a speech act contained in the utterance. The speech act analysis may be configured to identify the intention of the user utterance, e.g., whether a user asks a question, whether a user asks a request, whether a user responses or whether a user simply expresses an emotion.

The natural language understanding portion 111b extracts an action corresponding to the intention of the user's utterance. The natural language understanding portion 111b may identify the intention of the user's utterance based on the information, e.g., domain, entity name, and speech act and extract an action corresponding to the utterance. The action may be defined by an object and an operator.

The natural language understanding portion 111b may extract a parameter related to the action execution. The parameter related to the action execution may be an effective parameter that is used for the action execution, or an ineffective parameter that is used to extract the effective parameter.

For example, when a user's utterance is "let's go to nearby repair shop", the natural language understanding portion 111b may extract "navigation" as a domain corresponding to the utterance, and "route guidance" as an action, wherein a speech act corresponds to "request".

The entity name "repair shop" may correspond to [parameter: repair shop] related to the action execution, but a specific name or GPS information may be used to practically guide a route via the navigation system. In this case, [parameter: destination: repair shop] extracted by the natural language understanding portion 111b may be a candidate parameter for searching "repair shop" that is actually desired by the user among a plurality of repair shop POI.

The natural language understanding portion 111b may extract a tool configured to express a relationship between words or between sentences, e.g., parse-tree.

The morphological analysis result, the domain information, the action information, the speech act information, the extracted parameter information, the entity name information and the parse-tree, which is the processing result of the natural language understanding portion 111b may be transmitted to the dialogue input manager 111c.

The context information processor 112 may include a context information collector 112a collecting information from the information except for speech input device 220 and the vehicle controller 240, a context information collection manager 112b managing the collection of the context information, and a context understanding portion 112c understanding context based on the result of the natural language understanding and the collected context information.

The input processor 110 may include a memory in which a program for performing the above-described operation and the operation described later is stored, and a processor for executing the stored program. At least one memory and one processor may be provided, and when a plurality of memory and processors are provided, they may be integrated on one chip or physically separated.

The speech input processor 111 and the context information processor 112 contained in the input processor 110 may be implemented by the same processor and memory or a separate processor and memory.

Hereinafter, a method in which components of the input processor 110 process the input data using information stored in the storage 140 will be described in detail with reference to FIGS. 19A to 19C.

Figure 19A:
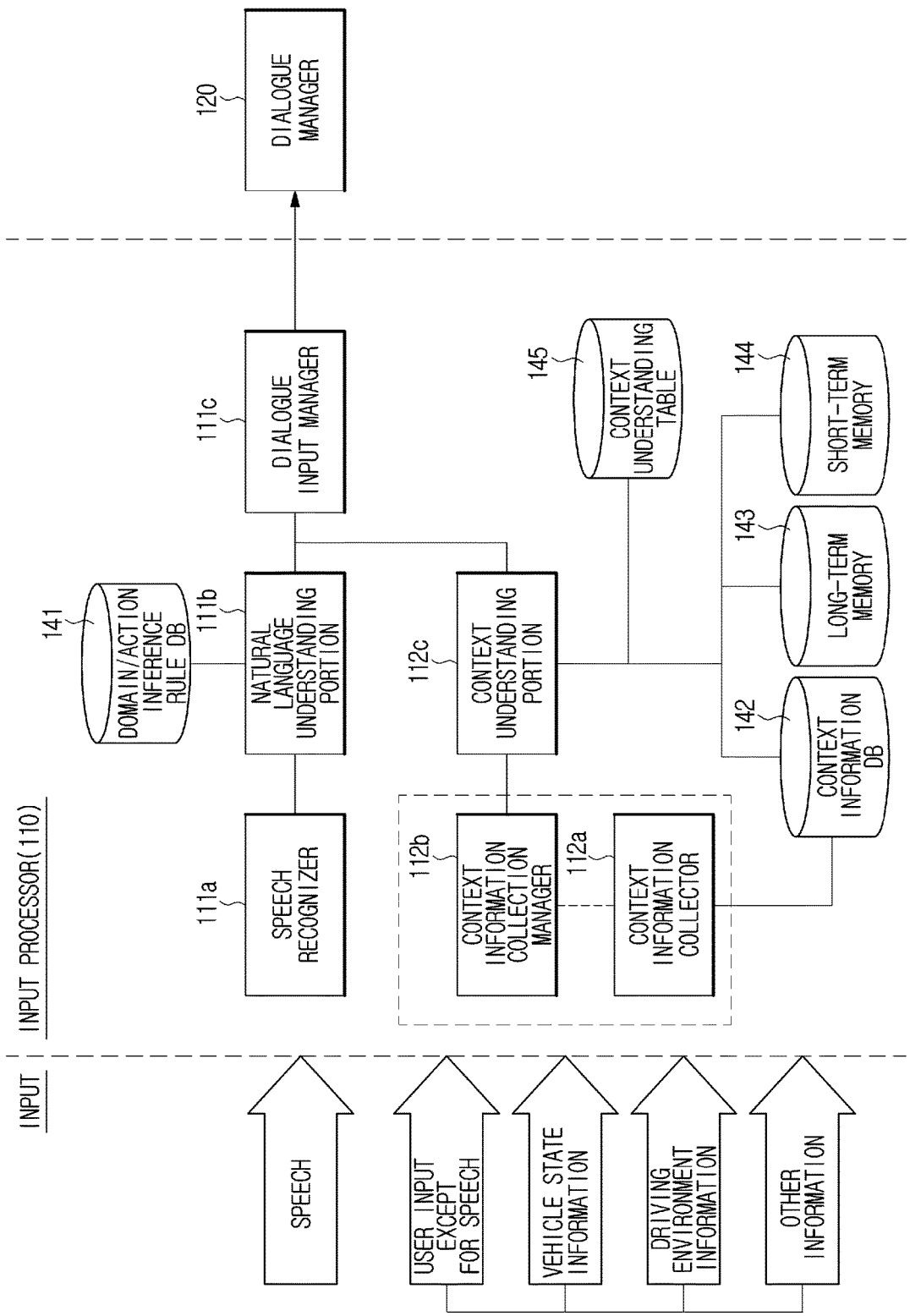

Referring to FIG. 19A, the natural language understanding portion 111b may use the domain/action inference rule DB 141 for the domain extraction, entity recognition, the speech act analysis and the action extraction.

In the domain/action inference rule DB 141, domain extraction rules, speech act analysis rules, entity name conversion rules, action extraction rules may be stored.

Other information such as the user input except for the speech, the vehicle state information, the driving environment information and the user information may be input to the context information collector 112a and then stored in a context information DB 142, the long-term memory 143, or the short-term memory 144.

For example, raw data detected by the vehicle detector 260 may be classified into a sensor type and a senor value and then stored in the context information DB 142. According to an aspect, when a user inputs an utterance about the preliminary indications such as problems in the vehicle 200, the dialogue system 100 may determine whether the vehicle 200 has a problem or not, based on raw data detected by the vehicle detector 260. When the vehicle detector 260 does have a problem, the dialogue system 100 may request search for a solution about the problem in the vehicle, through the external content server 300.

In the short-term memory 144 and long-term memory 143, data that is meaningful to the user may be stored, wherein the data may include the current user state, the user's preference and orientation or data for determining the user's preference and orientation.

As described above, information that provides the persistence and thus is usable in the long term, may be stored in the long-term memory 143, wherein the information may include the user's phone book, schedule, preferences, educational history, personality, job, and information related to family. Information that does not provide the persistence or has uncertainties and thus is usable in the short term may be stored in the short-term memory 144, wherein the information may include the current and previous position, today schedule, the previous dialogue content, dialogue participants, circumstances, domains, and driver state. According to data type, there may be data stored in at least two storages among the context information DB 142, the short-term memory 144 or the long-term memory 143 in duplicate.

In addition, among the information stored in the short-term memory 144, data, which is determined to provide the persistence, may be transmitted to the long-term memory 143.

It may be possible to acquire information to be stored in the long-term memory 143 using information stored in the short-term memory 144 and the context information DB 142. For example, the user's preference may be acquired by analyzing destination information that is stored for certain duration or the dialogue content, and the acquired user's preference may be stored in the long-term memory 143.

By using information stored in the short-term memory 144 or the context information DB 142, it may be performed to obtain information to be stored in the long-term memory 143 in the dialogue system 100, or in an additional external system.

It may possible to perform the former case in the memory manager 135 of the result processor 130. In this case, among the data stored in the short-term memory 144 or the context information DB 142, data used to acquire meaningful information such as solutions related to the preliminary indications (e.g., reservation of repair shop) or the user's preference (e.g., preferred repair shop) or persistent information may be stored in the long-term memory 143 in the log file type. The memory manager 135 may acquire persistent data by analyzing data that is stored for more than certain duration, and re-sore the data in the long-term memory 143. In the long-term memory 143, a location in which the persistent data is stored may be different from a location in which the data stored in the log file type is stored.

The memory manager 135 may determine persistent data among data stored in the short-term memory 144 and move and store the determined data to and in the long-term memory 143.

Figure 19B:
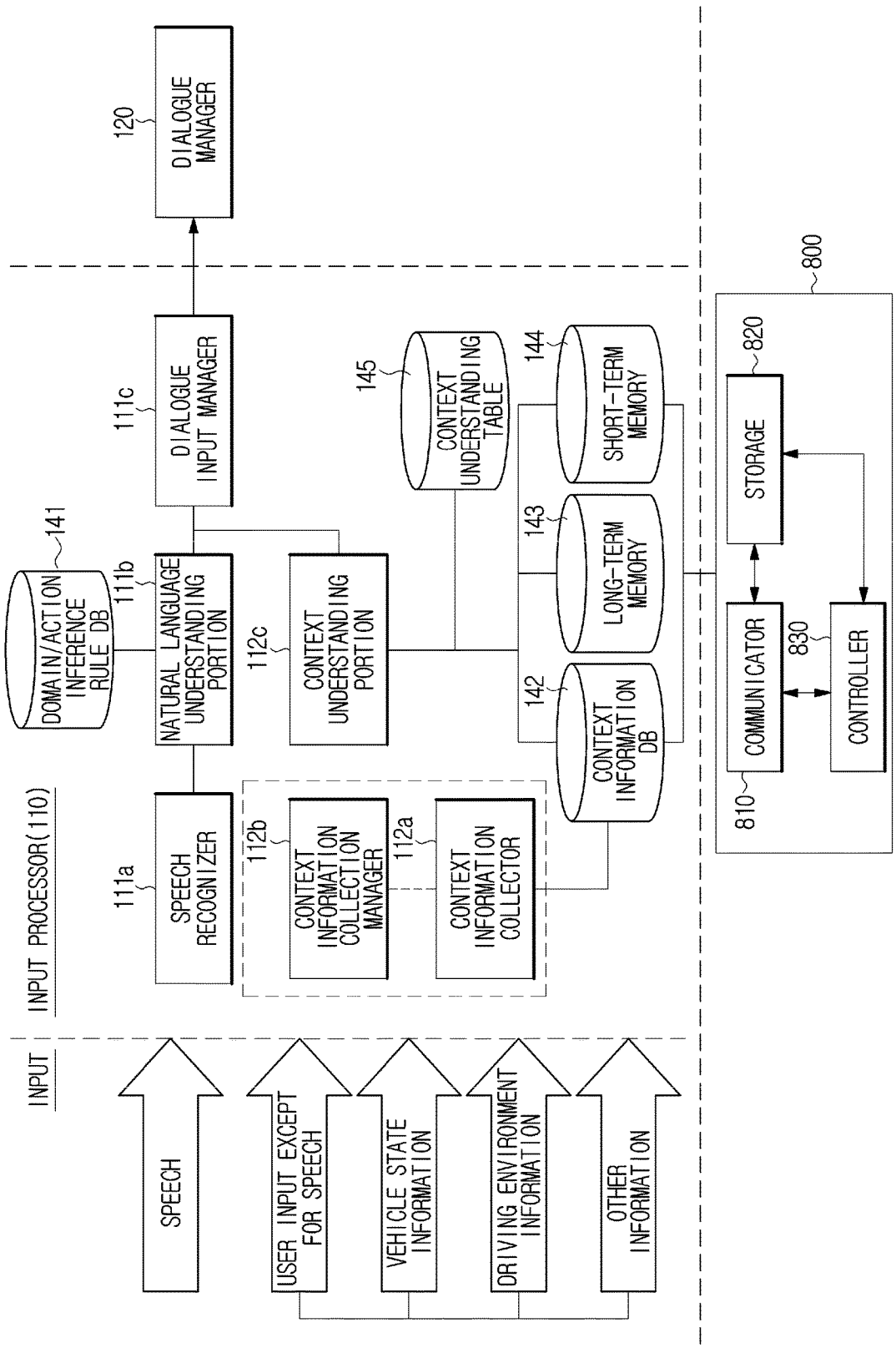

When obtaining information to be stored in the long-term memory 143 using information stored in the short-term memory 144 or the context information DB 142 is performed in the an additional external system, a data management system 800 provided with a communicator 810, a storage 820 and a controller 830 may be used, as illustrated in FIG. 19B.

The communicator 810 may receive data stored in the context information DB 142 or the short-term memory 144. All data stored may be transmitted to the communicator 810 or the data used to acquire meaningful information, e.g., the user's preference or orientation or persistent information may be selected and then transmitted. The received data may be stored in the storage 820.

The controller 830 may acquire the persistent data by analyzing the stored data and then transmit the acquired data to the dialogue system 100 via the communicator 810. The transmitted data may be stored in the long-term memory 143 of the dialogue system 100.

In addition, the dialogue input manager 111*c* may acquire context information related to the action execution by transmitting the result of the output of the natural language understanding portion 111*b* to the context understanding portion 112*c*.

The context understanding portion 112*c* may determine which context information is related to the action execution corresponding to the intention of the user's utterance, by referring to context information that is stored according to the action in a context understating table 145.

Figure 19C:
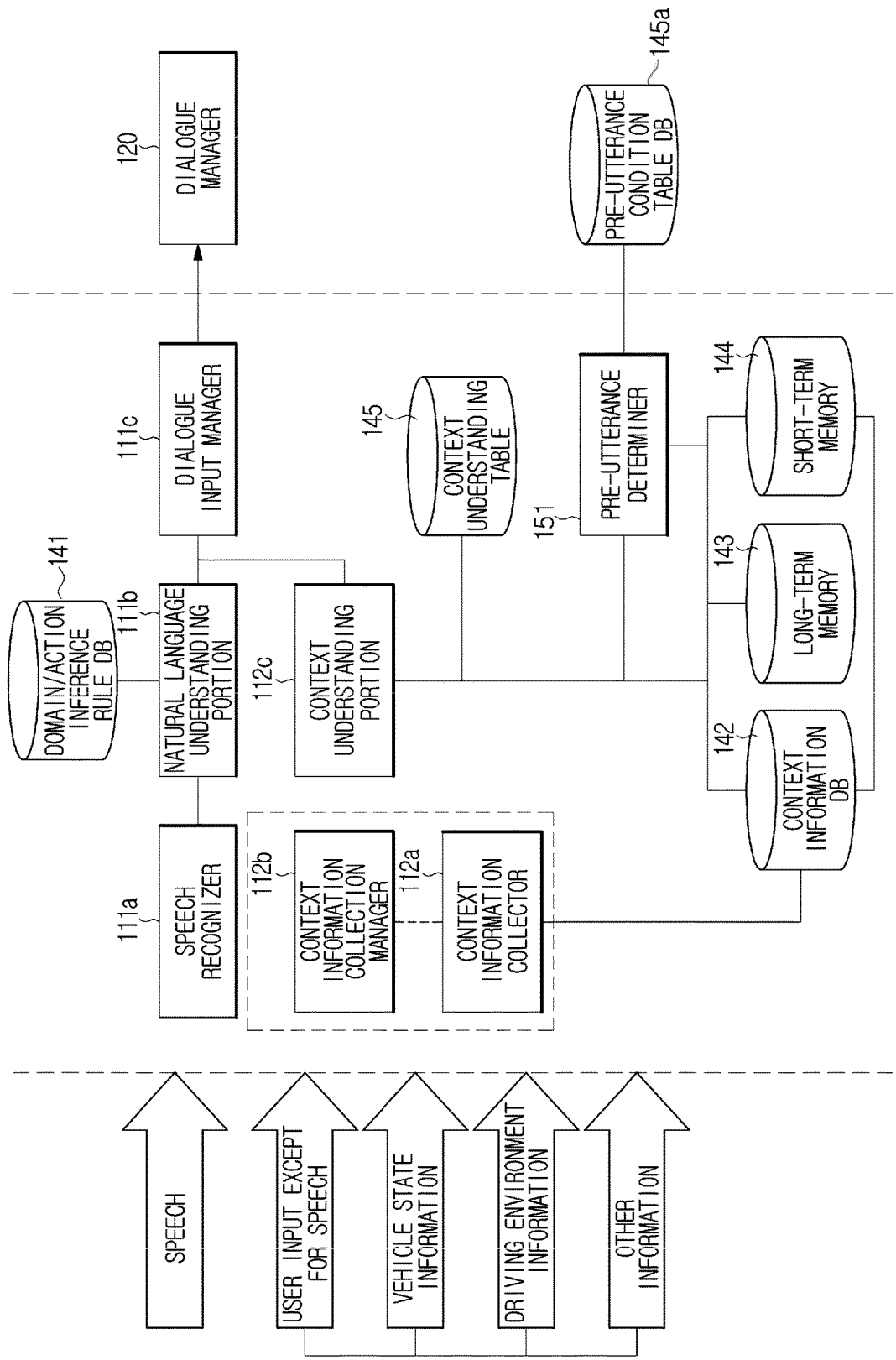

Referring to FIG. 19C, according to another aspect, a dialogue system 100 may further include a pre-utterance determiner 151 determining whether it is a pre-utterance context based on a variety of information collected by an input processor 110. The storage 140 may further include a pre-utterance condition table 145*a* storing pre-utterance conditions, and a task processing DB 145*b*.

Data stored in the context information DB 142, the long-term memory 143, and the short-term memory 144 may be transmitted to the pre-utterance determiner 151. The pre-utterance determiner 151 may analyze the transmitted data and determine whether the transmitted data meets the pre-utterance condition stored in the pre-utterance condition table 145*a*.

In the pre-utterance condition table 145*a*, a pre-utterance condition related to context information and a pre-utterance message, which is output when a corresponding pre-utterance condition is satisfied, may be stored for each context information.

When the context information transmitted from the context information DB 142 satisfies the pre-utterance condition, the pre-utterance determiner 151 may determine that it is the pre-utterance context, and generate a pre-utterance trigger signal.

The pre-utterance determiner 151 may transmit the pre-utterance trigger signal to the context understanding portion 112*c* with a pre-utterance message corresponding to the corresponding pre-utterance context. Further, the pre-utterance determiner 151 may transmit information related to the corresponding pre-utterance context. The information related to the corresponding pre-utterance context may include a pre-utterance condition corresponding to the corresponding pre-utterance context or an action corresponding to the pre-utterance context. A description thereof will be described in detail with reference to FIG. 20C.

Figure 20A:
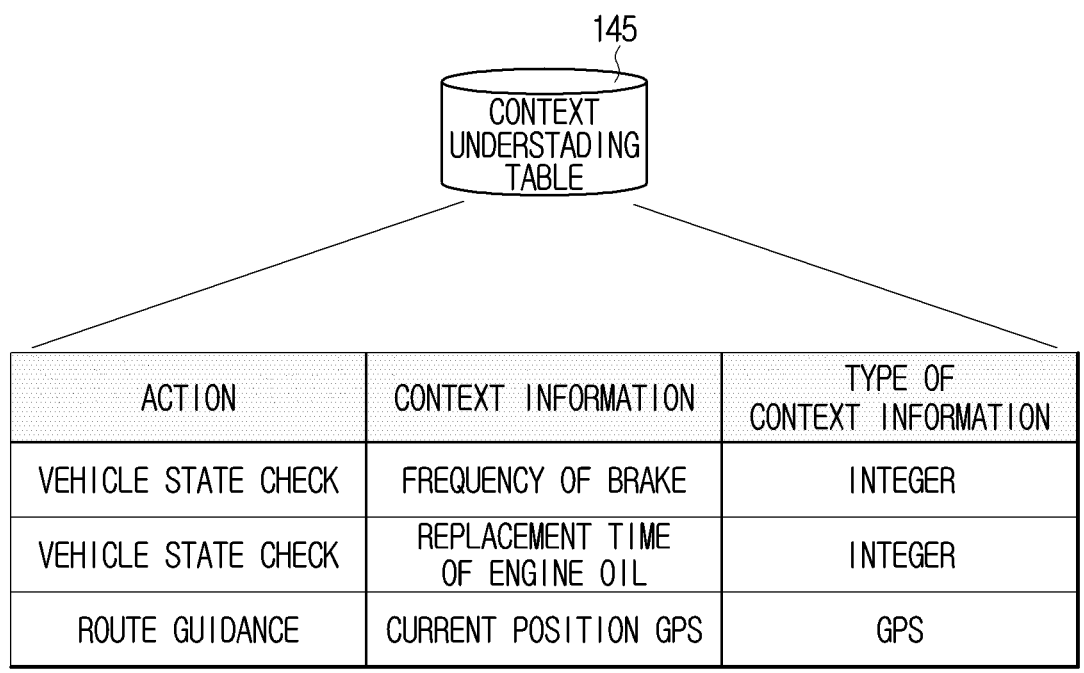
FIGS. 20A and 20B are views illustrating an example of information stored in a context understanding table and FIGS. 20C and 20D are views illustrating an example of context information on a pre-utterance.
Figure 20B:
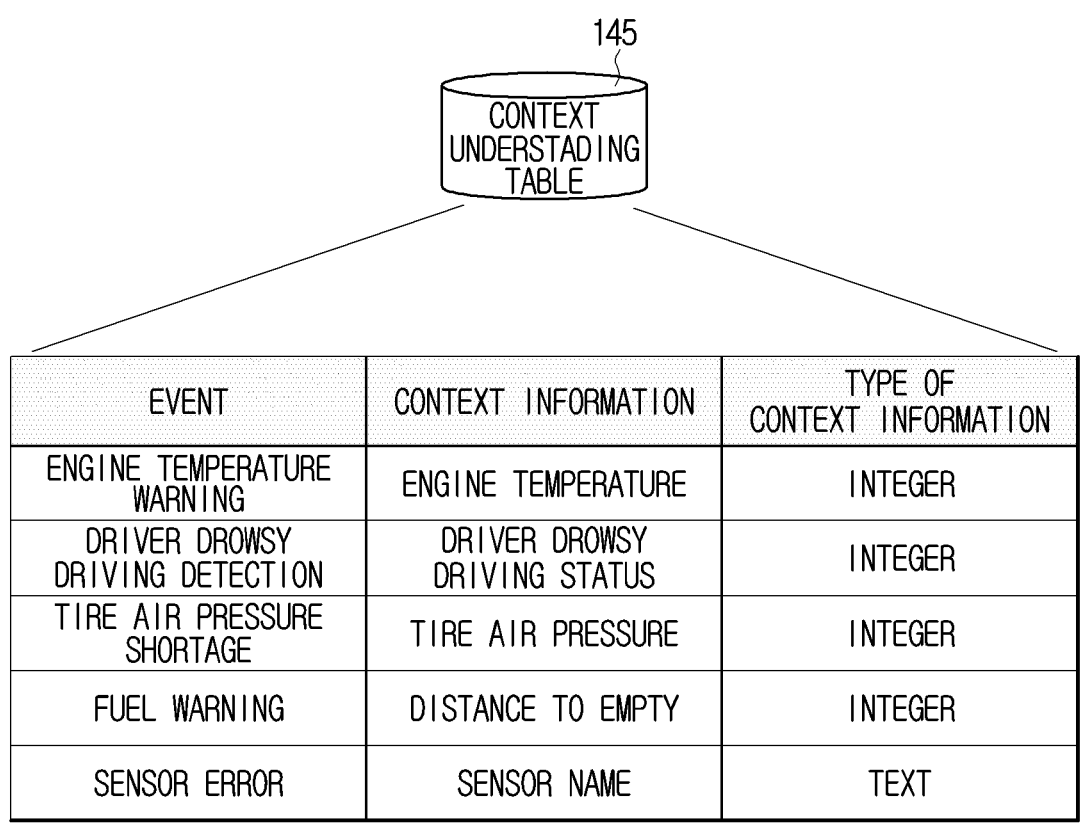
Figure 20C:
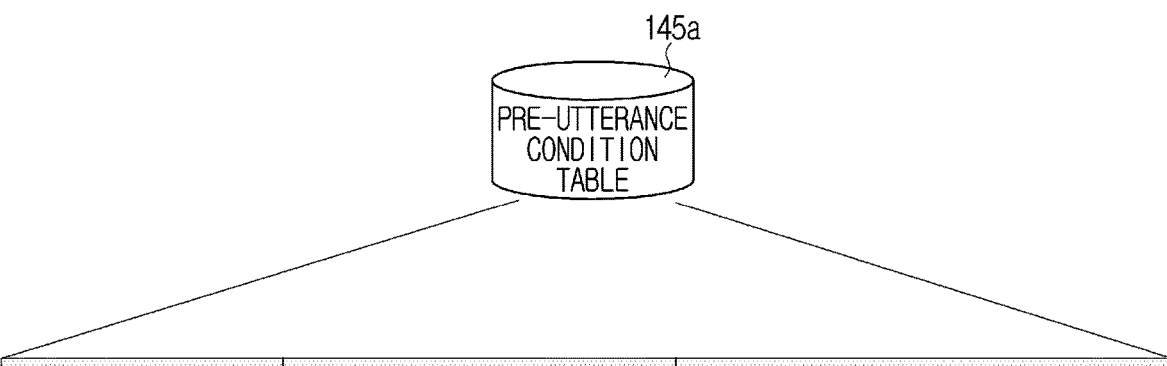
Figure 20D:
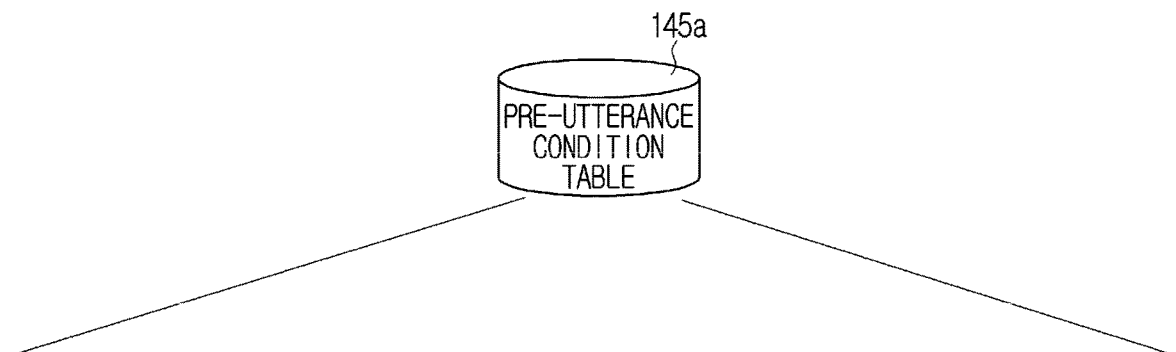

FIGS. 20A and 20B are views illustrating an example of information stored in a context understanding table and FIGS. 20C and 20D are views illustrating an example of context information on a pre-utterance.

Referring to an example of FIG. 20A, context information and the type of the context information related to the action execution may be stored in the context understating table 145 according to each action.

For example, when the action is the vehicle state check, the frequency of the brake may be needed as the context information and the type of the context information may be integer. For another example, When the action the vehicle state check, replacement timing of the engine oil may be needed as the context information and the type of the context information may be integer. When the action is route guidance, the current position may be needed as the context information and the type of the context information may be GPS information.

When context information related to the action execution corresponding to the intention of the user's utterance is pre-stored in the context information DB 142, the long-term memory 143 or the short-term memory 144, the context understanding portion 112*c* may bring the corresponding information from the context information DB 142, the long-term memory 143 or the short-term memory 144 and transmit the corresponding information to the dialogue input manager 111*c*.

When context information related to the action execution corresponding to the intention of the user's utterance is not stored in the context information DB 142, the long-term memory 143 or the short-term memory 144, the context understanding portion 112*c* may request needed information to the context information collection manager 112*b*. The context information collection manager 112*b* may allow the context information collector 112*a* to collect the needed information.

The context information collector 112*a* may periodically collect data, or collect data only when a certain event occurs. In addition the context information collector 112*a* may periodically collect data and then additionally collect data when a certain event occurs. Further, when receiving a data collection request from the context information collection manager 112*b*, the context information collector 112*a* may collect data.

The context information collector 112*a* may collect the needed information and then store the information in the context information DB 142 or the short-term memory 144. The context information collector 112*a* may transmit a confirmation signal to the context information collection manager 112*b*.

The context information collection manager 112*b* may transmit the confirmation signal to the context understanding portion 112*c* and the context understanding portion 112*c* may bring the needed information from the long-term memory 143 or the short-term memory 144 and then transmit the information to the dialogue input manager 111*c*.

Particularly, when the action corresponding to the intention of the user's utterance is the route guidance, the context understanding portion 112*c* may search the context understating table 145 and recognize that context information related to the route guidance is the current position.

When the current position is pre-stored in the short-term memory 144, the context understanding portion 112*c* may bring the current position and transmit the current position to the dialogue input manager 111c.

When the current position is not stored in the short-term memory 144, the context understanding portion 112c may request the current position to the context information collection manager 112b and the context information collection manager 112b may allow the context information collector 112a to acquire the current position from the vehicle controller 240.

The context information collector 112a may acquire the current position and then store the current position in the short-term memory 144. The context information collector 112a may transmit a confirmation signal to the context information collection manager 112b. The context information collection manager 112b may transmit the confirmation signal to the context understanding portion 112c and the context understanding portion 112c may bring the current position information from the short-term memory 144 and then transmit the information to the dialogue input manager 111c.

The dialogue input manager 111c may transmit the output of the natural language understanding portion 111b and the output of the context understanding portion 112c to the dialogue manager 120 and the dialogue input manager 111c may manage to inhibit the duplicate input from entering to the dialogue manager 120. In this time, the output of the natural language understanding portion 111b and the output of the context understanding portion 112c may be combined as one output and then transmitted to the dialogue manager 120 or independently transmitted to the dialogue manager 120.

When the context information collection manager 112b determines that a certain event occurs since data collected by the context information collector 112a meets a predetermined condition, the context information collection manager 112b may transmit an action trigger signal to the context understanding portion 112c.

The context understanding portion 112c may search the context understating table 145 for searching for context information related to the corresponding event, and when the searched context information is not stored in the context understating table 145, the context understanding portion 112c may transmit a context information request signal to the context information collection manager 112b, again.

As illustrated in FIG. 20B, context information and the type of the context information related to the event may be stored in the context understating table 145 according to each event.

For example, when the generated event is engine temperature warning, an engine temperature in the form of integer may be stored as the context information related to the event. When the generated event is driver drowsy driving detection, driver drowsy driving status in the form of integer may be stored as the context information related to the event. When the generated event is tire air pressure shortage, tire air pressure in the form of integer may be stored as the context information related to the event. When the generated event is fuel warning, distance to empty (DTE) in the form of integer may be stored as the context information related to the event. When the generated event is sensor error, sensor name in the form of text may be stored as the context information related to the event.

The context information collection manager 112b may collect the needed context information via the context information collector 112a and transmit a confirmation signal to the context understanding portion 112c. The context understanding portion 112c may bring the needed context information from the context information DB 142, the long-term memory 143 or the short-term memory 144 and then transmit the context information together with the action information to the dialogue input manager 111c.

Referring to an example of FIG. 20C, in the pre-utterance condition table 145a, a pre-utterance condition related to context information and a pre-utterance message, which is output when a corresponding pre-utterance condition is satisfied, may be stored for each context information.

When the context information transmitted from the context information DB 142 satisfies the pre-utterance condition, the pre-utterance determiner 151 may determine that it is the pre-utterance context, and generate a pre-utterance trigger signal.

The pre-utterance determiner 151 may transmit the pre-utterance trigger signal to the context understanding portion 112c with a pre-utterance message corresponding to the corresponding pre-utterance context. Further, the pre-utterance determiner 151 may transmit information related to the corresponding pre-utterance context. The information related to the corresponding pre-utterance context may include a pre-utterance condition corresponding to the corresponding pre-utterance context or an action corresponding to the pre-utterance context, described later.

For example, when context information is related to a tire air pressure and the tire air pressure is equal to or less than a predetermined reference value, the pre-utterance condition may be satisfied. When the pre-utterance condition of the tire air pressure is satisfied, the pre-utterance determiner 151 may determine that a pre-utterance context is caused by the tire air pressure shortage, and generate a pre-utterance trigger signal.

The pre-utterance determiner 151 may transmit the pre-utterance trigger signal with a pre-utterance message, to the context understanding portion 112c. For example, in the pre-utterance context caused by the tire air pressure shortage, a pre-utterance message indicating that the tire air pressure is low such as "tire pressure is too low", may be transmitted to the context understanding portion 112c.

In addition, when context information is related to an engine temperature and the engine temperature is equal to or higher than a predetermined reference value, the pre-utterance condition may be satisfied. When the pre-utterance condition of the engine temperature is satisfied, the pre-utterance determiner 151 may determine that a pre-utterance context is caused by the problem in the engine temperature, and generate a pre-utterance trigger signal.

The pre-utterance determiner 151 may transmit the pre-utterance trigger signal with a pre-utterance message, to the context understanding portion 112c. For example, in the pre-utterance context caused by the problem in the engine temperature, a pre-utterance message indicating that the engine is overheated such as "engine temperature is too high", may be transmitted to the context understanding portion 112c.

In addition, when context information is related to a remaining amount of gasoline and the remaining amount of gasoline is equal to or less than a predetermined reference value, the pre-utterance condition may be satisfied. When the user sets a destination using the navigation service of the vehicle, the predetermined reference value may be set based on a distance from the current position to the destination. When the destination is not set, a default value may be applied as the reference value. For example, when a value smaller than a reference value for indicating a fuel shortage warning lamp, may be set as the reference value for the pre-utterance condition related to the remaining amount of gasoline shortage. When the pre-utterance condition of the remaining amount of gasoline is satisfied, the pre-utterance determiner 151 may determine that a pre-utterance context is caused by the shortage of the remaining amount of gasoline, and generate a pre-utterance trigger signal.

The pre-utterance determiner 151 may transmit the pre-utterance trigger signal with a pre-utterance message, to the context understanding portion 112c. For example, in the pre-utterance context caused by the shortage of the remaining amount of gasoline, a pre-utterance message indicating that the remaining amount of gasoline is insufficient such as "the remaining amount of gasoline is not enough to the destination", may be transmitted to the context understanding portion 112c.

However, the pre-utterance condition and the pre-utterance message shown in FIG. 22C are merely examples that can be applied to the dialogue system 100.

That is, the disclosed dialogue system 100 may induce the user's utterance by using the collected context information and determine the failure in the vehicle, which is difficult to collect through the user's utterance. Therefore, a variety of examples inducing the user's utterance may be contained.

Referring to FIG. 20D, when the pre-utterance context is caused by the tire air pressure shortage or the problem in the engine temperature, it may be possible to store a pre-utterance message corresponding to a content, which pro-actively suggests a repair shop reservation service, such as "do you want to book the repair shop?"

In addition, when the pre-utterance context is caused by the shortage of remaining gasoline, it may be possible to store a pre-utterance message corresponding to a content, which proactively suggests a gasoline station guidance service, such as "do you want to guide the gasoline station?"

In addition, when the pre-utterance context is caused by the internal temperature of the vehicle and when the internal temperature of the vehicle is out of a predetermined reference range, a pre-utterance condition may be satisfied. When the pre-utterance condition of the internal temperature of the vehicle is satisfied, the context understanding portion 112c may determine that a pre-utterance context is caused by the problem in the internal temperature of the vehicle, and generate a pre-utterance trigger signal.

In the pre-utterance context caused by the problem in the internal temperature of the vehicle, it may be possible to store a pre-utterance message corresponding to a content, which proactively suggests an internal temperature control function, such as "do you want to operate the air conditioner?"

In addition, when the context information is related to the microphone input and when a microphone input value is equal to or less than a predetermined reference value, a pre-utterance condition may be satisfied. When the pre-utterance condition of the microphone input is satisfied, the context understanding portion 112c may determine that it is a pre-utterance context for changing the mood, and generate a pre-utterance trigger signal. Accordingly, it may be possible to store a pre-utterance message corresponding to a content, which proactively suggests a multi-media playing service, such as "do you want to play the music?"

In addition, when the context information is related to the open and close of the window and whether it is raining, and when the window is open and it is raining, the pre-utterance condition may be satisfied. When the window is open and it is raining, the context understanding portion 112c may determine that a pre-utterance context is caused by the open of the window, and generate a pre-utterance trigger signal.

In the pre-utterance context caused by the open of the window, it may be possible to store a pre-utterance message corresponding to a content, which proactively suggests a window close function, such as "do you want to close the window?"

In the above-mentioned example of FIGS. 20A to 20D, a case in which the pre-utterance message corresponding to the pre-utterance context is pre-stored in the pre-utterance condition table 145a has been described. However, the example of the dialogue system 100 is not limited thereto, and thus an action corresponding to the pre-utterance context may be pre-stored.

The dialogue input manager 111c may input the output of the context understanding portion 112c to the dialogue manager 120.

Figure 22:
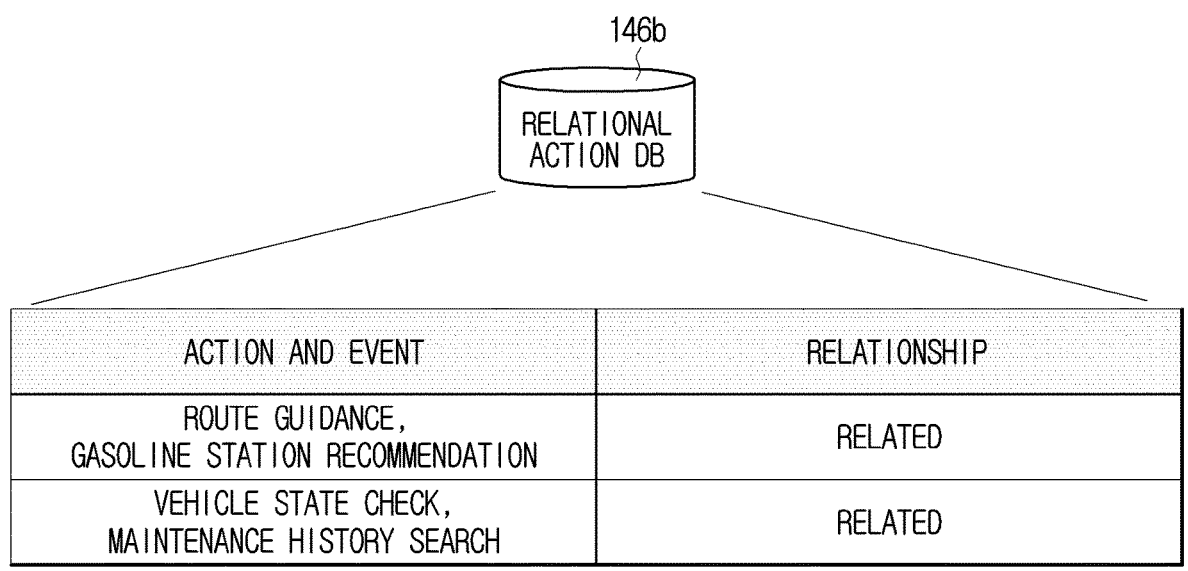
FIG. 22 is a view illustrating an example of information stored in a relational action database (DB)
Figure 23:
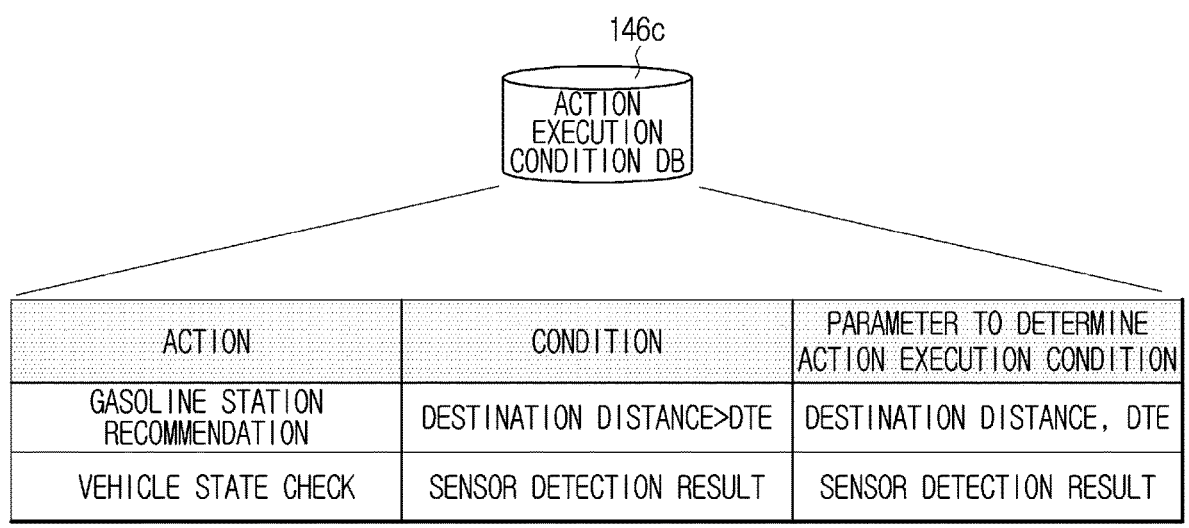
FIG. 23 is a view illustrating an example of information stored in an action execution condition DB.
Figure 24:
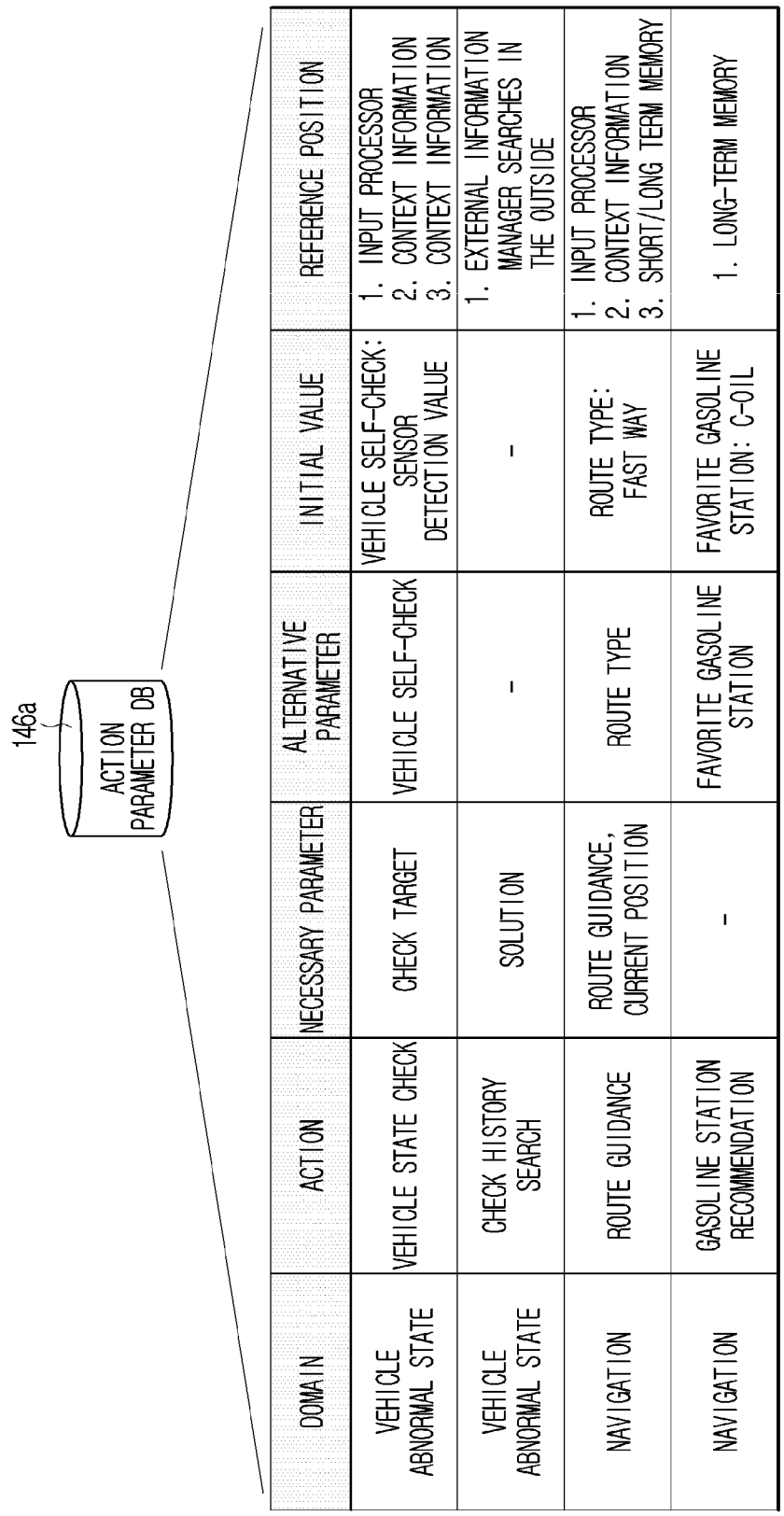
FIG. 24 is a view illustrating an example of information stored in an action parameter DB.

FIG. 21 is a control block diagram illustrating a configuration of a dialogue manager in detail, FIG. 22 is a view illustrating an example of information stored in a relational action DB, FIG. 23 is a view illustrating an example of information stored in an action execution condition DB, and FIG. 24 is a view illustrating an example of information stored in an action parameter DB.

Referring to FIG. 21, the dialogue manager 120 may include a dialogue flow manager 121 requesting for generating, deleting and updating dialogue or action; a dialogue action manager 122 generating, deleting and updating dialogue or action according to the request of the dialogue flow manager 121; an ambiguity solver 123 clarifying a user's intention by resolving an ambiguity of context and an ambiguity of dialogue; a parameter manager 124 managing parameters needed for the action execution; an action priority determiner 125 determining whether an action is executable about a plurality of candidate actions; and an external information manager 126 managing an external content list and related information, and managing parameter information for an external content query.

The dialogue manager 120 may include a memory in which a program for performing the above-described operation and the operation described later is stored, and a processor for executing the stored program. At least one memory and one processor may be provided, and when a plurality of memory and processors are provided, they may be integrated on one chip or physically separated.

Each component contained in the dialogue manager 120 may be implemented by the same processor or by a separate processor.

In addition, the dialogue manager 120 and the input processor 110 may be implemented by the same processor or by a separate processor.

The result of the natural language understanding (the output of the natural language understanding portion) and context information (the output of the context understanding portion) that is output of the dialogue input manager 111a is input to the dialogue flow manager 121. The output of the natural language understanding portion 111b may include information which is related to the user's utterance content, e.g., a morphological analysis result, as well as information, e.g., domain and action. The output of the context understanding portion 112c may include events determined by the context information collection manager 112b, as well as the context information.

The dialogue flow manager 121 may search for whether a dialogue task or an action task corresponding to the input by the dialogue input manager 111c is present in the dialogue and action state DB 147.

The dialogue and action state DB 147 may be a storage space for managing the dialogue state and the action state, and thus the dialogue and action state DB 147 may store currently progressing dialogue and action, and dialogue state and action state related to preliminary actions to be processed. For example, the dialogue and action state DB 147 may store states related to completed dialogue and action, stopped dialogue and action, progressing dialogue and action, and dialogue and action to be processed.

The dialogue and action state DB 147 may store last output state related to whether to switch and to nest an action, switched action index, action change time, and screen/voice/command.

For example, in a case in which the domain and the action corresponding to a user utterance is extracted, when dialogue and action corresponding to the corresponding domain and action is present in the most recently stored dialogue, the dialogue and action state DB 147 may determine it as the dialogue task or action task corresponding to the input from the dialogue input manager 111c.

When the domain and the action corresponding to a user utterance is not extracted, the dialogue and action state DB 147 may generate a random task or request that the dialogue action manager 122 refers to the most recently stored task.

When the dialogue task or action task corresponding to the input of the input processor 110 is not present in the dialogue and action state DB 147, the dialogue flow manager 121 may request that the dialogue action manager 122 generates new dialogue task or action task.

When the dialogue flow manager 121 manages the dialogue flow, the dialogue flow manager 121 may refer to a dialogue policy DB 148. The dialogue policy DB 148 may store a policy to continue the dialogue, wherein the policy may represent a policy for selecting, starting, suggesting, stopping and terminating the dialogue.

In addition, the dialogue policy DB 148 may store a point of time in which a system outputs a response, and a policy about a methodology. The dialogue policy DB 148 may store a policy for generating a response by linking multiple services and a policy for deleting previous action and replacing the action with another action.

For example, two policies may be allowed, wherein the two polices may include a policy in which a response for two actions is generated at once, e.g., "Is it needed to perform B action after performing A action?" and a policy in which a separate response for another action is generated after a response for an action is generated, e.g., "A action is executed"☐→"Do you want to execute B action?"

The dialogue and action state DB 147 may store a policy for determining the priority among the candidate actions. A priority determination policy will be described later.

The dialogue action manager 122 may designate a storage space to the dialogue and action state DB 147 and generate dialogue task and action task corresponding to the output of the input processor 110.

When it is impossible to extract a domain and an action from the user's utterance, the dialogue action manager 122 may generate a random dialogue state. In this case, as mentioned later, the ambiguity solver 123 may identify the user's intention based on the content of the user's utterance, the environment condition, the vehicle state, and the user information, and determine an action appropriate for the user's intention.

When the dialogue task or action task corresponding to the output of the input processor 110 is present in the dialogue and action state DB 147, the dialogue flow manager 121 may request that the dialogue action manager 122 refers to the corresponding dialogue task or action task.

The action priority determiner 125 may search the relational action DB 146b to search for an action list related to the action or the event contained in the output of the input processor 110, and then the action priority determiner 125 may extract the candidate action.

As illustrated in FIG. 22, the relational action DB 146b may indicate actions related to each other, a relationship among the actions, an action related to an event and a relationship among the events. For example, the route guidance, the vehicle state check, and gasoline station recommendation may be classified as the relational action, and a relationship thereamong may correspond to an association.

Therefore, when executing the route guidance, the vehicle state check and gasoline station recommendation may be performed together. In this case, "performing together" may include a case in which the vehicle state check and gasoline station recommendation are performed before or after the route guidance and a case in which the vehicle state check and gasoline station recommendation are performed during the route guidance (e.g., adding as a stopover).

According to an aspect, the maintenance history search action may be related to the vehicle state check action, a relationship therebetween may correspond to an association.

Therefore, when a user senses a preliminary indication related to the failure in the vehicle during driving the vehicle 200, and inputs an utterance related to the preliminary indication, the maintenance history search action may be performed while the vehicle state check action is performed.

When the input processor 110 transmit an action corresponding to the user's utterance together with an event determined by the context information collection manager 112b, an action related to the action corresponding to the user's utterance and an action related to the event may become a candidate action.

For example, when the vehicle detector 260 transmits an event related to the failure of the vehicle 200 by transmitting a detection value that is detected by the sensor, the action, which is related to the event, and the maintenance history search action may become a candidate action.

The extracted candidate action list may be transmitted to the dialogue action manager 122 and the dialogue action manager 122 may update the action state of the dialogue and action state DB 147 by adding the candidate action list.

The action priority determiner 125 may search for conditions to execute each candidate action in an action execution condition DB 146c.

As illustrated in FIG. 23, the action execution condition DB 146c may store conditions, which are needed for performing the action, and parameters, which are to determine whether to meet the corresponding condition, according to each action.

For example, an execution condition for the vehicle state check may be a case in which a destination distance is equal to or greater than 100 km, wherein a parameter for determining the condition may correspond to the destination distance. A condition for the gasoline station recommendation may be a case in which a destination distance is greater than a distance to empty (DTE), wherein a parameter for determining the condition may correspond to the destination distance and the distance to empty (DTE).

As another example, among the action related to the maintenance history search, the condition of the vehicle state check action may include the presence of the result of the sensor detection. When the failure of the vehicle 200 is detected by the vehicle 200 itself, the performance of the maintenance history search may be not needed. Therefore, in order to perform the vehicle state check action, the result of the sensor detection may not be present, and a needed parameter for determining the condition may correspond to a sensor detection value.

The action priority determiner 125 may transmit the execution condition of the candidate action to the dialogue action manager 122 and the dialogue action manager 122 may add the execution condition according to each candidate action and update the action state of the dialogue and action state DB 147.

The action priority determiner 125 may search for a parameter that is needed to determine an action execution condition (hereinafter refer to condition determination parameter), from the context information DB 142, the long-term memory 143, the short-term memory 144 or the dialogue and action state DB 147, and determine whether it is possible to execute the candidate action, using the searched parameter.

When a parameter used to determine an action execution condition is not stored in the context information DB 142, the long-term memory 143, the short-term memory 144 or the dialogue and action state DB 147, the action priority determiner 125 may bring the needed parameter from the external content server 300 via the external information manager 126.

The action priority determiner 125 may determine whether it is possible to perform the candidate action using the parameter used to determine an action execution condition. In addition, the action priority determiner 125 may determine the priority of the candidate action based on whether to perform the candidate action and priority determination rules stored in the dialogue policy DB 148.

A score for each candidate action may be calculated according to the current situation. A higher priority may be given to a candidate action having more of calculated score. For example, an action corresponding to the user's utterance, a safety score, a convenience score, a processing time, a processing point of time (whether to immediately process or not), a user preference (the user's reception level when suggesting a service or a preference pre-determined by a user), an administrator score, a score related to vehicle state, and an action success rate (dialogue success rate) may be used as a parameter for calculating the score, as illustrated in the following equation 1. w1, w2, w3, w4, w5, w6, w7, w8, and w9 represent a weight value for each parameter.

Priority score=w1*user utterance action+w2*safety score+w3*convenience score+w4*processing time+w5*processing point of time+w6*user preference+w7*administrator score+w8*score related to vehicle state+w9*action success rate*possibility of action execution (1: possible, not yet known, 0: impossible)*action completion status (completion: 1, incompletion: 0). [Equation 1]

As mentioned above, the action priority determiner 125 may provide the most needed service to a user by searching for an action directly connected to the user's utterance and context information and an action list related thereto, and by determining a priority therebetween.

The action priority determiner 125 may transmit the possibility of the candidate action execution and the priority to the dialogue action manager 122 and the dialogue action manager 122 may update the action state of the dialogue and action state DB 147 by adding the transmitted information.

The parameter manager 124 may search for a parameter used to perform each candidate action (hereinafter refer to action parameter) in an action parameter DB 146a.

As illustrated in FIG. 24, the action parameter DB 146a may store a desired parameter, an alternative parameter, an initial value of parameter and a reference position for bring the parameter, according to each action. In a state in which the initial value of parameter is stored, when a parameter value corresponding to the corresponding parameter is not present in the user's utterance and the context information output from the input processor 110 and when the parameter value is not present in the context information DB 142, it may be possible to perform an action according to the stored initial value or it may be possible to confirm whether to perform an action according to the stored initial value, to a user.

For example, the desired parameter used for the vehicle state check action may include a check target, and the alternative parameter may include a vehicle self-check. An initial value of the vehicle self-check may be a detection value of the sensor provided in the vehicle detector 260. The detection value of the sensor may be acquired by searching the context information DB 142, the short-term memory 144 or the long-term memory 143 in an order.

The desired parameter used for the route guidance may include the current position and the destination, and the alternative parameter may include the type of route. An initial value of the alternative parameter may be stored as a fast route. The current position and the destination may be acquired by searching the dialogue and action state DB 147, the context information DB 142, the short-term memory 144 or the long-term memory 143 in an order.

The alternative parameter for the gasoline station recommendation may include a favorite gasoline station, and "C oil" may be stored as an initial value of the alternative parameter. The favorite gasoline station may be acquired from the long-term memory 143. The alternative parameter may further include the fuel type of the vehicle, and the fuel price.

As mentioned above, the parameter manager 124 may bring the parameter value of the parameter searched in the action parameter DB 146a, from the corresponding reference position. The reference position from which the parameter value is brought may be at least one of the context information DB 142, the short-term memory 144 or the long-term memory 143, the dialogue and action state DB 147, or the external content server 300.

The parameter manager 124 may bring the parameter value from the external content server 300 via the external information manager 126.

The external information manager 126 may determine from which information is brought, by referring to the external service aggregate DB 146d. The external information manager 126 may request search for a similar case related to a vehicle abnormal state, according to the similar vehicle type/the similar vehicle model, to the external content server 300. In addition, the external information manager 126 may request the personal maintenance history stored in the external content server 300.

The external service aggregate DB 146d may store information related to the external content server connected to the dialogue system 100. For example, the external service aggregate DB 146d may store external service name, explanation about an external service, the type of information provided from an external service, external service using method, and a subject of providing the external service.

A maintenance diagnosis DB 146e may store a user's utterance related to a preliminary indication of the vehicle and a solution for the preliminary indication or may request the solution to the external content server 400.

Particularly, when context information and user's utterance related to the vehicle abnormal state are input, the maintenance diagnosis DB 146*e* may store a description about the current problem and a response suggesting a solution.

The solution may be collected from a maintenance DB 300*a* and a personal maintenance DB 300*b*, wherein the maintenance DB 300*a* stores a solution based on the similar case, which is collected from other users using the same vehicle type/the same vehicle model, or from the dialogue system 100, and the personal maintenance history DB 300*b* stores a personal maintenance history of the vehicle 200 of the user. That is, the maintenance DB 300*a* may provide a solution that is the most similar with the current vehicle and the personal maintenance history DB 300*b* may include a variety of personal history such as the maintenance history after the user purchases the vehicle, e.g., replacement of supplies.

For example, when the brake is a check target related to the vehicle state check action, the parameter manager 124 may search for a detection value of the sensor configured to detect a problem of the brake in the context information DB 142, the long-term memory 143, the short-term memory 144 or the dialogue and action state DB 147. When the detection value of the sensor is not present, the dialogue action manager 122 may search for the maintenance history through the external information manager 126 and search for a solution about the problem of the brake.

Meanwhile, the personal maintenance history DB 300*b* may be provided in the outside of the vehicle 200 that is in the external content server 300. However, the position of the personal maintenance history DB 300*b* is not limited thereto and thus the personal maintenance history DB 300*b* may be provided in the internal memory of the vehicle 200 or the storage 140 provided inside the dialogue system 100.

Information on the solution acquired by the external information manager 126 may be converted into a parameter value about the vehicle state check action in the parameter manager 124, under the control of the dialogue action manager 122.

Therefore, the parameter value acquired by the parameter manager 124 may be transmitted to the dialogue action manager 122 and the dialogue action manager 122 may update the dialogue and action state DB 147 by adding the parameter value for each the candidate action, to the action state.

When the ambiguity is not present in the dialogue and the context, it may be possible to acquire the needed information and to manage the dialogue and action according to the above mentioned operation of the action priority determiner 125, the parameter manager 124 and the external information manager 126. When the ambiguity is present in the dialogue and the context, it may be difficult to provide a service needed for the user using only an operation of the action priority determiner 125, the parameter manager 124 and the external information manager 126.

In this case, the ambiguity solver 123 may deal with the ambiguity in the dialogue or in the context. For example, when anaphora, e.g., the person, that place on yesterday, father, mother, grandmother, and daughter-in-law, is contained in the dialogue, there may be ambiguity because it is not clear that the anaphora represents whom or which. In this case, the ambiguity solver 123 may resolve the ambiguity by referring to the context information DB 142, the long-term memory 143 or the short-term memory 144 or provide a guidance to resolve the ambiguity.

For example, an ambiguous word "nearby repair shop" contained in the dialogue may correspond to a parameter value of the action parameter or a parameter value of the condition determination parameter. However, in this case, it is impossible to perform a real action or to determine an action execution condition by using the corresponding word, due to the ambiguity of the word.

The ambiguity solver 123 may resolve the ambiguity of the parameter value by referring to the information stored in the context information DB 142, the long-term memory 143 or the short-term memory 144. As needed, the ambiguity solver 123 may bring the needed information from the external content server 300 by using the external information manager 126.

For example, the ambiguity solver 123 may collect GPS information related to the current position by referring to the short-term memory 144. The ambiguity solver 123 may acquire a map about the vicinity of the current position, through the long-term memory 143 or the external information manager 126, and bring information about the closest repair shop, so as to convert "nearby repair shop" into "A repair shop".

When an action (object and operator) is not clearly extracted by the input processor 110 or when the user' intention is not clear, the ambiguity solver 123 may identify the user's intention by referring to an ambiguity resolution information DB 146*e*, and determine an action corresponding to the identified intention.

Figure 25:
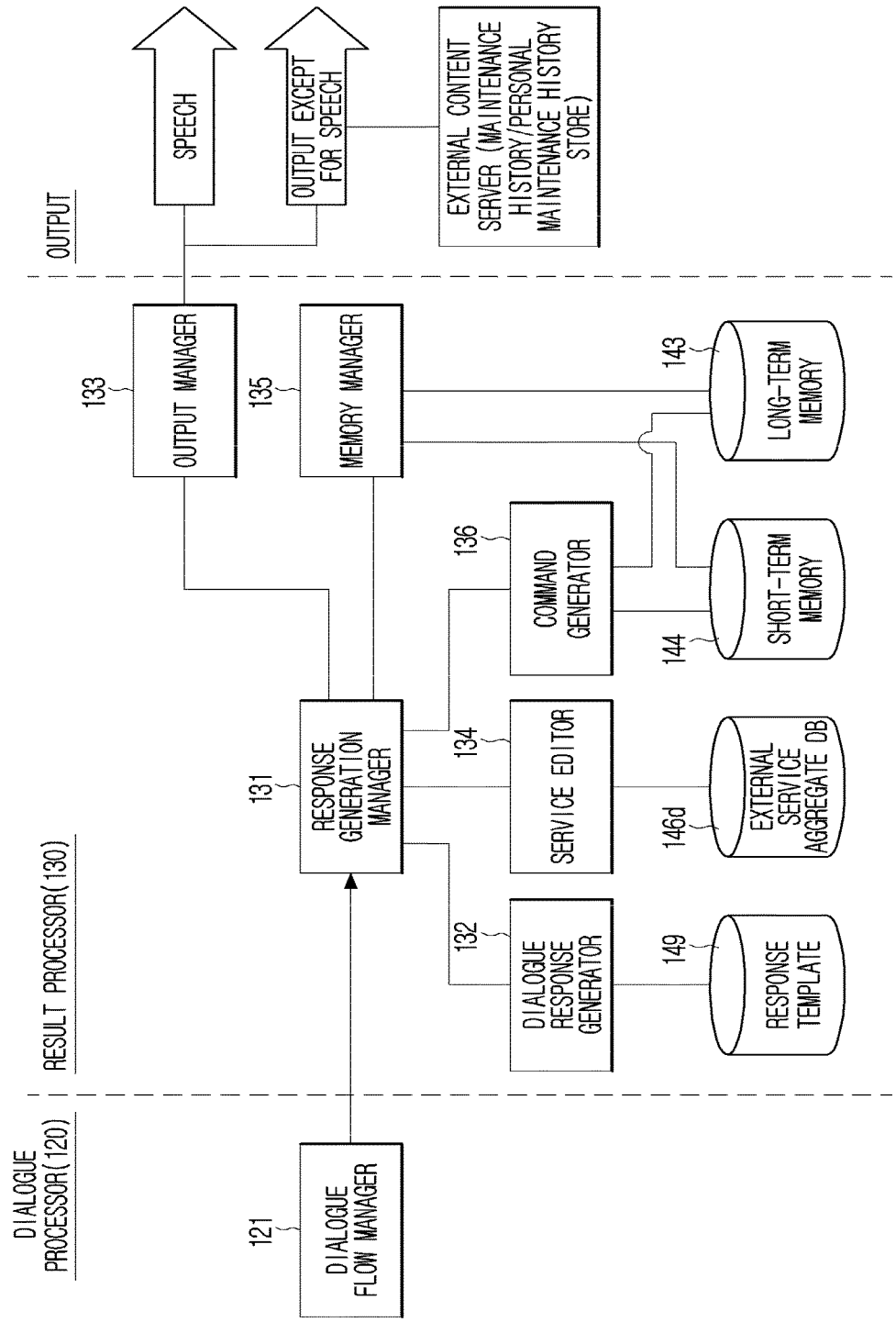
FIG. 25 is a control block diagram illustrating a configuration of the result processor in details.

FIG. 25 is a control block diagram illustrating a configuration of the result processor in details.

Referring to FIG. 25, the result processor 130 may include a response generation manager 131 managing generation of a response needed for executing an action input from the dialogue manager 120; a dialogue response generator 132 generating a response in text, image or audio type according to the request of the response generation manager 131; a command generator 136 generating a command for the vehicle control or the provision of service using an external content according to a request of the response generation manager 131; a service editor 134 sequentially or sporadically executing a plurality of service and collection a result thereof to provide a service desired by a user; an output manager 133 outputting the generated text type response, image type response, or audio type response, outputting the command generated by the command generator 136, or determining an order of the output when the output is plural; and a memory manager 135 managing the long-term memory 143 and the short-term memory 144 based on the output of the response generation manager 131 and the output manager 133.

The result processor 130 may include a memory in which a program for performing the above-described operation and the operation described later is stored, and a processor for executing the stored program. At least one memory and one processor may be provided, and when a plurality of memory and processors are provided, they may be integrated on a single chip or physically separated.

Each component contained in the result processor 130 may be implemented by the same processor or by a separate processor.

In addition, the result processor 130, the dialogue manager 120 and the input processor 110 may be implemented by the same processor or by a separate processor.

The response that is output by corresponding to the user's utterance or context may include the dialogue response, the vehicle control, and the external content provision. The dialogue response may include an initial dialogue, a question, and an answer including information. The dialogue response may be stored as database in a response template 149.

The response generation manager 131 may request that the dialogue response generator 132 and the command generator 136 generate a response that is needed to execute an action, which is determined by the dialogue manager 120. For this, the response generation manager 131 may transmit information related to the action to be executed, to the dialogue response generator 132 and the command generator 136, wherein the information related to the action to be executed may include an action name and a parameter value. When generating a response, the dialogue response generator 132 and the command generator 136 may refer to the current dialogue state and action state.

The dialogue response generator 132 may extract a dialogue response template by searching the response template 149, and generate the dialogue response by filling the extracted dialogue response template with the parameter value. The generated dialogue response may be transmitted to the response generation manager 131. When the parameter value needed to generate the dialogue response is not transmitted from the dialogue manager 120 or when an introduction of using the external content is transmitted, the dialogue response generator 132 may receive the parameter value from the external content server 300 or search the long-term memory 143, the short-term memory 144 or the context information DB 142.

For example, when the action determined by the dialogue manager 120 corresponds to the vehicle abnormal state, the dialogue response generator 132 may search the response template 149 and then extract a dialogue response template "[check target:-] may need [solution:-]. Do you want to guide to a repair shop?"

[check target] among parameters which are needed to be filled, in the dialogue response template may be transmitted from the dialogue manager 120, and a parameter value for [solution] may be not transmitted. In this case, the dialogue response generator 132 may request information on [solution] to the external content server 300.

When the response to the user utterance or context includes the vehicle control or the external content provision, the command generator 136 may generate a command to execute the vehicle control or the external content provision. For example, when the action determined by the dialogue manager 120 is the control of the air conditioning device, window and AVN, the command generator 136 may generate a command to execute the control and then transmit the command to the response generation manager 131.

When the action determined by the dialogue manager 120 needs the external content provision, the command generator 136 may generate a command to receive the corresponding content from the external content server 300 and then transmit the command to the response generation manager 131.

For example, when the solution for the preliminary indication of the user is replacement of the brake pedal, the response generation manager 131 may transmit the maintenance history or the personal maintenance history to the outside through the output manager 133 to allow other user to utilize the solution.

When a plurality of commands is provided by the command generator 136, the service editor 134 may determine a method and an order to execute the plurality of commands and transmit the method and order to the response generation manager 131.

The response generation manager 131 may transmit the response, which is transmitted from the dialogue response generator 132, the command generator 136, or the service editor 134, to the output manager 133.

The output manager 133 may determine an output timing, an output sequence and an output position of the dialogue response generated by the dialogue response generator 132 and the command generated by the command generator 136.

The output manager 133 may output a response by transmitting the dialogue response generated by the dialogue response generator 132 and the command generated by the command generator 136 to an appropriate output position at an appropriate order with an appropriate timing. The output manager 133 may output Text to speech (TTS) response via the speaker 232 and a text response via the display 231. When outputting the dialogue response in the TTS type, the output manager 133 may use a TTS module provided in the vehicle 200 or alternatively the output manager 133 may include a TTS module.

According to the control target, the command may be transmitted to the vehicle controller 240 or the communication device 280 for communicating with the external content server 300.

The response generation manager 131 may also transmit the response transmitted from the dialogue response generator 132, the command generator 136, or the service editor 134, to the memory manager 135.

The output manager 133 may transmit a response that is output by itself, to the memory manager 135.

The memory manager 135 may manage the long-term memory 143 or the short-term memory 144 based on the content transmitted from the response generation manager 131 and the output manager 133. For example, the memory manager 135 may update the short-term memory 144 by storing the dialogue content between the user and the system, based on the generated and output dialogue response. The memory manager 135 may update the long-term memory 143 by storing information related to the user that is acquired by the dialogue with the user.

In the information stored in the short-term memory 144, the persistent information, e.g., user's preference or orientation, or information which is used to acquire the persistent information, may be stored in the long-term memory 143.

Based on the vehicle control and the external content request corresponding to the generated and output command, the user preference or the vehicle control history stored in the long-term memory 143 may be updated.

According to an aspect, the dialogue system 100 may recognize a preliminary indication related to the failure of the vehicle through the dialogue with the user so as to diagnose a part, which is not measured by a sensor, or to prepare a solution. Therefore, it may be possible to secure the user safety by inhibiting accidents.

In addition, the dialogue system 100 may increase learning data of the pre-diagnosis by receiving a feedback of the user through the dialogue after performing the diagnosis about the preliminary indication, thereby performing more accurate pre-diagnosis.

Hereinafter the dialogue processing and the vehicle state check by using the dialogue system 100 according to an aspect will be described in details.

FIGS. 26 to 42 are views illustrating that the dialogue system processes an input, manages a dialogue and suggests a solution when a user inputs an utterance indicating that the vehicle has problem.

Figure 26:
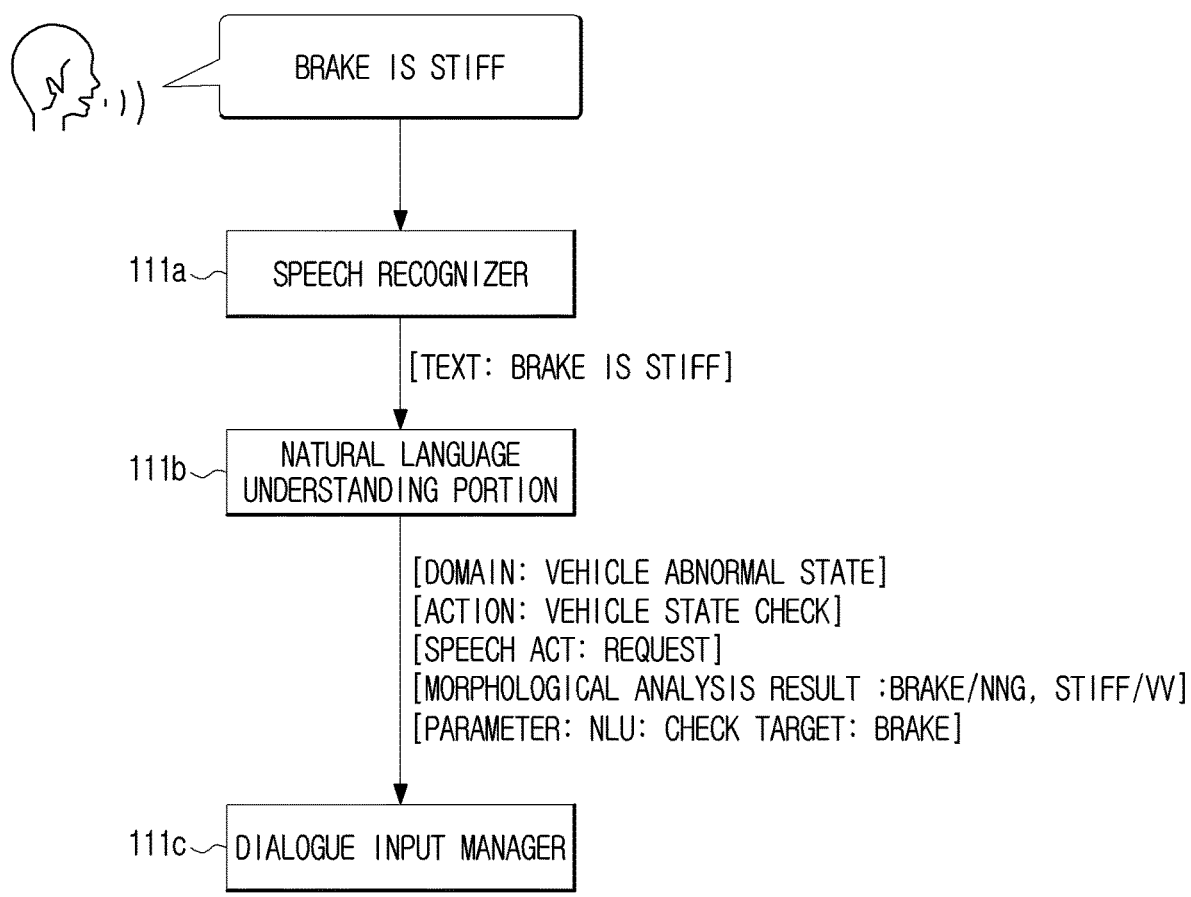
FIGS. 26 to 42 are views illustrating that the dialogue system processes an input, manages a dialogue and suggests a solution when a user inputs an utterance indicating that the vehicle has problem.

As illustrated in FIG. 26, when a user input an utterance "brake is stiff", the speech recognizer 111a may output the user's speech as the utterance in the text form (brake is stiff).

The natural language understanding portion 111b may perform the morphological analysis and output [domain: vehicle abnormal state], [action: vehicle state check],

[speech act; request], and [parameter: NLU: check target: brake] from a morphological analysis result (brake/NNG, stiff/VV), by referring to the domain/action inference rule DB 141 and then input them to the dialogue input manager 111c.

Figure 27:
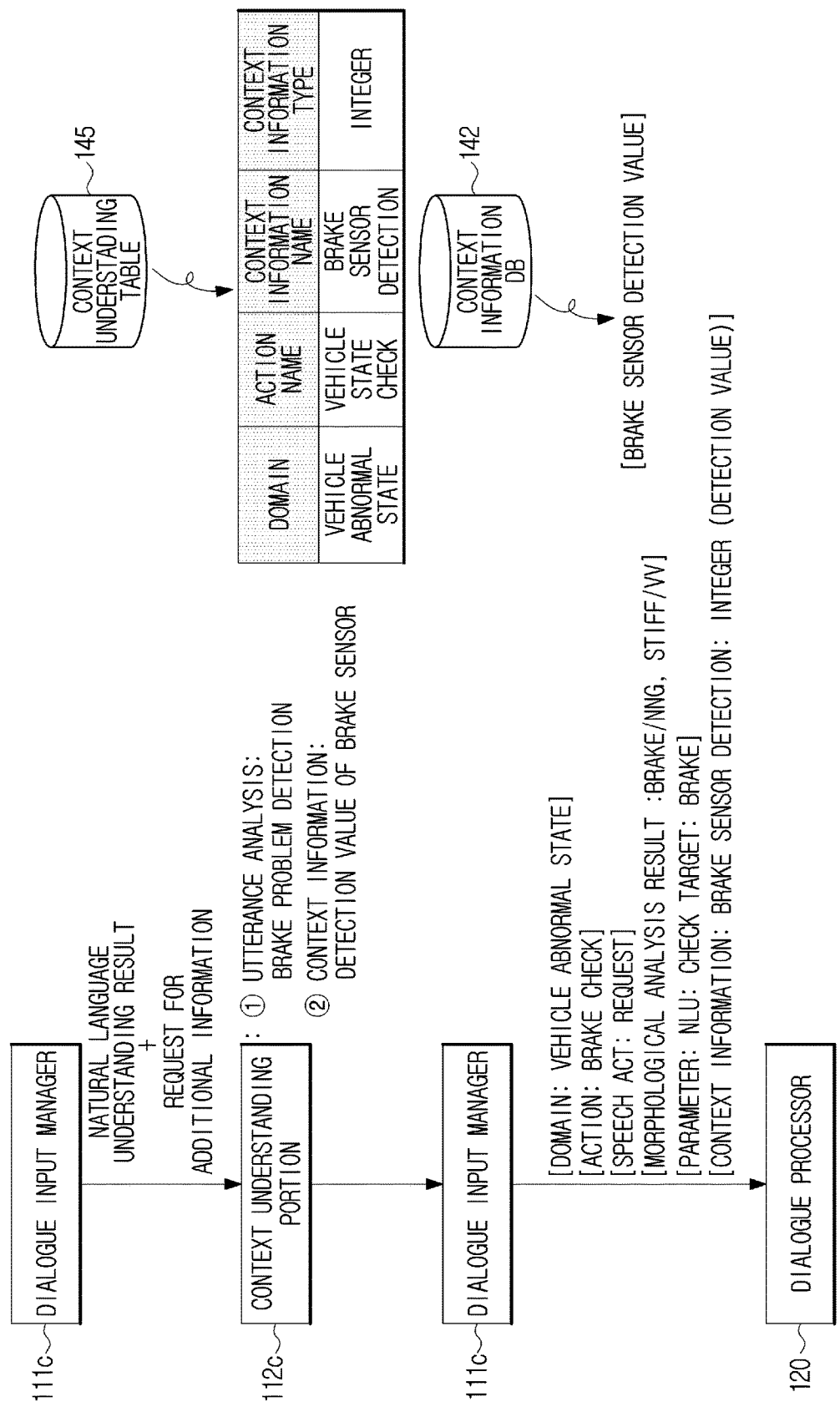

Referring to FIG. 27, while transmitting the natural language understanding result of the natural language understanding portion 111b to the context understanding portion 112c, the dialogue input manager 111c may request that the context understanding portion 112c send additional information when additional information is present in the context understanding portion 112c.

The context understanding portion 112c may search the context understating table 145 and extract a fact that context information related to [domain: vehicle abnormal state] and [action: vehicle state check], is brake sensor detection and the type of the context information is integer.

The context understanding portion 112c may extract a detection value of the brake sensor by searching the context information DB 142. When the detection value of the brake sensor is not stored in the context information DB 142, the context understanding portion 112c may request the detection value of the brake sensor to the context information collection manager 112b.

The context information collection manager 112b may transmit a signal to the context information collector 112a so that the context information collector 112a collects the detection value of the brake sensor. The context information collector 112a may collect the detection value of the brake sensor from the vehicle controller 240 and then store the detection value of the brake sensor in the context information DB 142 while sending a detection value of the brake sensor collection confirmation signal to the context information collection manager 112b. When the context information collection manager 112b transmits the detection value of the brake sensor collection confirmation signal to the context understanding portion 112c, the context understanding portion 112c may extract the detection value of the brake sensor from the context information DB 142 and then transmit the detection value of the brake sensor to the dialogue input manager 111c.

The dialogue input manager 111c may combine [domain: vehicle abnormal state], [action: vehicle state check], [speech act: request], [parameter: NLU: check target: brake] and [context information: brake sensor detection: integer (detection value)] which are the natural language understanding result and then transmit the combined information to the dialogue manager 120.

Figure 28:
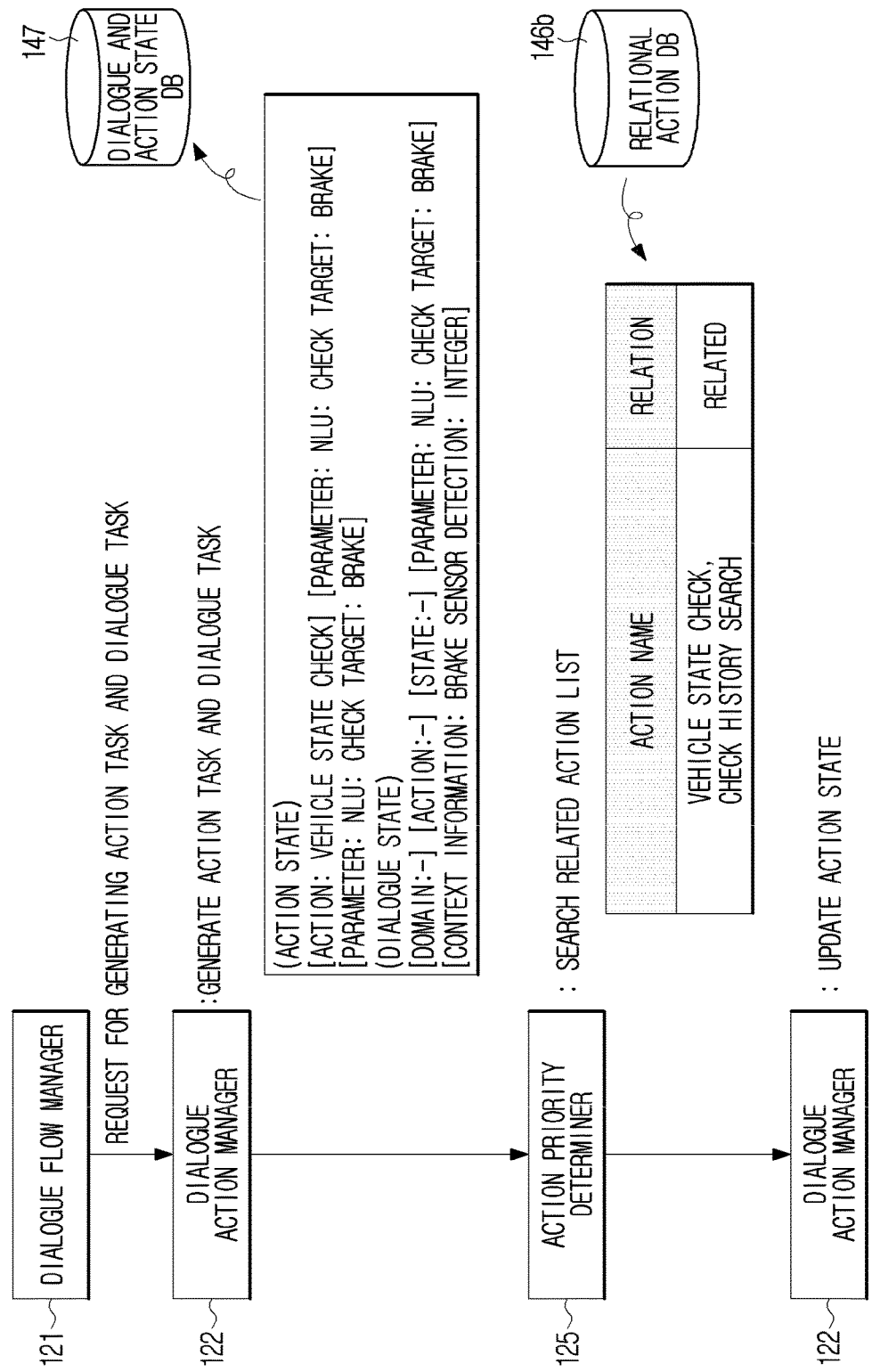

Referring to FIG. 28, the dialogue flow manager 121 may search the dialogue and action state DB 147 and determine whether dialogue task or action task, which is currently progressing, is present. In this time, the dialogue flow manager 121 may refer to the dialogue policy DB 148. According to the aspect, it is assumed that dialogue task or action task, which is currently progressing, is not present.

The dialogue flow manager 121 may request that the dialogue action manager 122 generates an action task and dialogue task corresponding to the output of the input processor 110. The generation of the action task and dialogue task may represent designating a storage space for storing and managing the information related to the action state and the dialogue state.

Therefore, the dialogue action manager 122 may designate the storage space in the dialogue and action state DB 147 to store the information related to the action state and the dialogue state.

The dialogue action manager 122 may transmit the action state and the dialogue state to the action priority determiner 125.

The action priority determiner 125 may extract the maintenance history search, which is an action related to the vehicle state check, from the relational action DB 146b. The maintenance history search may become candidate actions of the vehicle state check action.

The action priority determiner 125 may determine the priority of the candidate actions according to the pre-stored rules. Before the execution condition of the candidate action is determined, the priority may be determined or alternatively after the execution condition of the candidate action is determined, the priority may be determined about only candidate action which meets the execution condition.

The candidate action list may be transmitted to the dialogue action manager 122, again, and the dialogue action manager 122 may update the action state by adding the searched relational actions.

Figure 29:
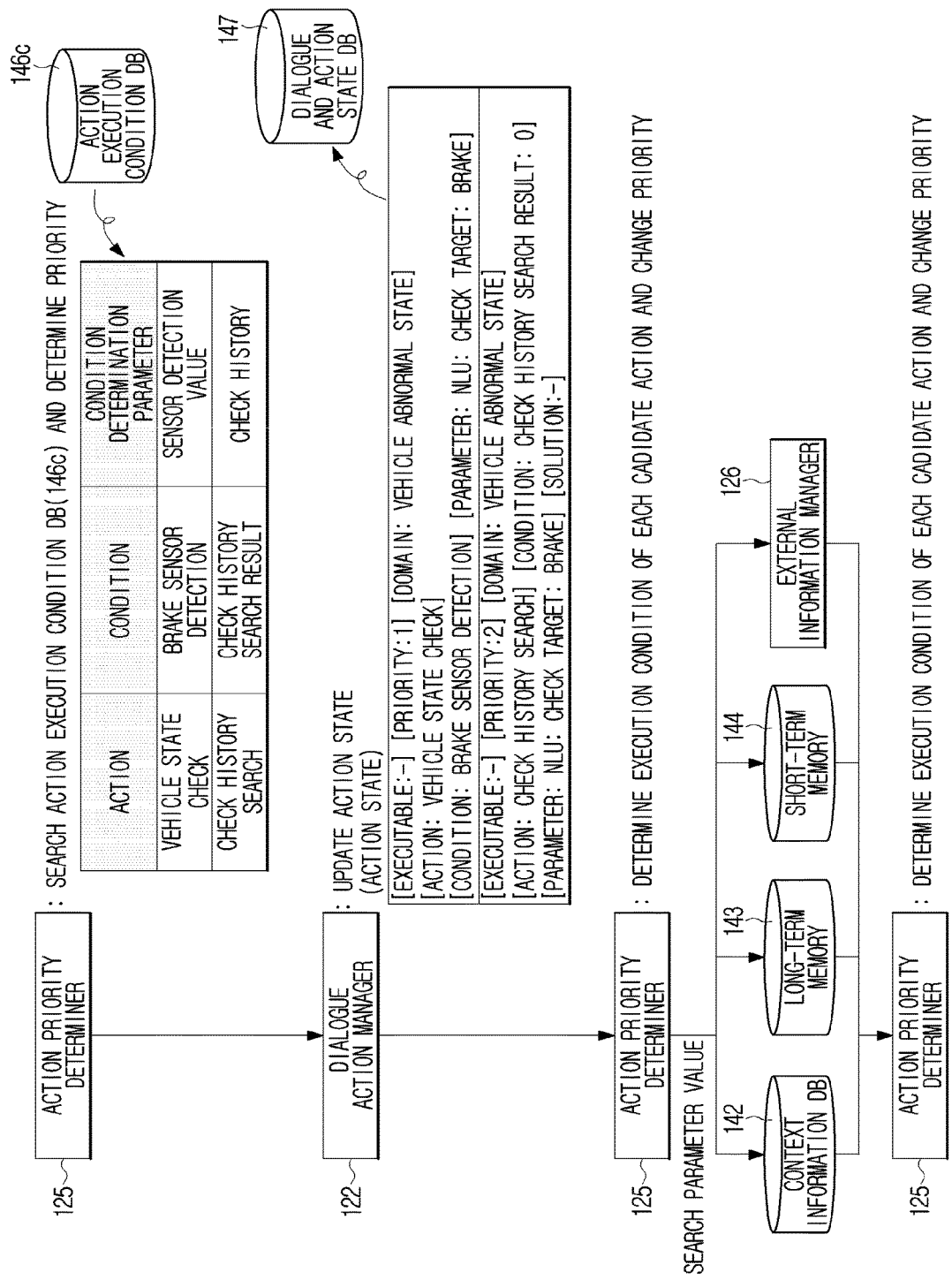

Referring to FIG. 29, the action priority determiner 125 may search for an execution condition about each candidate action or parameters to determine the execution condition in the action execution condition DB 146c. The action priority determiner 125 may also determine the priority among the candidate actions.

For example, a condition for the vehicle state check may be a detection value of the sensor provided in the brake among the vehicle detector 260. In addition, a condition, which is related to the vehicle state check action, is not satisfied, the check history search action may be the next step action.

The dialogue action manager 122 may update the action state by adding the condition for executing the each candidate action and a parameter needed to determine the condition, to the dialogue and action state DB 147.

According to an aspect, the dialogue action manager 122 may update the action state, as illustrated in FIG. 29.

Particularly, the dialogue action manager 122 may update the action state further including [domain: vehicle abnormal state], [action: vehicle state check], [speech act: request], and [parameter: NLU: check target: brake], by including a parameter [executable:-] determining the possibility of the execution, and a parameter [priority: 1] determining the priority.

In addition, the dialogue action manager 122 may update the action state including [executable:-], [priority: 1], [domain: vehicle abnormal state], [action: vehicle state check], [speech act: request], and [parameter: NLU: check target: brake], and [solution:-].

The action priority determiner 125 may search for a parameter value that is needed to determine whether the candidate action meets the execution condition or not, in the dialogue and action state DB 147, the context information DB 142, the long-term memory 143, or the short-term memory 144 and bring the parameter value from the dialogue and action state DB 147, the context information DB 142, the long-term memory 143, or the short-term memory 144.

When the parameter value is contained in the previous dialogue content, in the context information related to the dialogue content, or in the context information related to the generated event, the action priority determiner 125 may bring the parameter value from the dialogue and action state DB 147.

When the action priority determiner 125 is not allowed to bring the parameter value from the dialogue and action state DB 147, the context information DB 142, the long-term memory 143, or the short-term memory 144, the action priority determiner 125 may request the parameter value to the external information manager 126.

According to an aspect, a content that is uttered by a user may not satisfy a vehicle state check condition. For example, "brake is stiff" is not detected by the sensor configured to detect a problem in the brake, but "brake is stiff" is a preliminary indication before the failure in the vehicle, which is detected by the user's sense to determine a problem in the vehicle. The action priority determiner 125 may not collect a detection value of the sensor from the dialogue and action state DB 147, the context information DB 142, the long-term memory 143, or the short-term memory 144, or the action priority determiner 125 may not collect a detection value that is determined as the failure in the vehicle. In this case, the action priority determiner 125 may determine that the vehicle state check condition is not satisfied, and transmit the condition determination parameter to the dialogue action manager 122.

In addition, the action priority determiner 125 may search whether a condition of the check history search corresponding to the priority 2 is satisfied, from the external information manager 126.

According to an aspect, the external information manager 126 may request a solution for the preliminary indications from the external content server 300 and provide the solution. Therefore, the external information manager 126 may transmit a condition determination parameter value related to the check history search action, such as check history is "present", to the action priority determiner 125.

The action priority determiner 125 may determine an execution condition for each candidate action, by collecting the condition determination parameter value. The action priority determiner 125 may transmit a signal requesting the change of the priority, to the dialogue action manager 122.

Figure 30:
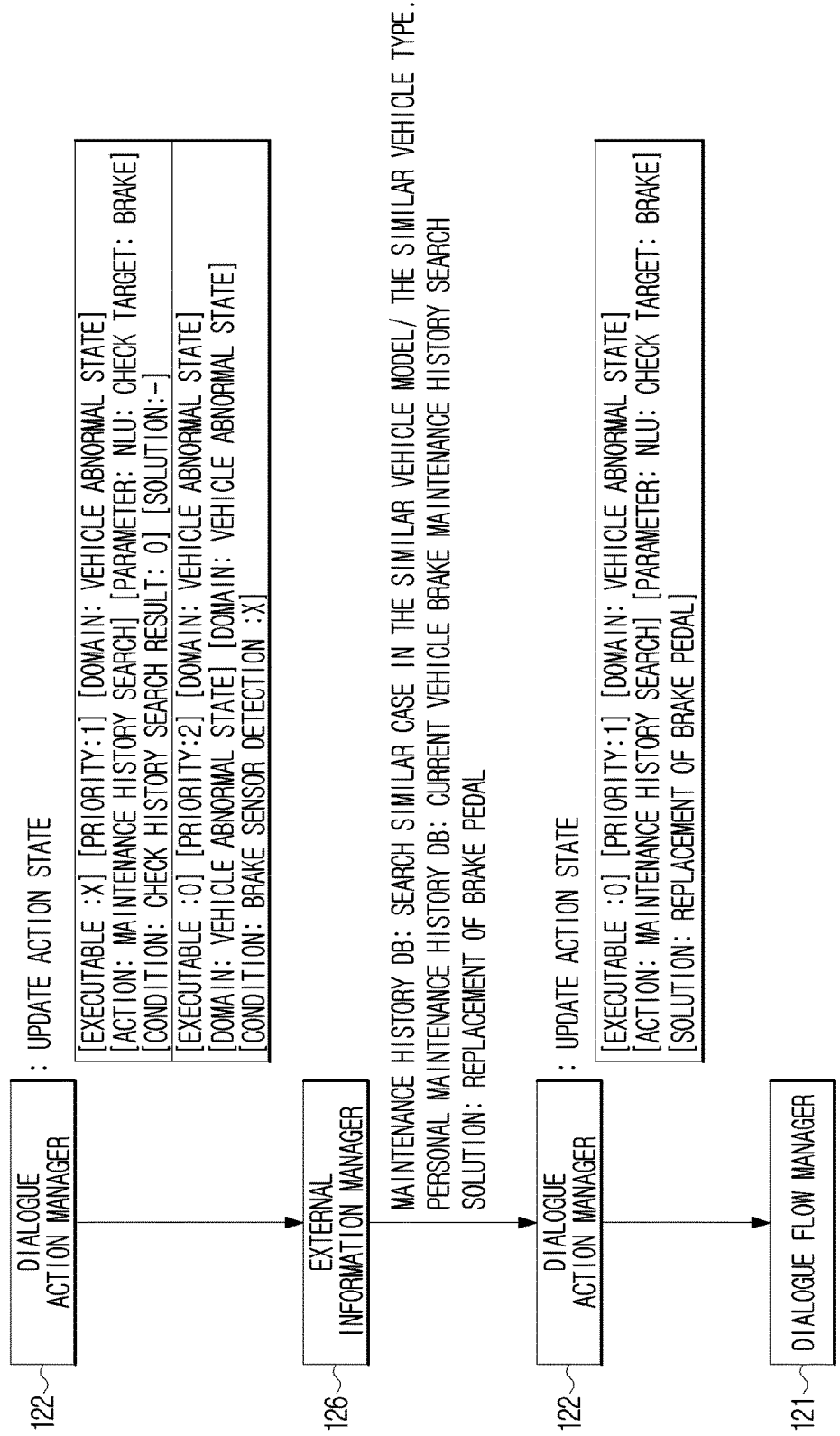

As illustrated in FIG. 30, the dialogue action manager 122 may update the action state according to a signal of the action priority determiner 125.

The dialogue action manager 122 may search for a parameter value for executing the check history search action whose priority is changed to the priority 1. In other words, the dialogue action manager 122 may search for a solution according to the vehicle abnormal state. Particularly, the dialogue action manager 122 may request the solution to the external information manager 126.

The external information manager 126 may search for similar cases related to the vehicle abnormal state, and the personal maintenance history of the vehicle 200, in the similar vehicle model/the similar vehicle type, which is previously searched and then stored in the maintenance diagnosis DB 146e.

When the similar case and the maintenance history is not searched, the external information manager 126 may request search for the similar case or the maintenance history, to the external content server 300 and request a solution based on the information, as illustrated in FIG. 21.

The similar case or the maintenance history and the solution thereof may vary and a detail description thereof will be described with reference to FIG. 44.

According to an aspect, the external information manager 126 may collect "replacement of the brake pedal" corresponding to the solution for the user vehicle abnormal state. The external information manager 126 may transmit the collected solution to the dialogue action manager 122 and the dialogue action manager 122 may update the action state as [solution: replacement of pedal].

Figure 31:
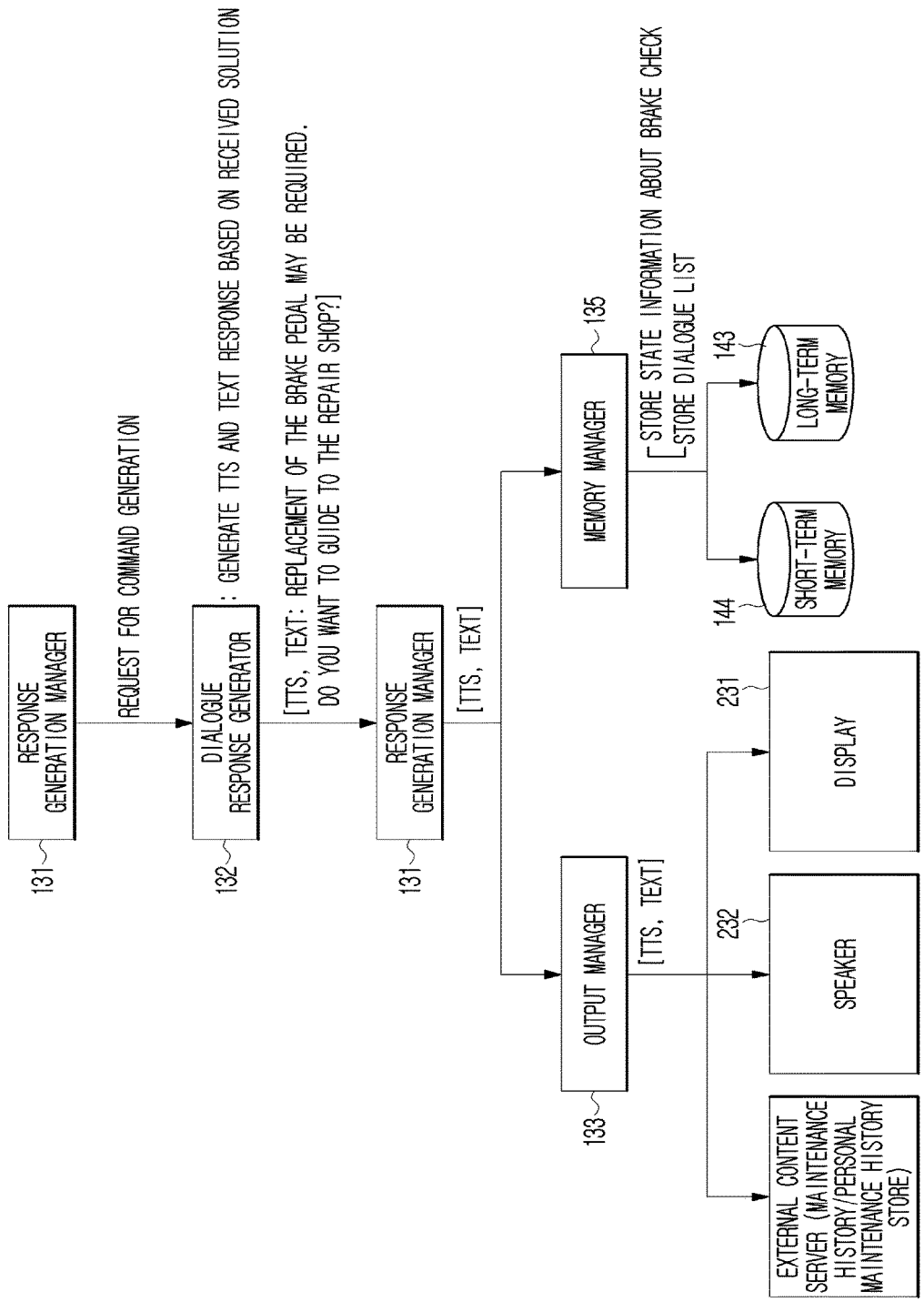

Referring to FIG. 31, the response generation manager 131 may generate a TTS response and a text response by searching the response template 149.

The dialogue response generator 132 may generate a TTS response and a text response by searching the response template 149. For example, the response generation manager 131 may generate a dialogue response configured to output "the replacement of the brake pedal is required. Do you want to guide to the repair shop?" as TTS and text form.

The response generation manager 131 may transmit TTS response and text response generated by the dialogue response generator 132 to the output manager 133 and the memory manager 135, and the output manager 133 may transmit the TTS response to the speaker 232 and transmit the text response to the display 231. In this time, the output manager 133 may transmit the TTS response to the speaker 232 after passing thorough the TTS module configured to combine the text to the speech.

The output controller 133 may transmit information that the replacement of the brake pedal is performed as the solution for the vehicle abnormal state, to the external content server 400, and store the information in the maintenance history DB 300a or the personal maintenance history DB 300b. The above-mentioned data may be used as a solution for next vehicle abnormal state and for another vehicle.

The memory manager 135 may store data that the user utters the vehicle abnormal state, the check object is the brake, and the solution is the replacement of the brake pedal, in the short-memory 144 or the long-term memory 143.

Figure 32:
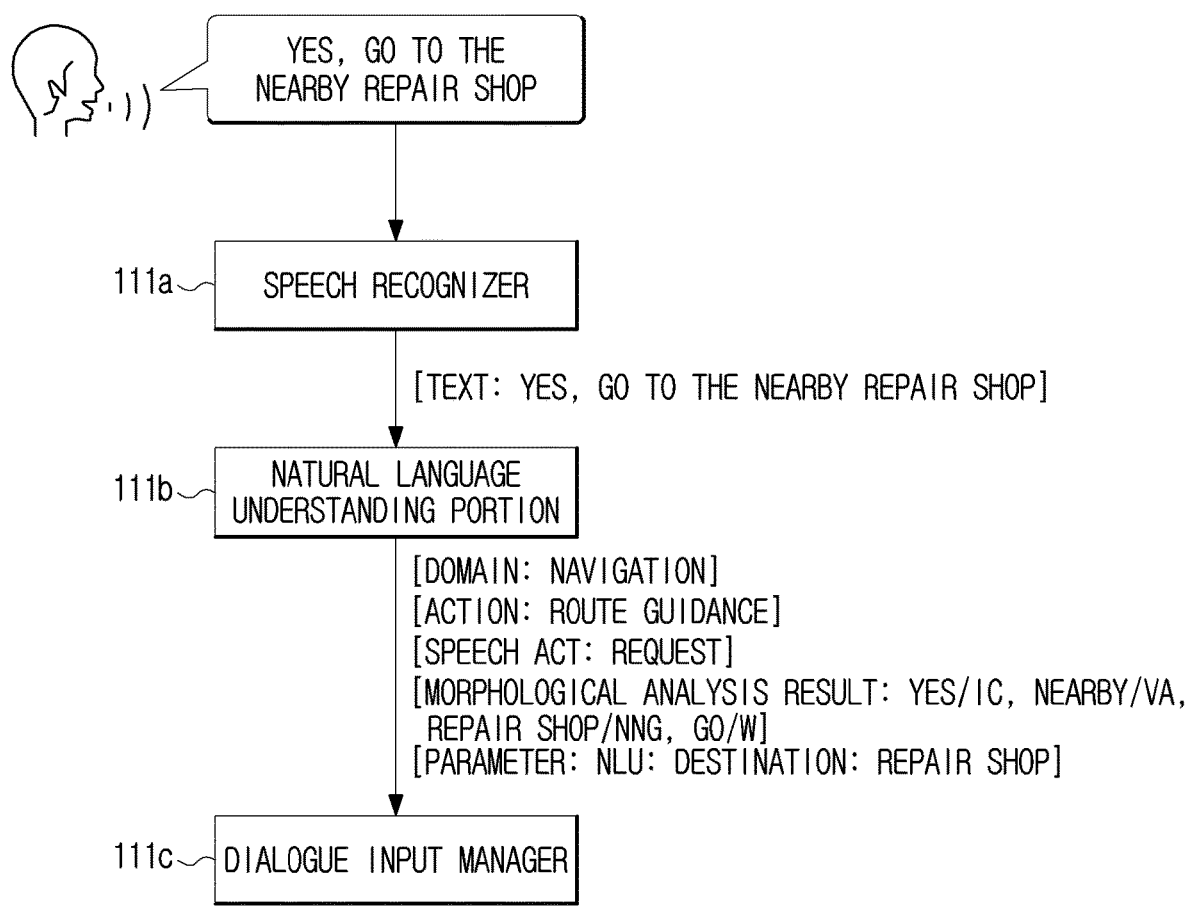
Figure 33:
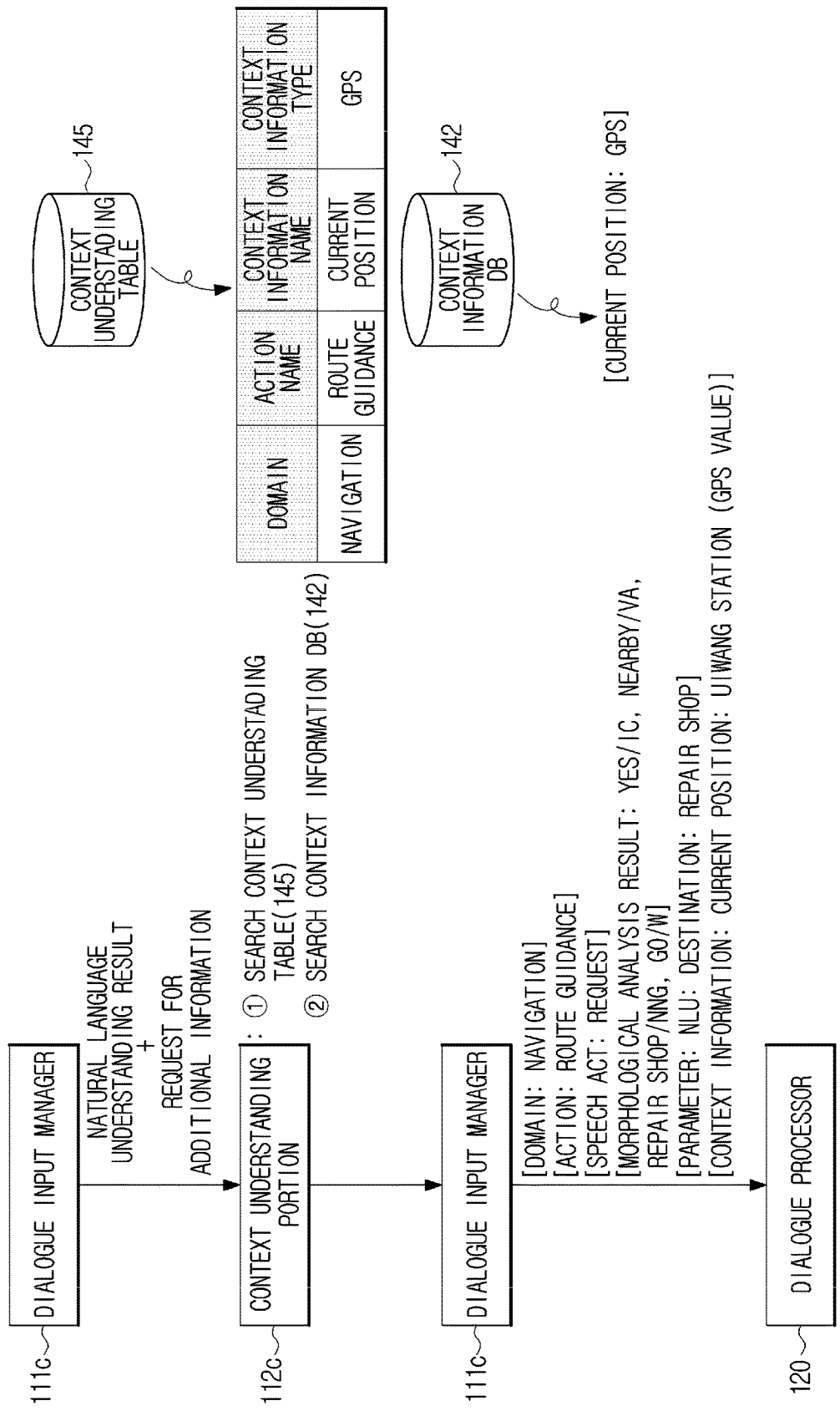

The dialogue response configured to ask "the replacement of the brake pedal is required. Do you want to guide to the repair shop?" may be output via the display 231 and the speaker 232. As illustrated in FIG. 32, when a user utters "yes, go to the nearby repair shop", the user's utterance may be input to the speech recognizer 111a and then output as [text: yes, go to the nearby repair shop] and the natural language understanding portion 111b may output [domain: navigation], [action: route guidance], [speech act: request], [morphological analysis result: yes/IC, nearby/VA, repair shop/NNG, go/W] and [parameter: NLU: destination: repair shop].

The natural language understanding result may be transmitted to the dialogue input manager 111c and the dialogue input manager 111c may transmit the natural language understanding result to the dialogue manager 120.

Referring to FIG. 31, while transmitting the natural language understanding result of the natural language understanding portion 111b to the context understanding portion 112c, the dialogue input manager 111c may request that the context understanding portion 112c sends additional information when additional information is present in the context understanding portion 112c.

The context understanding portion 112c may search the context understating table 145 and extract a fact that context information related to [domain: navigation] and [action: route guidance], is the current position and the type of the context information is GPS value.

The context understanding portion 112c may extract a GPS value of the current position by searching the context information DB 142. When the GPS value of the current position is not stored in the context information DB 142, the context understanding portion 112c may request the GPS value of the current position to the context information collection manager 112b.

The context information collection manager 112b may transmit a signal to the context information collector 112a so that the context information collector 112a collects the GPS value of the current position. The context information collector 112a may collect the GPS value of the current position from the vehicle controller 240 and then store the GPS value of the current position in the context information DB 142 while sending a GPS value collection confirmation signal to the context information collection manager 112b. When the context information collection manager 112b transmits the GPS value collection confirmation signal to the context understanding portion 112c, the context understanding portion 112c may extract the GPS value of the current position from the context information DB 142 and then transmit the GPS value of the current position to the dialogue input manager 111c.

The dialogue input manager 111c may combine [domain: navigation], [action: route guidance], [speech act; request], [morphological analysis result: yes/IC, nearby/VA, repair shop/NNG, go/W], [parameter: NLU: destination: repair shop] and [context information: current position: Uiwang station (GPS value)], which are the natural language understanding result, and then transmit the combined information to the dialogue manager 120.

Figure 34:
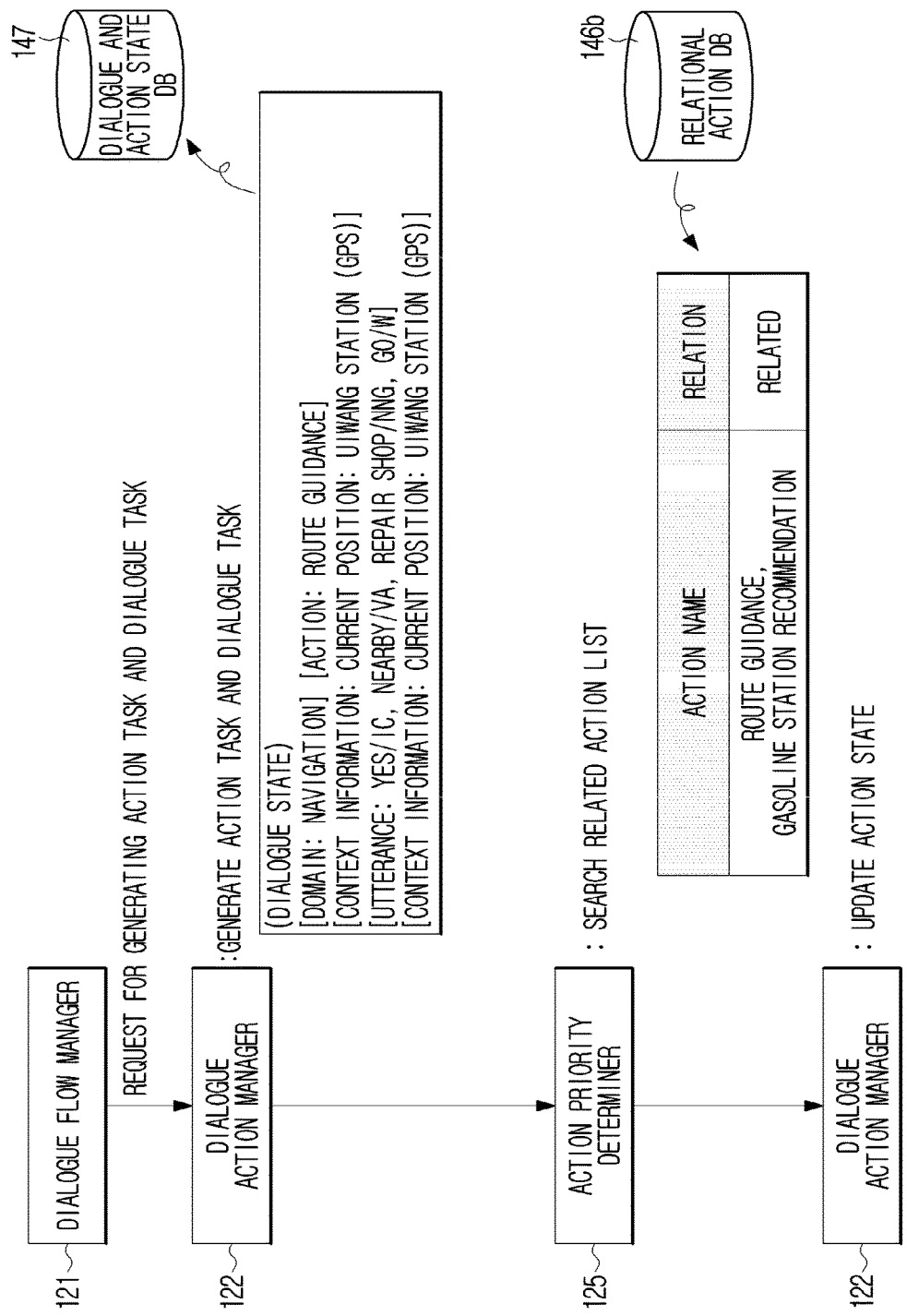

Referring to FIG. 34, the dialogue flow manager 121 may search the dialogue and action state DB 147 and determine whether dialogue task or action task, which is currently progressing, is present. In this time, the dialogue flow manager 121 may refer to the dialogue policy DB 148.

Referring the previous dialogue state, the dialogue flow manager 121 may generate [domain: navigation], [action: route guidance], [state: require replacement of brake pedal], [parameter: NLU: destination: repair shop] and [context information: current position: Uiwang station (GPS value)].

The dialogue action manager 122 may transmit the generated dialogue state to the action priority determiner 125.

The action priority determiner 125 may search for the gasoline station recommendation, which is related to the route guidance, in the relational action DB 146b. The route guidance action and the gasoline station recommendation action may become candidate actions.

The candidate action list may be transmitted to the dialogue action manager 122, again, and the dialogue action manager 122 may update the action state by adding the searched relational actions.

Figure 35:
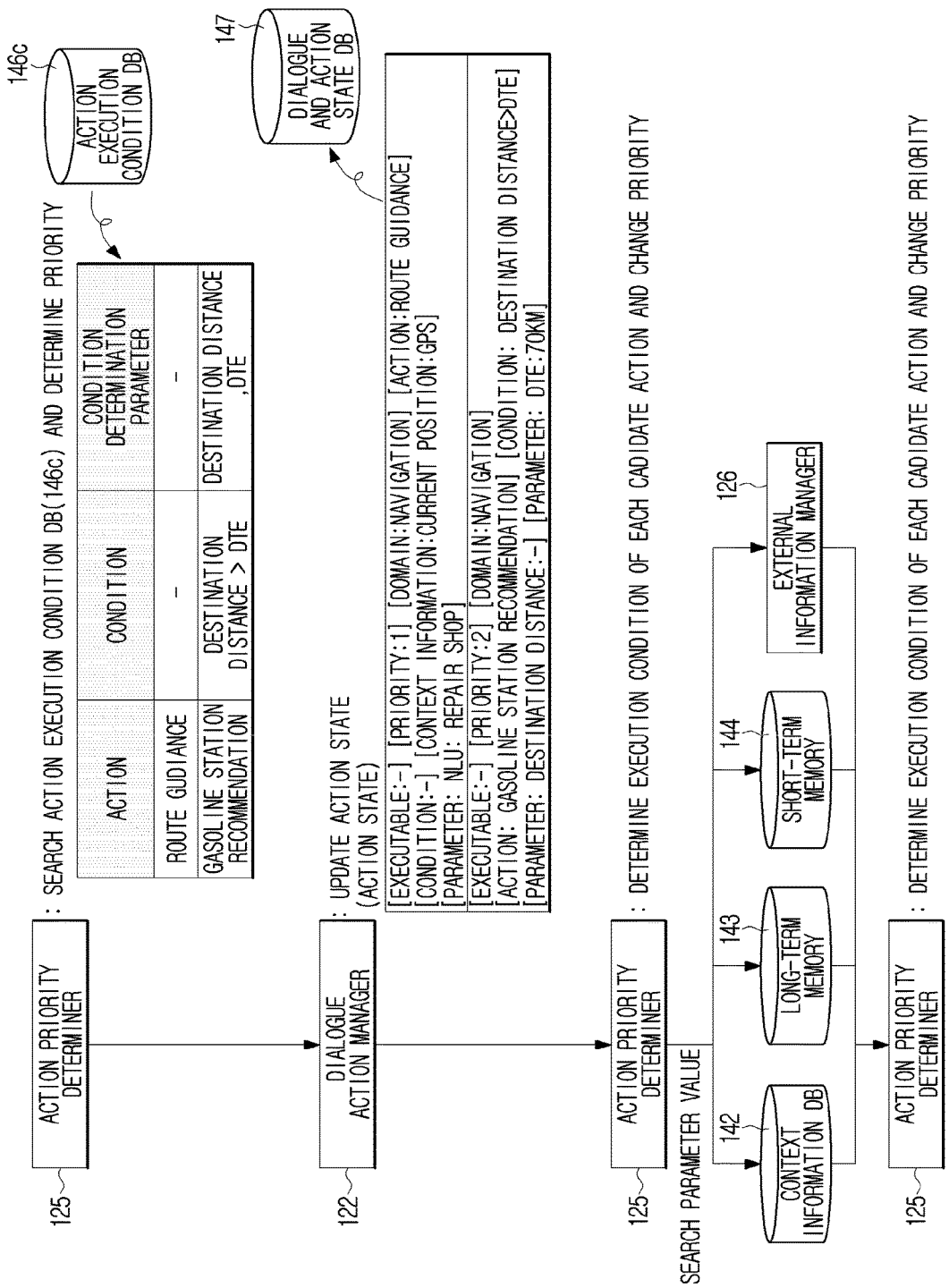

Referring to FIG. 35, the action priority determiner 125 may search for an execution condition about each candidate action or parameters to determine the execution condition in the action execution condition DB 146c.

According to an aspect, a condition for the gasoline station recommendation may be a case in which a destination distance is greater than a distance to empty (DTE), wherein a parameter for determining the condition may correspond to the destination distance and the distance to empty (DTE).

The dialogue action manager 122 may update the action state by adding the condition for executing the each candidate action and a parameter needed to determine the condition, to the dialogue and action state DB 147.

The action priority determiner 125 may search for a parameter value that is needed to determine whether the candidate action meets the execution condition or not, in the dialogue and action state DB 147, the context information DB 142, the long-term memory 143, or the short-term memory 144 and bring the parameter value from the dialogue and action state DB 147, the context information DB 142, the long-term memory 143, or the short-term memory 144.

When the action priority determiner 125 is not allowed to bring the parameter value from the dialogue and action state DB 147, the context information DB 142, the long-term memory 143, or the short-term memory 144, the action priority determiner 125 may request the parameter value to the external information manager 126.

For example, the destination distance may be brought from the external content server 300 providing a navigation service, and DTE may be brought from the context information DB 142 via the external information manager 126. Meanwhile, in order to search for the destination distance, correct destination information used for the navigation service may be needed. In such a case, a destination which is input from the user's utterance may correspond to "nearby repair shop", wherein "nearby repair shop" may include a variety of places according to the current position and thus a meaning of "nearby repair shop" is ambiguous. Therefore, it may be difficult to search for a correct destination distance by using only "nearby repair shop".

As needed, it may be possible to bring the parameter value from the mobile device 400 connected to the vehicle 200. For example, when user information, e.g., contacts, and schedule which are not stored in the long-term memory 143, is needed as the parameter value, the external information manager 126 may request the needed information to the mobile device 400 and then acquire the needed parameter value.

The action priority determiner 125 may determine the execution condition of the candidate action by using the parameter value. Since the destination distance is not searched, the determination of the execution condition related to the gasoline station recommendation may be postponed.

Figure 36:
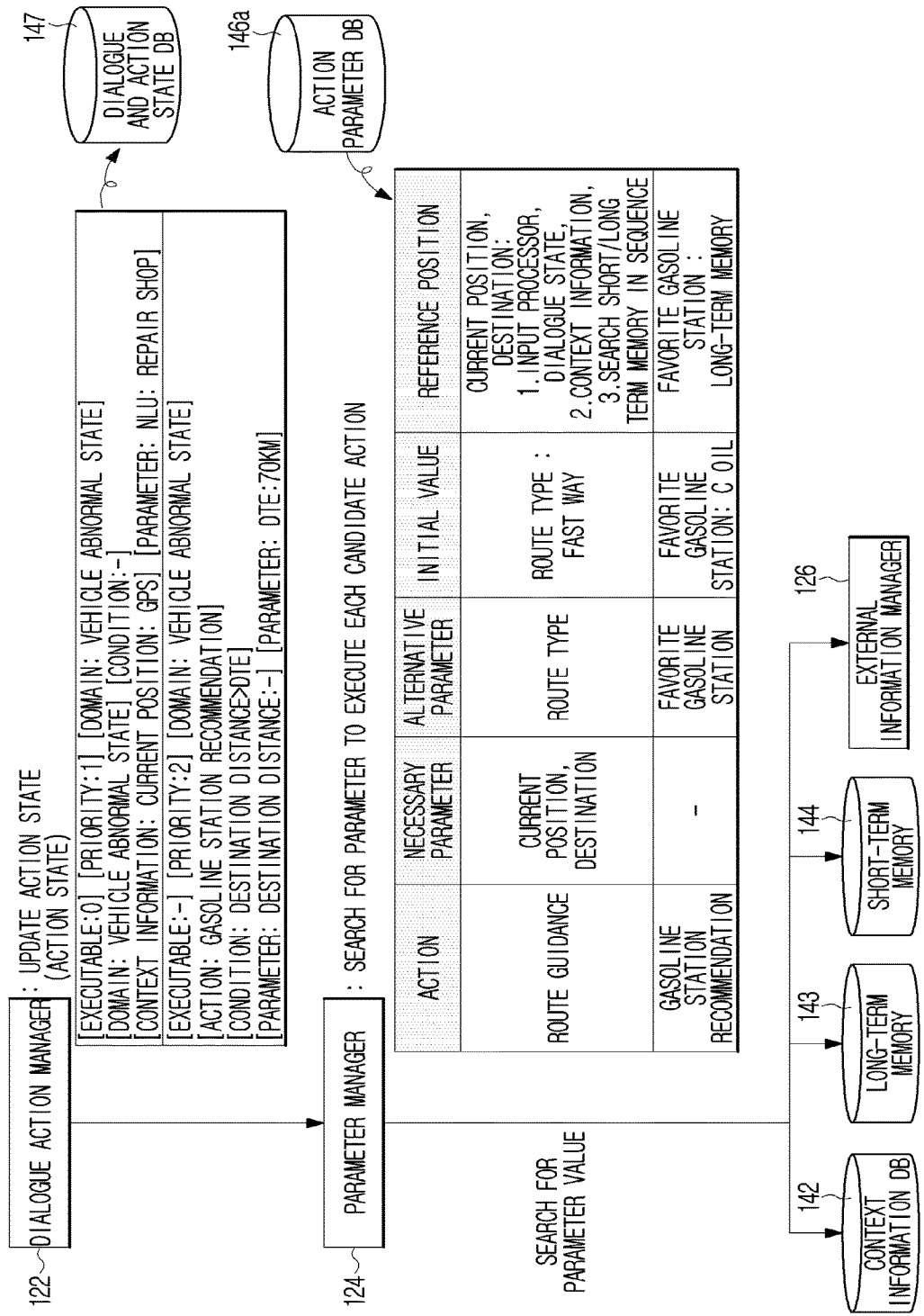

As illustrated in FIG. 36, the dialogue action manager 122 may update the action state by adding the acquired parameter value and whether to meet the action execution condition, which is determined by using the corresponding parameter value, to the dialogue and action state DB 147.

The dialogue action manager 122 may request the parameter list used to execute the candidate actions, to the parameter manager 124.

The parameter manager 124 may extract the current position and destination as the desired parameter used for the execution of the route guidance action, from the action parameter DB 146a and extract the route type (initial value: fast route) as the alternative parameter. The parameter manager 124 may extract the favorite gasoline station (initial value: C-oil) as the alternative parameter used for the execution of the gasoline station recommendation action.

The extracted parameter list may be transmitted to the dialogue action manager 122 and used for updating the action state.

The parameter manager 124 may search for the corresponding parameter value in the reference position of each parameter in the dialogue and action state DB 147, the context information DB 142, the long-term memory 143 and the short-term memory 144 to acquire a parameter value corresponding to the desired parameter and the alternative parameter of the candidate actions. When it is needed that the parameter value is provided via the external service, the parameter manager 124 may request the needed parameter value to the external content server 300 via the external information manager 126.

The parameter used to determine the execution condition of the candidate action and the parameter used to execute the candidate action may be duplicated. When there is a parameter corresponding to a parameter (desired parameter and alternative parameter) used to execute the candidate actions, among the parameter values, which is acquired by the action priority determiner 125 and then stored in the dialogue and action state DB 147, the corresponding parameter may be used.

Figure 37:
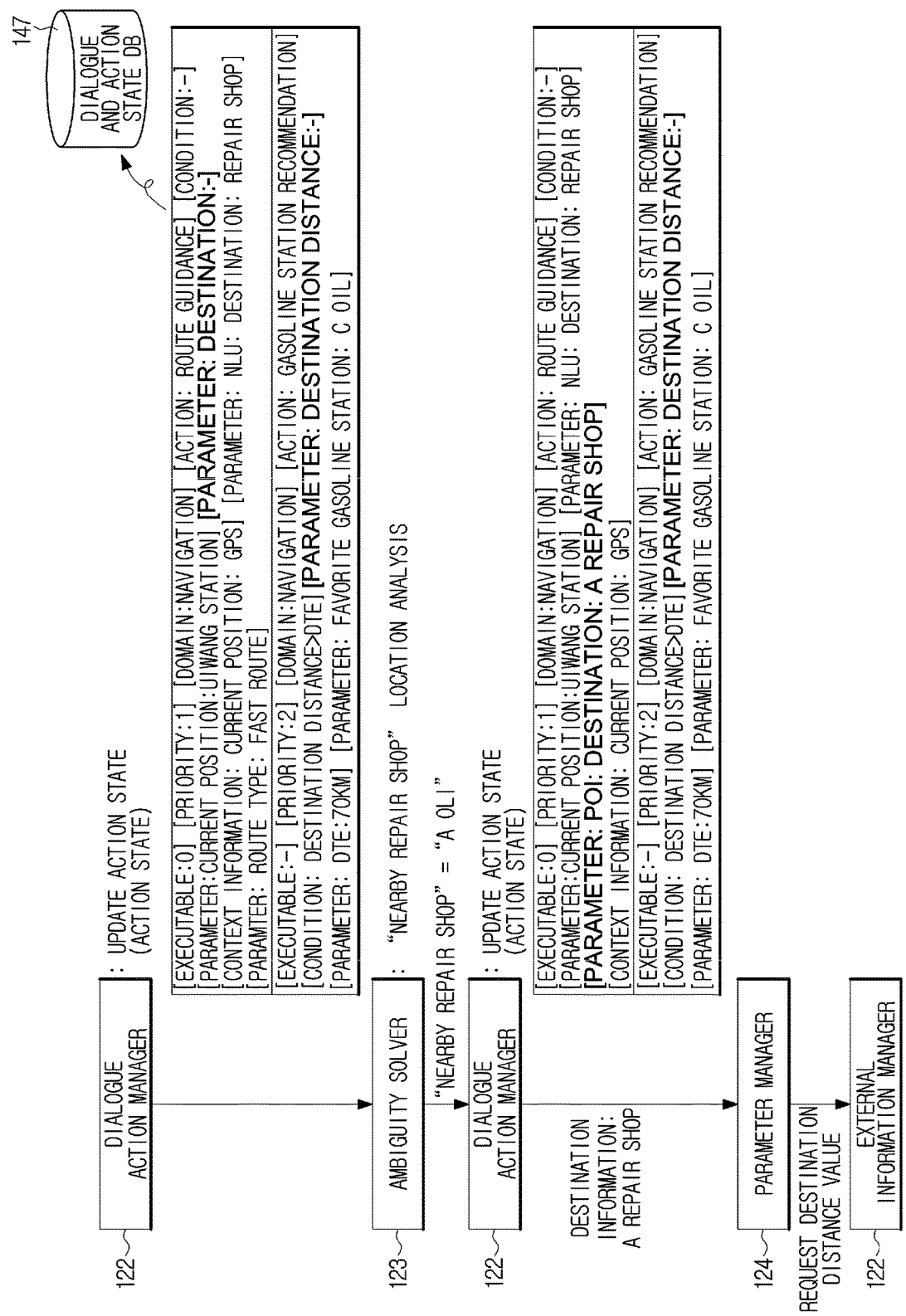

Referring to FIG. 37, the dialogue action manager 122 may update the action state by adding the parameter value acquired by the parameter manager 124.

As mentioned above, when using a destination (nearby repair shop) extracted from the user's utterance as the parameter of the route guidance action, there may be the ambiguity. Therefore, a parameter of the route guidance action (destination), and a parameter of the gasoline station recommendation (destination distance) may be not yet acquired.

The ambiguity solver 123 may check whether there is the ambiguity when [parameter: NLU: destination: repair shop] is converted into a destination parameter appropriate for the route guidance action. As mentioned above, "nearby repair shop" may vary according to the current position.

The ambiguity solver 123 may confirm that there is a modifier for "repair shop" among the user utterance, by referring to the morphological analysis result. The ambiguity solver 123 may search for the current position in the long-term memory 143 or the short-term memory 144 to identify the location of "nearby repair shop".

For example, the ambiguity solver 123 may confirm that "A repair shop" is "nearby repair shop", from the user's current position. After confirming that POI, e.g., "A repair shop" is present, the ambiguity solver 123 may bring the corresponding value.

The destination information acquired by the ambiguity solver 123 may be transmitted to the dialogue action manager 122 and the dialogue action manager 122 may update the action state by adding "A repair shop" to the destination parameter of the candidate action.

The parameter manager 124 may bring the destination information (A repair shop) from the dialogue and action state DB 147 and request a destination distance value to the external content server 300 providing the navigation service via the external information manager 126.

Figure 38:
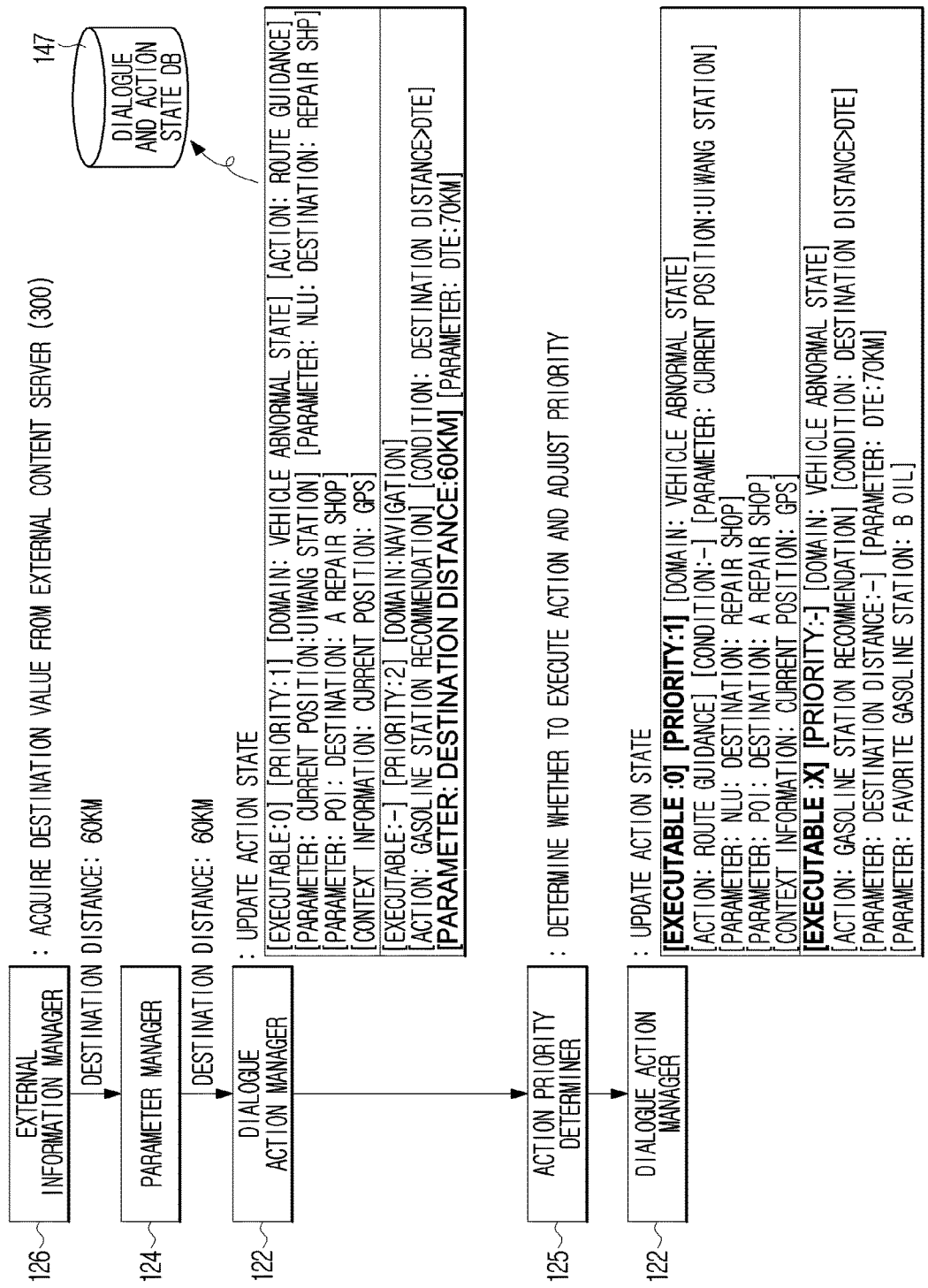

Referring to FIG. 38, when the external information manager 126 acquires the destination distance value (60 km) from the external content server 300 and then transmit the destination distance value to the parameter manager 124, the parameter manager 124 may transmit the destination distance value to the dialogue action manager 122 to allow the action state to be updated.

The action priority determiner 125 may determine whether the candidate actions is executable by referring to the action state, and adjust the priority of the candidate actions. It may be determined that the route guidance action is executable since the parameter value of the current position and destination which are the desired parameter are acquired. It may be determined that the vehicle state check action is not executable since the destination distance (60 km) is less than DTE. Therefore, the gasoline station recommendation is not executable and thus it is ruled out from the determination of the priority.

Figure 39:
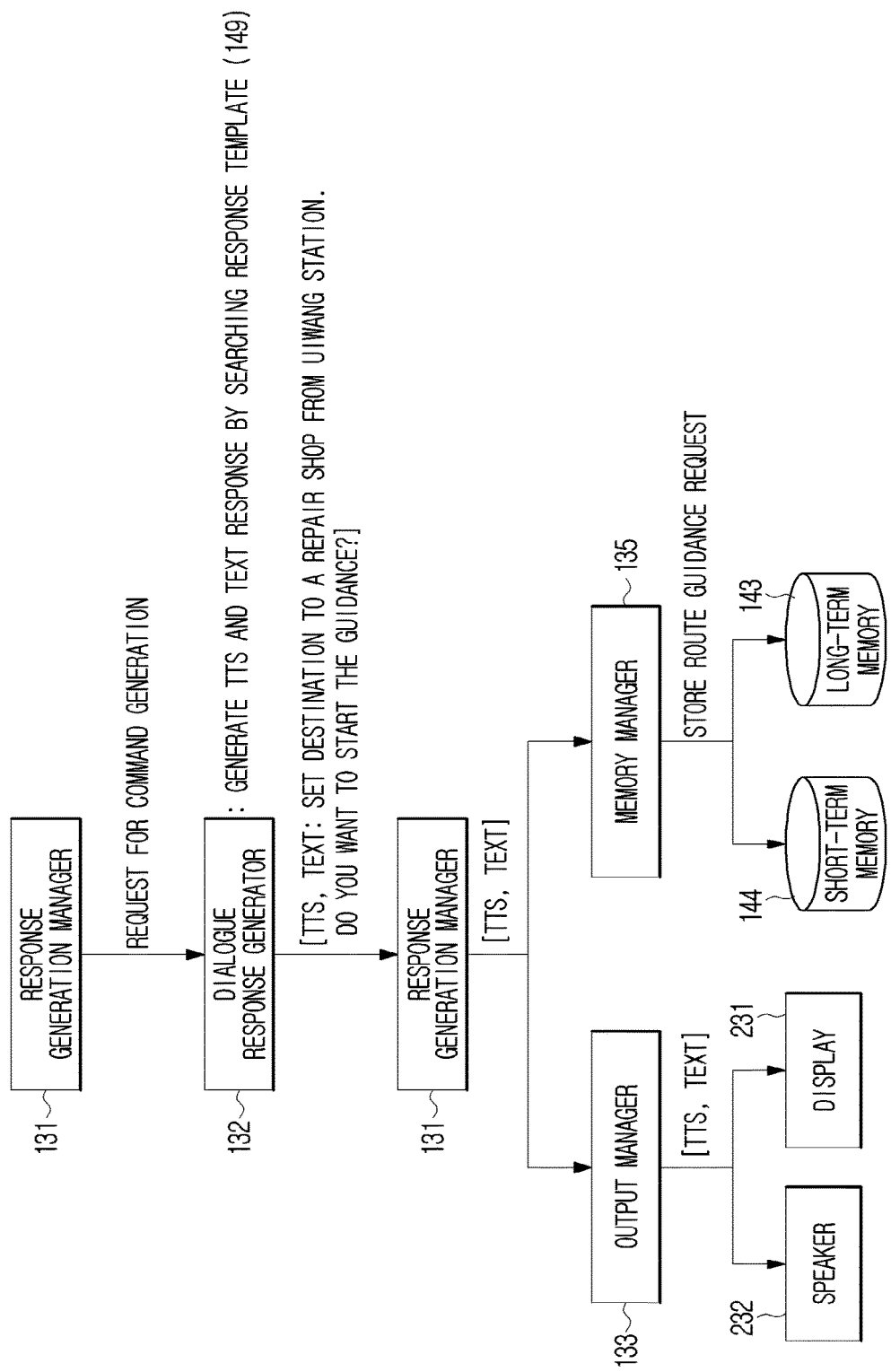

Referring to FIG. 39, the response generation manager 131 may request the generation of the response to the 132 in response to the 121.

The dialogue response generator 132 may generate a TTS response and a text response by searching the response template 149. The dialogue response generator 132 may generate a dialogue response configured to output "A repair shop is set as destination from Uiwang station. Do you want to start the guidance?" as TTS and text form.

The response generation manager 131 may transmit TTS response and text response generated by the dialogue response generator 132 to the output manager 133 and the memory manager 135, and the output manager 133 may transmit the TTS response to the speaker 232 and transmit the text response to the display 231. In this time, the output manager 133 may transmit the TTS response to the speaker 232 after passing thorough the TTS module configured to combine the text to the speech.

The memory manager 135 may store that a user requests the route guidance, in the short-term memory 144 or the long-term memory 143.

Figure 40:
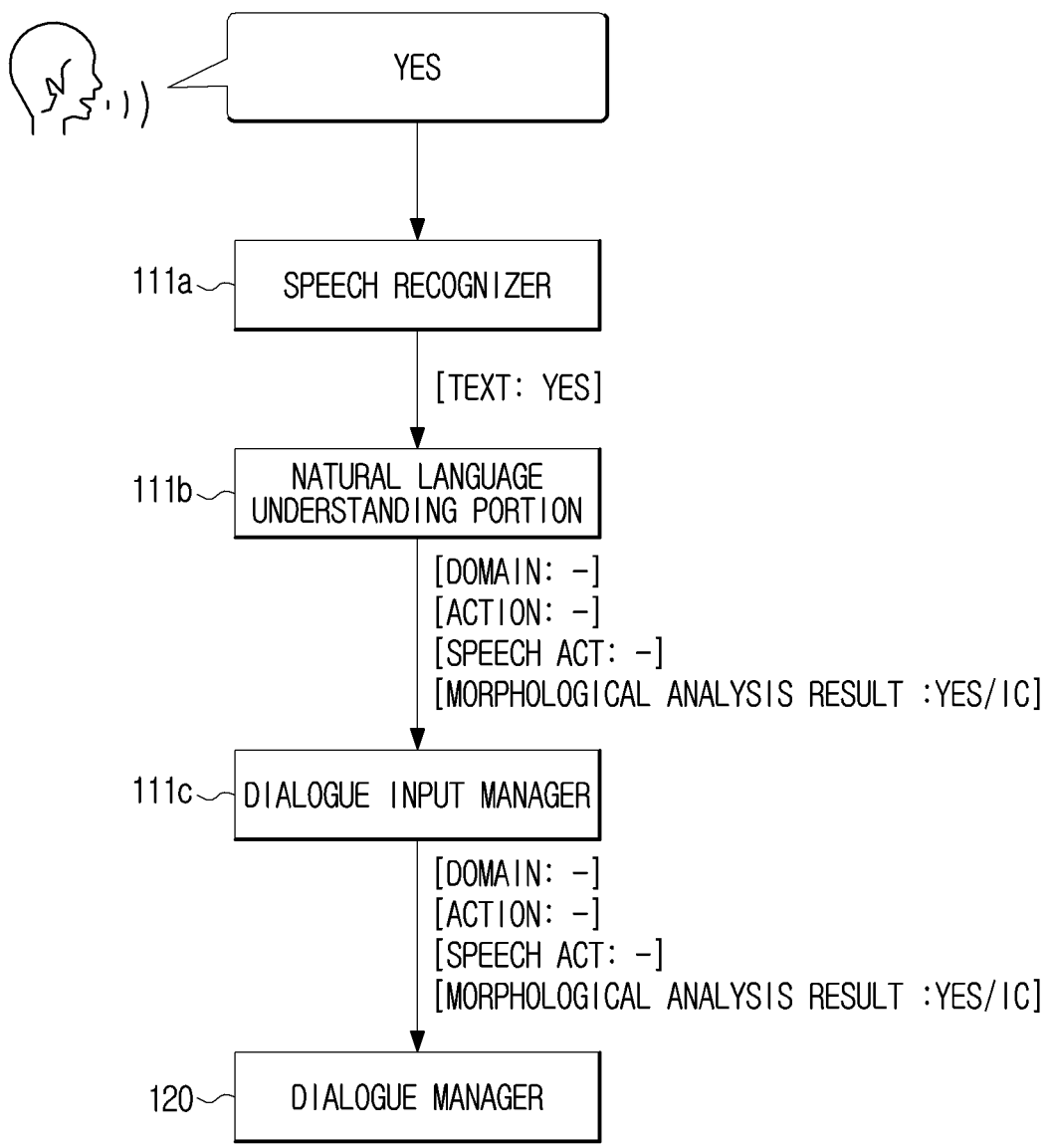

The dialogue response configured to ask "A repair shop is set as destination from Uiwang station. Do you want to start the guidance?" may be output via the display 231 and the speaker 232. As illustrated in FIG. 40, when a user utters "yes", the user's utterance may be input to the speech recognizer 111*a* and then output as [text: yes] and the natural language understanding portion 111*b* may output [domain:-], [action:-], [speech act:-], and [morphological analysis result: yes/IC].

The natural language understanding result may be transmitted to the dialogue input manager 111*c* and the dialogue input manager 111*c* may transmit the natural language understanding result to the dialogue manager 120.

Figure 41:
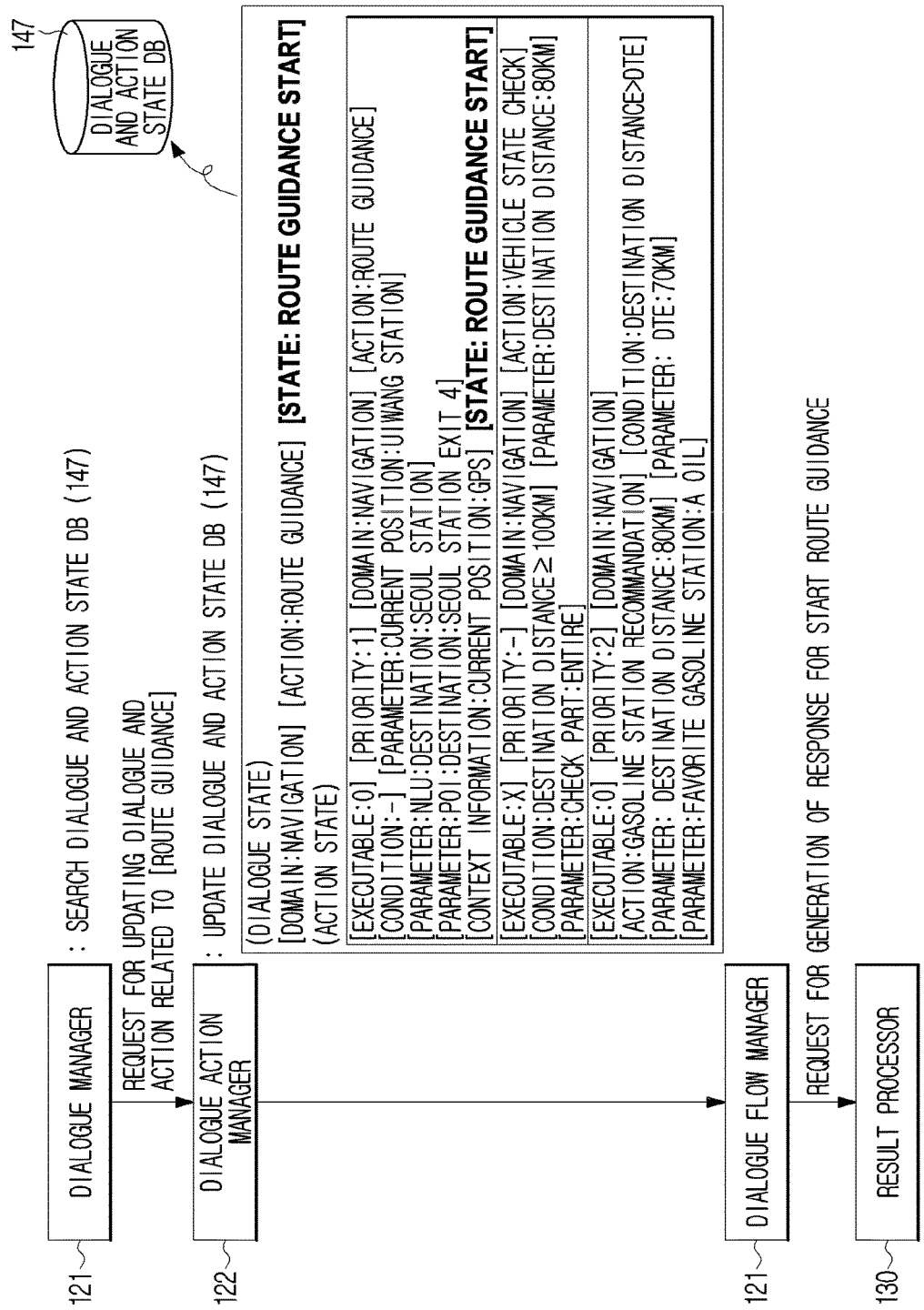

Referring to FIG. 41, the dialogue flow manager 121 may search the dialogue and action state DB 147 and analyze the previous dialogue state. The dialogue flow manager 121 may request that the dialogue action manager 122 update dialogue/action related to [route guidance] that is currently executed.

The dialogue action manager 122 may update the dialogue state and the action state to [state: route guidance start].

The dialogue flow manager 121 may request that the result processor 130 generate a response for starting the route guidance.

Figure 42:
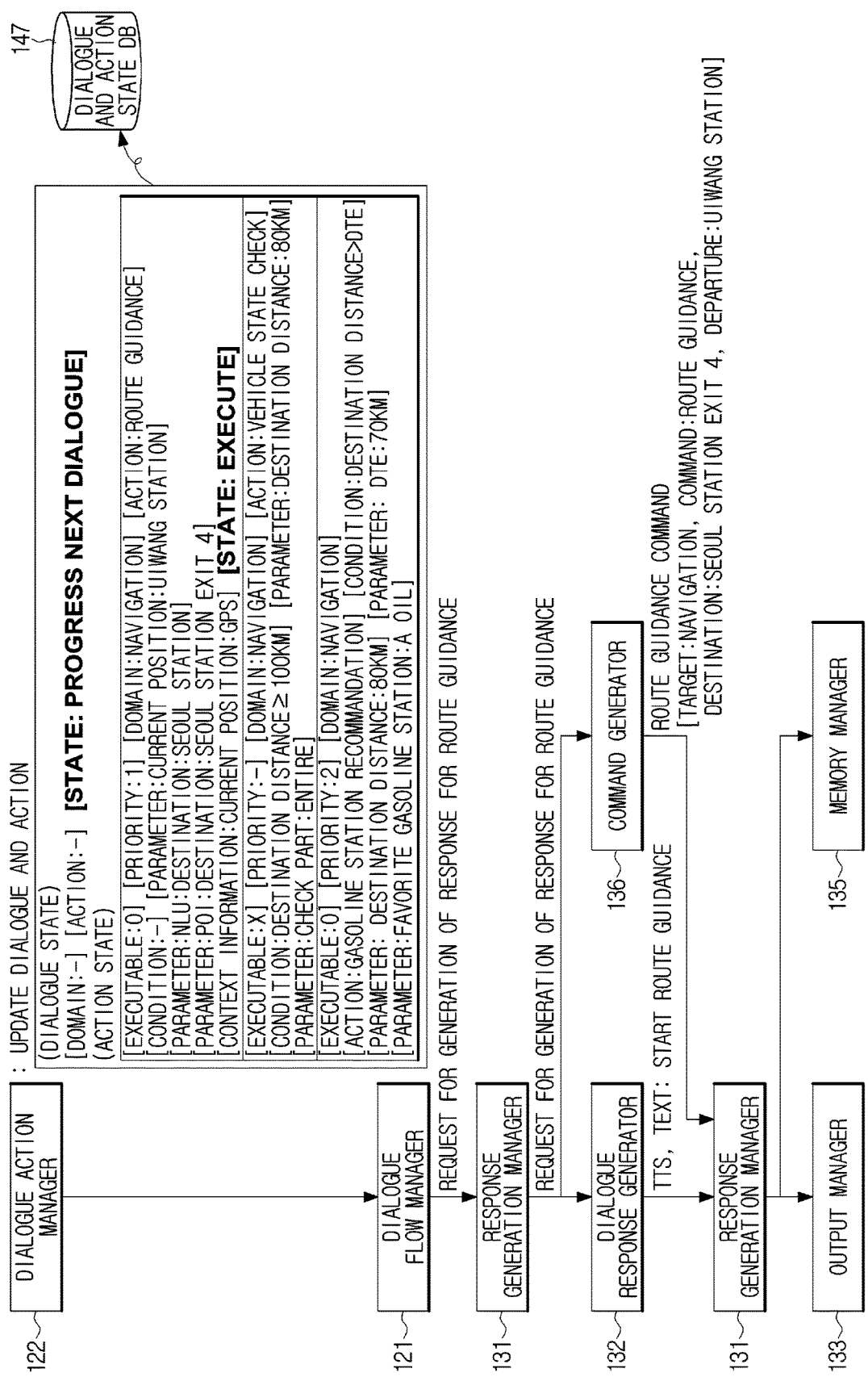

Referring to FIG. 42, the dialogue action manager 122 may update the dialogue state to [state: next dialogue progress] and update the action state to [state: execute].

The dialogue flow manager 121 may request that the response generation manager 131 generate a response for the route guidance.

The dialogue response generator 132 may generate a dialogue response configured to output "start route guidance" as TTS and text form, and then transmit the dialogue response to the response generation manager 131.

The command generator 136 may generate a command for executing the route guidance [target: navigation, command: route guidance, destination: A repair shop, departure: Uiwang station], and then transmit the command to the response generation manager 131.

The response generation manager 131 may transmit the generated dialogue response and command to the output manager 133. The output manager 133 may output the dialogue response via the display 231 and the speaker 232. The output manager 133 may transmit the route guidance command to the AVN 230 of the vehicle 200 via the vehicle controller 240 or to the external content server 300 providing the navigation service.

The above mentioned flow of the data processing is merely an example applied to the dialogue system 100. Therefore, the order of processing data by each component of the dialogue system 100 is not limited to the above mentioned example, and thus the plurality of components may process the data at the same time or the plurality of components may process the data in an order that is different from the above mentioned example.

Hereinafter according to an aspect, a dialogue processing method will be described. According to an aspect, the dialogue processing method may be applied to the above mentioned dialogue system 100 or the vehicle 200 provided with the dialogue system 100. Therefore, the description of FIGS. 1 to 40 will be applied to the dialogue processing method in the same manner.

Figure 43:
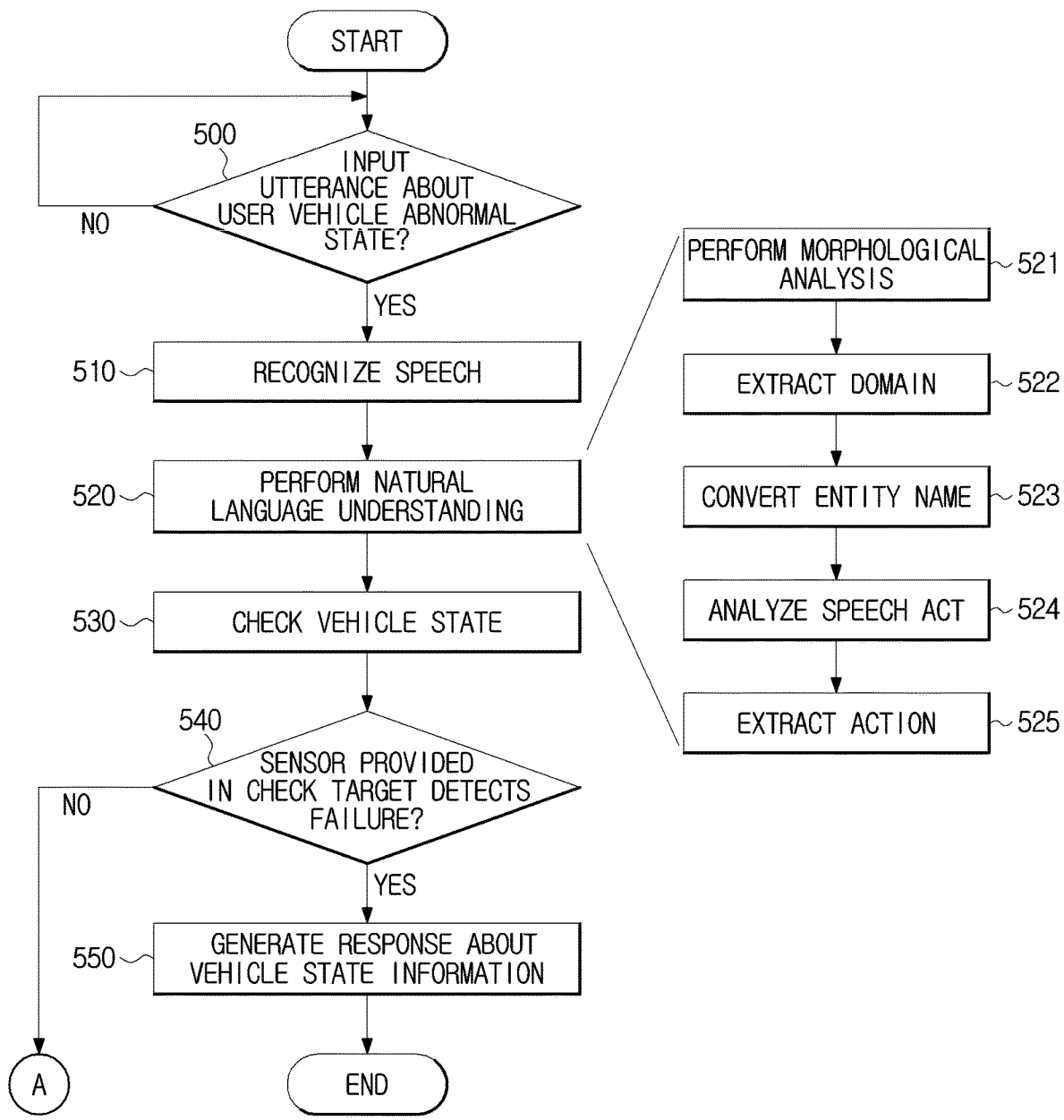
FIG. 43 is a flowchart illustrating a method for performing a maintenance history search in a dialogue processing method according to an aspect.
Figure 44:
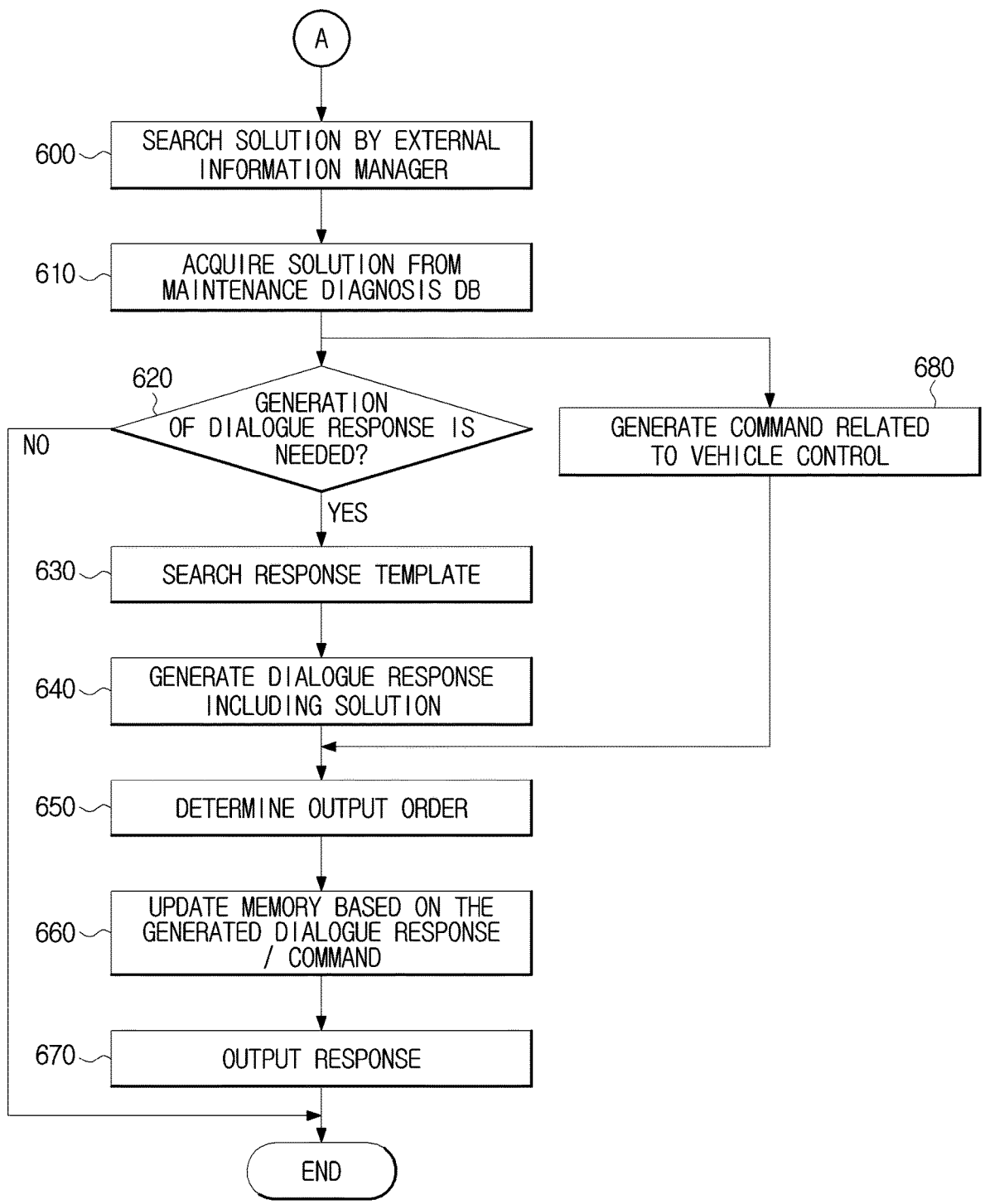
FIG. 44 is a flowchart illustrating a method for processing a maintenance history search result.

FIG. 43 is a flowchart illustrating a method for performing a maintenance history search in a dialogue processing method according to an aspect, and FIG. 44 is a flowchart illustrating a method for processing a maintenance history search result.

Referring to FIG. 43, when a user's utterance is input (500), the speech recognizer 111a may recognize the input user's utterance (510). According to an aspect, the user' utterance may be related to an utterance related to preliminary indication about the failure that detects the vehicle abnormal state.

The speech recognizer 111a may recognize the input user's utterance and output an utterance in the text form.

The natural language understanding portion 111b may apply the natural language understanding technology to the utterance in the text form, (520) and output a result of the natural language understanding.

Particularly, the natural language understanding process (520) may include performing morphological analysis on the utterance in the form of text (521), extracting a domain from the utterance based on the morphological analysis result (522), recognizing an entity name (523), analyzing a speech act (524) and extracting an action (525).

The extraction of the domain, the recognition of the entity name and the extraction of the action may be performed by referring to the domain/action inference rule DB 141.

The output of the natural language understanding portion 111b, i.e., the result of the natural language understanding, may include a domain, an action, a speech act, and a result of the morphological analysis corresponding to the user's utterance.

The result of the natural language understanding processed by the input processor 110 may be transmitted to the dialogue manager 120. The dialogue manager 120 may execute an action related to the vehicle state check among actions related to the domains in the vehicle abnormal state (530).

The dialogue manager 120 may receive the detection value of the sensor configured to determine whether there is the failure in the vehicle, based on the sensor provided in the check target. Particularly, the dialogue manager 120 may execute the vehicle-self check based on the context information and the sensor detection value stored in the long/short term memory, which are transmitted from the vehicle 200.

When the sensor provided in the check target detects the failure, the dialogue manager 120 may generate a response to the detection value of the sensor transmitted from the vehicle 200 that is a response to the context information of the vehicle, and transmit information related to the occurrence of the failure of the current check target and the vehicle abnormal state, to the user (550).

According to an aspect, in the most cases, the user's utterance about the vehicle abnormal state is related to the preliminary indication of the failure. Therefore, it is difficult to acquire information on the vehicle abnormal state by the vehicle self-check. That is, when the sensor provided in the check target cannot detect the failure, the dialogue system 100 may request the solution for the check target through the external information manager 126, as illustrated in FIG. 44.

Referring to FIG. 44, the dialogue manager 120 may search for the solution for the vehicle abnormal state through the external information manager 126 (600).

Particularly, the external information manager 126 may request the similar case that is searched in the vehicle model and the vehicle type that is similar with the current vehicle 200, to the external content server 300, and then search for the solution executed in the similar case. Alternatively, the external information manager 126 may search for the maintenance history of the check target by using the personal maintenance history stored in the external content server 300 and the vehicle controller 240, and request the solution.

The solution searched from the outside may be stored in the maintenance diagnosis DB 146e and the external information manager 126 may acquire a solution from the maintenance diagnosis DB 146e (610).

The dialogue manager 120, particularly, the dialogue flow manager 121 may transmit the acquired solution to the result processor 130.

When the generation of the dialogue response is needed (620), the dialogue response generator 132 may search the response template 149 (630). The dialogue response generator 132 may extract a dialogue response template corresponding to the current dialogue state and action state from the response template 149 and fill the response template with the needed parameter value so as to generate the dialogue response (640).

When the generation of the command is needed (680), the command generator 136 may generate the command for the vehicle control or the use of the external content (680).

The generated dialogue response or command may be input to the output manager 133 and the output manager 133 may determine the output order between the dialogue response and the command or the output order among the plurality of the commands (650).

The memory may be updated based on the generated dialogue response or command (660). The memory manager 135 may update the short-term memory 144 by storing the dialogue content between the user and the system based on the generated dialogue response or command, and update the long-term memory 143 by storing the information about the vehicle abnormal state, which is acquired through the dialogue with the user. The memory manager 135 may update the information stored in the long-term memory 143 based on the generated and output vehicle control and external content request.

The output manager 133 may output the response by transmitting the dialogue response and command to an appropriate output position (670). TTS response may be output via the speaker 232 and text response may be output on the display 231. The command may be transmitted to the vehicle controller 240, or to the external content server 300 according to the control target. In addition, the command may be transmitted to the communication device 280 configured to communicate with the external content server 300.

FIG. 45 is an example illustrating preliminary indications in accordance with an aspect of the present disclosure.

Referring to FIG. 45, a user may input an utterance related to the vehicle abnormal state, such as "brake is stiff (example 1)", "engine sound is so loud (example 2)", "Is the vehicle needed to check up (example 3)? and "the vehicle cannot speed up (example, 4)".

The dialogue system 100 particularly the input manager 110 may analyze each utterance and update a specific domain and action in that the example 1 is about the problem of the brake, the example 2 is about the problem of the engine sound, the example 3 is about the confirmation of the check history, and the example 4 is about the problem of the driving.

The dialogue system 100 particularly the external information manager 126 may search for the similar case in the similar vehicle model/the similar vehicle type, in the maintenance diagnosis DB 146e, and confirm the personal maintenance history.

In addition, the dialogue system 100 may provide solutions for each the vehicle abnormal state.

Particularly, for the example 1, the solution that the replacement of the brake pedal is needed may be provided, for the example 2, the solution that the replacement of the timing belt is needed may be provided, for the example 3, the solution that the replacement of the engine oil is needed may be provided, and for the example 4, the solution that the replacement of the engine is needed due to the deterioration of the engine may be provided.

According to the solution, the dialogue system 100 may generate a response according to each solution. Particularly, as for the example 1, the result processor 130 may generate a response about the repair shop guidance and the need of the replacement of the brake pedal, and as for the example 2, the result processor 130 may generate a response about the replacement timing of the timing belt. As for the example 3, the result processor 130 may generate a response about the timing of the replacement of the engine oil, and as for the example 4, the result processor 130 may generate a response about the need of the replacement of the engine and a service about the repair shop reservation.

The dialogue processing method according to an aspect is not limited the order in the above mentioned flowchart. The flow according to the flowchart of FIGS. 41 to 43 may be merely an example applied to the dialogue processing method. Therefore, the plurality of steps may be performed at the same time it may be also possible to change the order of each step.

As is apparent from the above description, according to the proposed dialogue system, vehicle having the same and dialogue processing method, it may be possible to recognize a preliminary indication related to the failure of the vehicle through the dialogue with the user so as to preciously diagnose the failure of the vehicle by considering a part which is not measured by a sensor.

In addition, it may be possible to diagnose the failure of the vehicle in advance by using a variety of state information such as the maintenance of the vehicle, so as to inhibit accidents.

It may be possible to increase learning data of the pre-diagnosis by receiving a feedback of the user through the dialogue after performing the diagnosis about the preliminary indication, thereby performing more accurate pre-diagnosis.

Although some aspects of the present disclosure have been shown and described, it will be appreciated by those skilled in the art that changes may be made without departing from the principles and spirit of the disclosure, the scope of which is defined in the claims and their equivalents.

DESCRIPTION OF SYMBOLS

100: dialogue system
110: input processor
120: dialogue processor
130: result processor
200: vehicle
210: speech input device
220: information except for speech input device
230: speaker output device
280: communication device

What is claimed is:

1. A dialogue system comprising:
memory;
a communication device; and
a processor configured to execute instructions stored in the memory and to:
in response to an user's utterance, extract a first search request for a check history of a vehicle from the user's utterance;
cause the communication device to transmit a second search request regarding failure cases and maintenance histories of reference vehicles, wherein a type of the reference vehicles is similar to the vehicle's type;
in response to the first search request, determine an action of the check history search based on context information including at least one of vehicle state information or driving environment information;
acquire an action parameter value of a solution to execute the action;
in response to transmitting the second search request, receive information regarding the failure cases and the maintenance histories of the reference vehicles; and
generate a response by using the acquired action parameter value and the information regarding the failure cases and the maintenance histories of the reference vehicles.

2. The dialogue system of claim 1, wherein
the processor is further configured to determine whether to execute the action of the check history search based on the context information.

3. The dialogue system of claim 2, wherein
the processor is configured to request a parameter value of a condition determination parameter used to determine whether to execute the action of check history search.

4. The dialogue system of claim 1, wherein
the processor is configured to request a check history of the vehicle from a source outside of the vehicle.

5. The dialogue system of claim 4, wherein the memory is configured to store a personal maintenance history contained in the check history, and the solution.

6. The dialogue system of claim 5, wherein
the memory is configured to store a dialogue policy related to the solution, and
the processor is configured to recommend a service to the user based on the dialogue policy.

7. The dialogue system of claim 5, wherein
the processor is configured to update the personal maintenance history based on the solution.

8. The dialogue system of claim 7, wherein
the processor is configured to generate a response based on the personal maintenance history.

9. The dialogue system of claim 7, further comprising:
a communication device configured to receive data related to the solution and configured to transmit the updated personal maintenance history to the outside.

10. The dialogue system of claim 1, wherein
the processor is configured to generate a command for the control of the vehicle based on the solution.

11. The dialogue system of claim 1, wherein
the processor is configured to extract a feedback according to the solution, from the user's utterance based on the response generated by the result processor.

12. The dialogue system of claim 11, wherein
the processor is configured to determine a feedback action based on the feedback, and to acquire a feedback action parameter value to execute the feedback action.

13. The dialogue system of claim 12, wherein
the processor is configured to generate a response by using the feedback action parameter value and to transmit the feedback to the outside.

14. The dialogue system of claim 1, wherein
the processor is configured to determine whether it is a pre-utterance context based on the context information, wherein the pre-utterance represents a case in which the dialogue system firstly outputs an utterance before a user, and when it is determined that it is the pre-utterance context, the processor is configured to acquire at least one of an action corresponding to the request of the check history search, or a pre-utterance message including an utterance content output by the dialogue system.

15. A vehicle comprising:
memory;
a communication device; and
a processor configured to execute instructions stored in the memory and to:
in response to an user's utterance, extract a first search request for a check history of a vehicle from the user's utterance;
cause the communication device to transmit a second search request regarding failure cases and maintenance histories of reference vehicles, wherein a type of the reference vehicles is similar to the vehicle's type;
in response to the first search request, determine an action of the check history search based on context information including at least one of vehicle state information or driving environment information;
acquire an action parameter value of a solution to execute the action;
in response to transmitting the second search request, receive information regarding the failure cases and the maintenance histories of the reference vehicles; and
generate a response by using the acquired action parameter value and the information regarding the failure cases and the maintenance histories of the reference vehicles.

16. The vehicle of claim 15, wherein
the processor is configured to determine whether to execute the action of the check history search based on the context information.

17. The vehicle of claim 16, wherein
the processor is configured to request a parameter value of a condition determination parameter used to determine whether to execute the action of check history search.

18. The vehicle of claim 15, wherein
the processor is configured to request a check history of the vehicle from a source outside the vehicle.

19. The vehicle of claim 18, wherein the memory is configured to store a personal maintenance history contained in the check history, and the solution.

20. The vehicle of claim 19, wherein
the memory is configured to store a dialogue policy related to the solution, and
the processor is configured to recommend a service to the user based on the dialogue policy.

21. A dialogue processing method comprising:
in response to an user's utterance, extracting, by a processor, a first search request for a check history of a vehicle from the user's utterance;
transmitting, by the processor, a second search request regarding failure cases and maintenance histories of reference vehicles, wherein a type of the reference vehicles is similar to the vehicle's type;
in response to the first search request, determining, by the processor, an action of the check history search based on on context information including at least one of vehicle state information or driving environment information;
acquiring, by the processor, an action parameter value of a solution to execute the action;
in response to transmitting the second search request, receiving information regarding the failure cases and the maintenance histories of the reference vehicles; and
generating, by the processor, a response according the request, by using the acquired action parameter value and the information regarding the failure cases and the maintenance histories of the reference vehicles.

22. The dialogue processing method of claim 21, further comprising:
requesting the check history of the vehicle, to the outside.

23. The dialogue processing method of claim 22, further comprising:
storing a personal maintenance history contained in the check history, and the solution, by memory configured to store the same.

24. The dialogue processing method of claim 23, wherein
the storing comprises storing a dialogue policy related to the solution, and
the generation of the response comprises recommending a service to the user based on the dialogue policy.

25. The dialogue processing method of claim 23, wherein
the responding comprises generating a response based on the personal maintenance history and generating a command for the control of the vehicle based on the solution.

26. The dialogue processing method of claim 23, further comprising:
updating the personal maintenance history based on the solution;
receiving data related to the solution; and
transmitting the updated personal maintenance history to a receiver outside the vehicle.

27. The dialogue processing method of claim 21, further comprising:
determining, by the processor, whether it is a pre-utterance context based on the context information, wherein the pre-utterance represents a case in which the dialogue system firstly outputs an utterance before a user; and when it is determined that it is the pre-utterance context, acquiring at least one of an action corresponding to the request of the check history search, or a pre-utterance message including an utterance content output by the dialogue system.

* * * * *